May 16, 1944.  F. W. WAGNER ET AL  2,348,766
AUTOMATIC RECORD PLAYING AND CHANGING APPARATUS
Filed Oct. 19, 1940  24 Sheets-Sheet 3
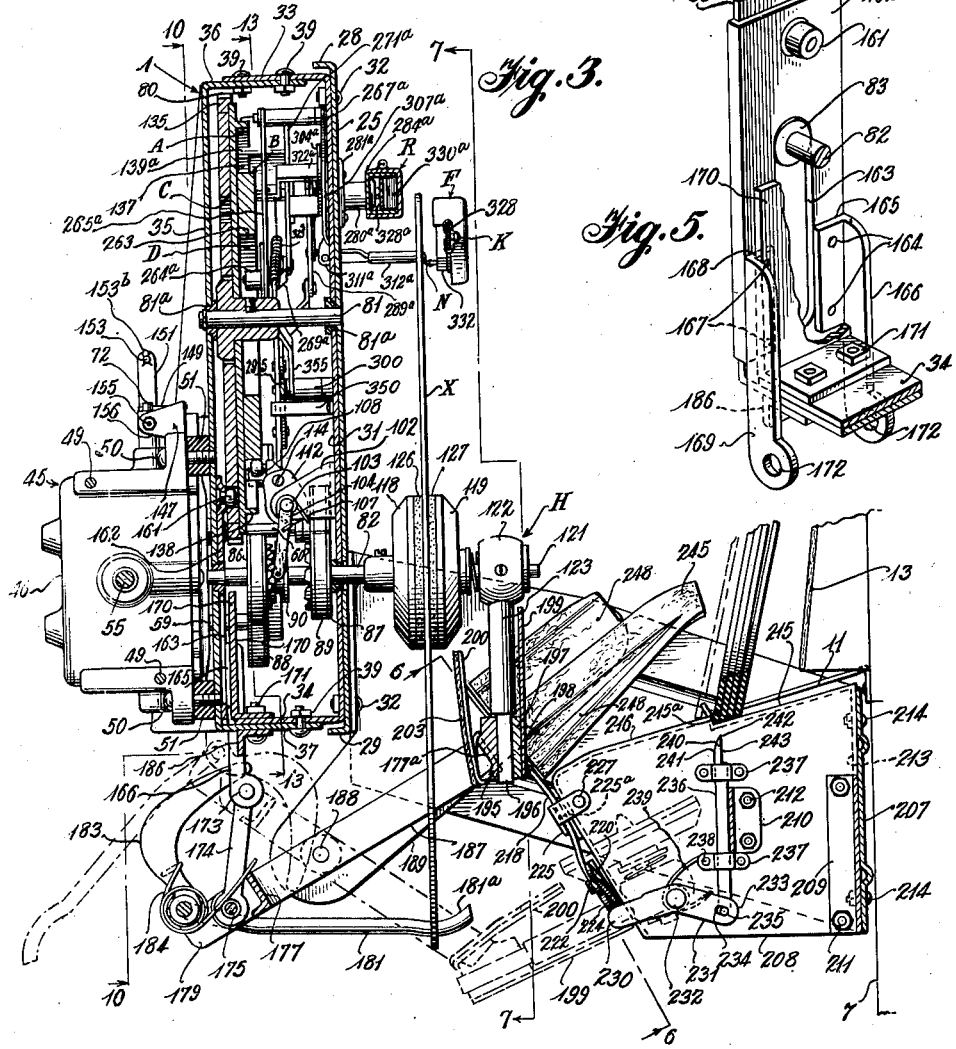
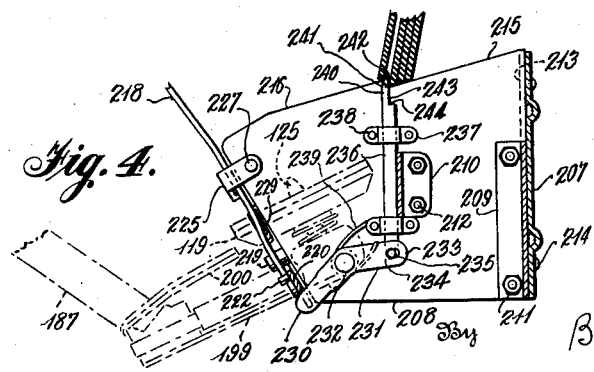
Inventors
Frederic W. Wagner
and Ray Wilson
By Bacon & Thomas
Attorneys

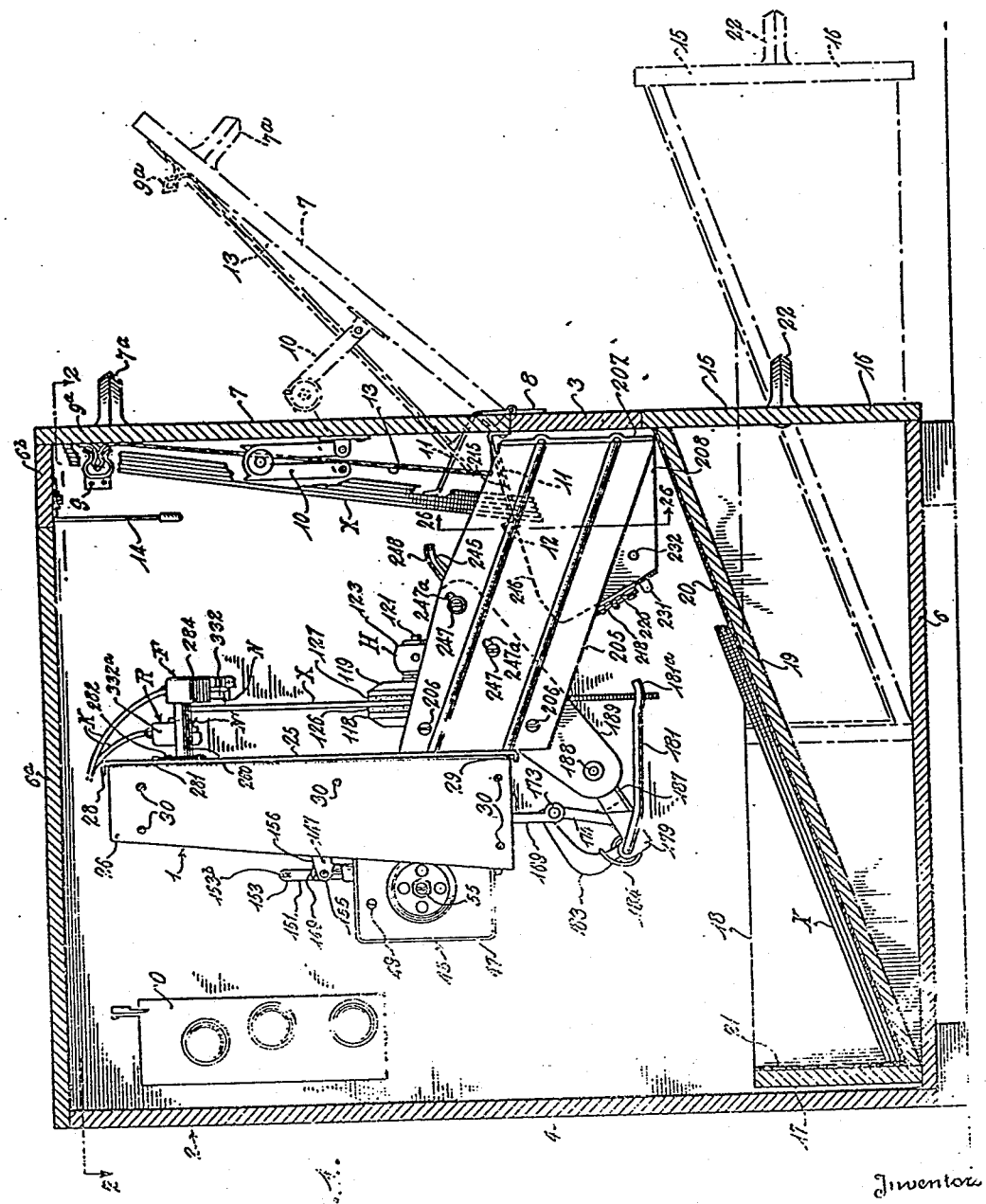

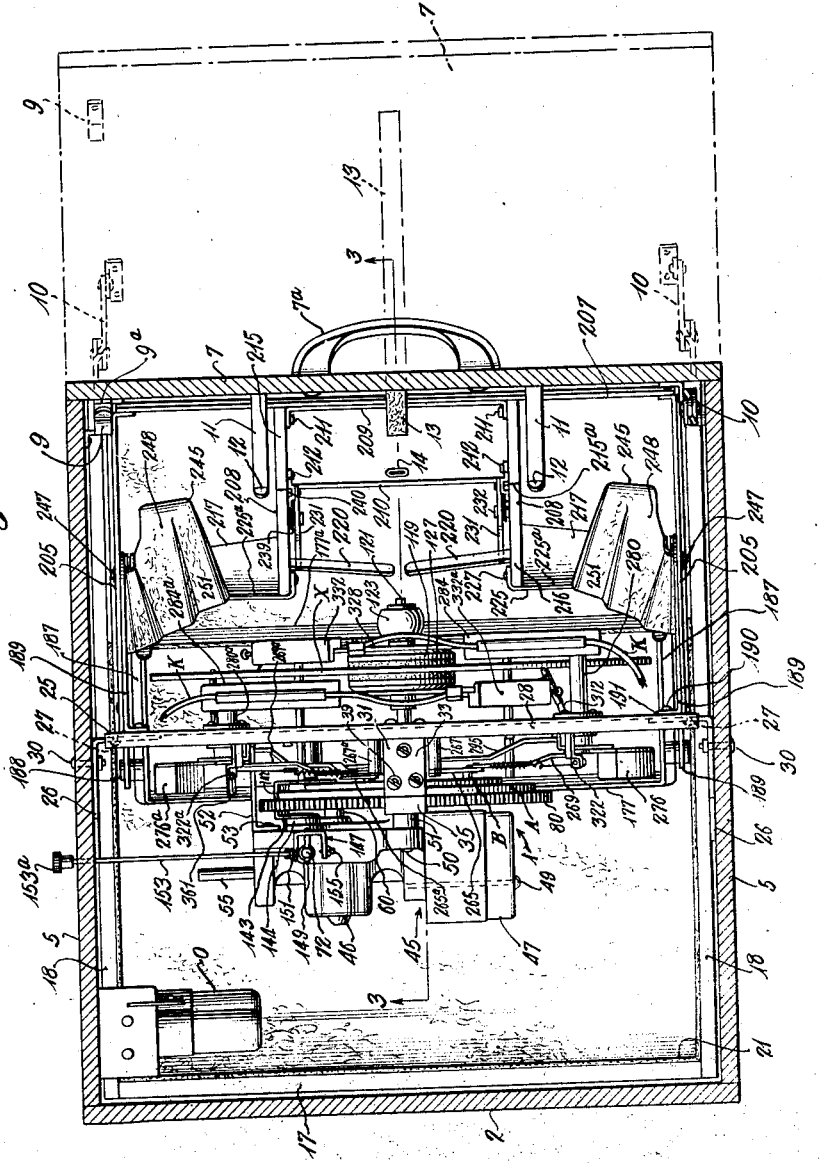

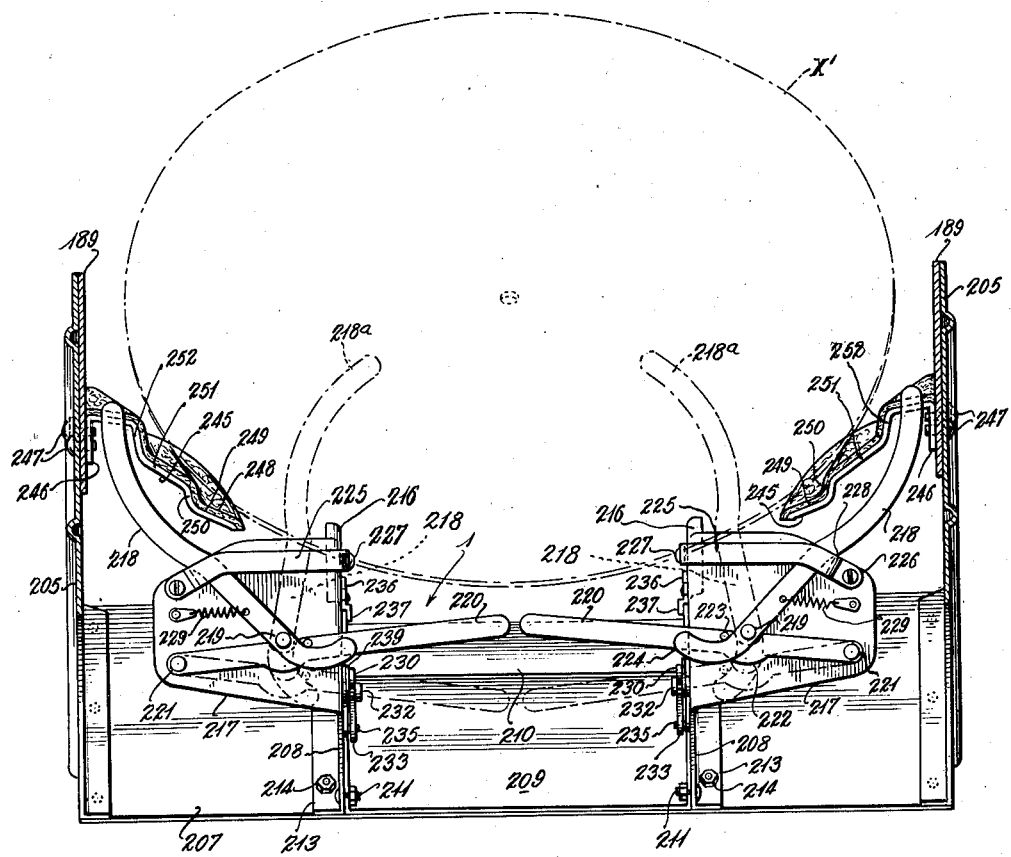

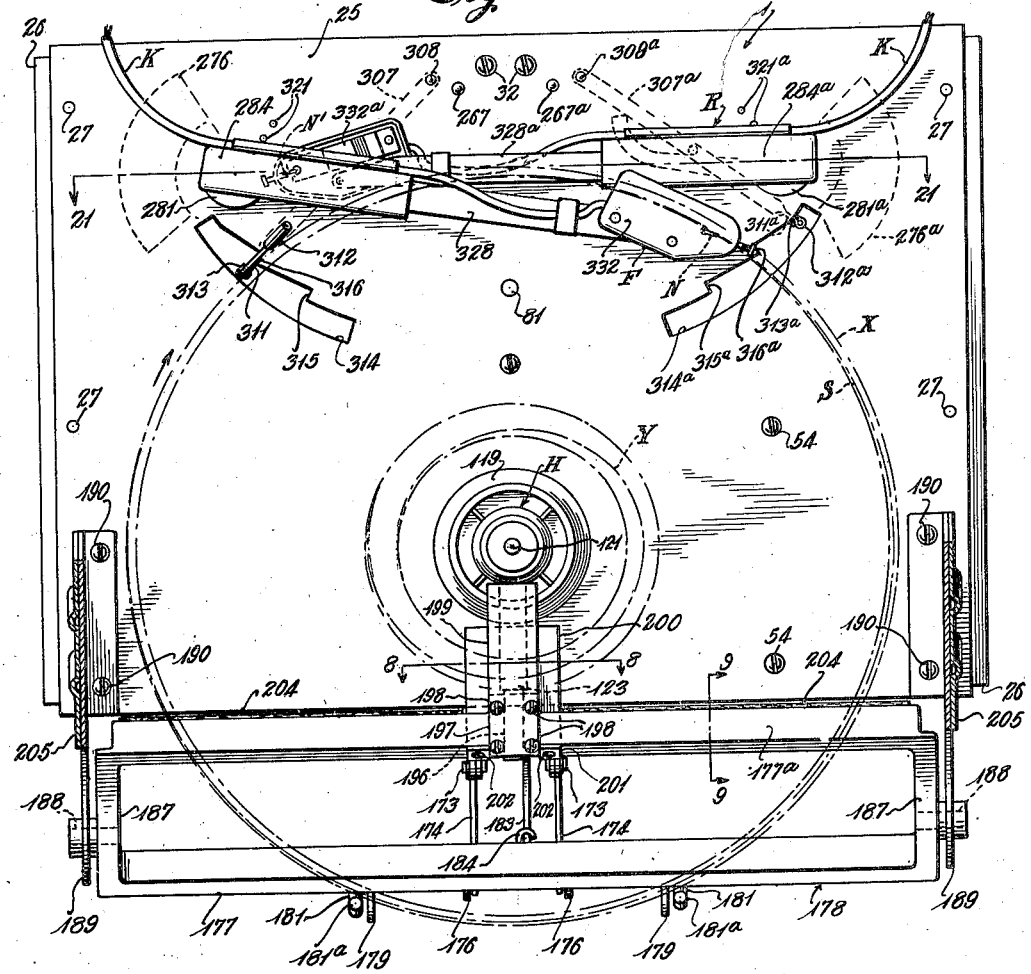
Fig. 7.
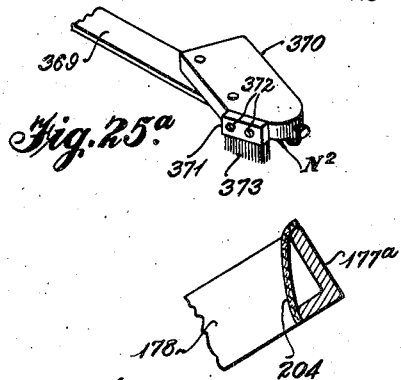
Fig. 25ª
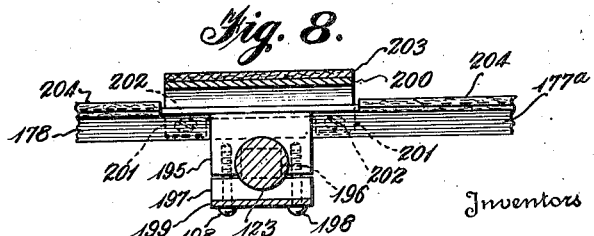
Fig. 8.
Fig. 9.
Inventors
Frederic W. Wagner
and Ray Wilson
By Bacon & Thomas
Attorneys

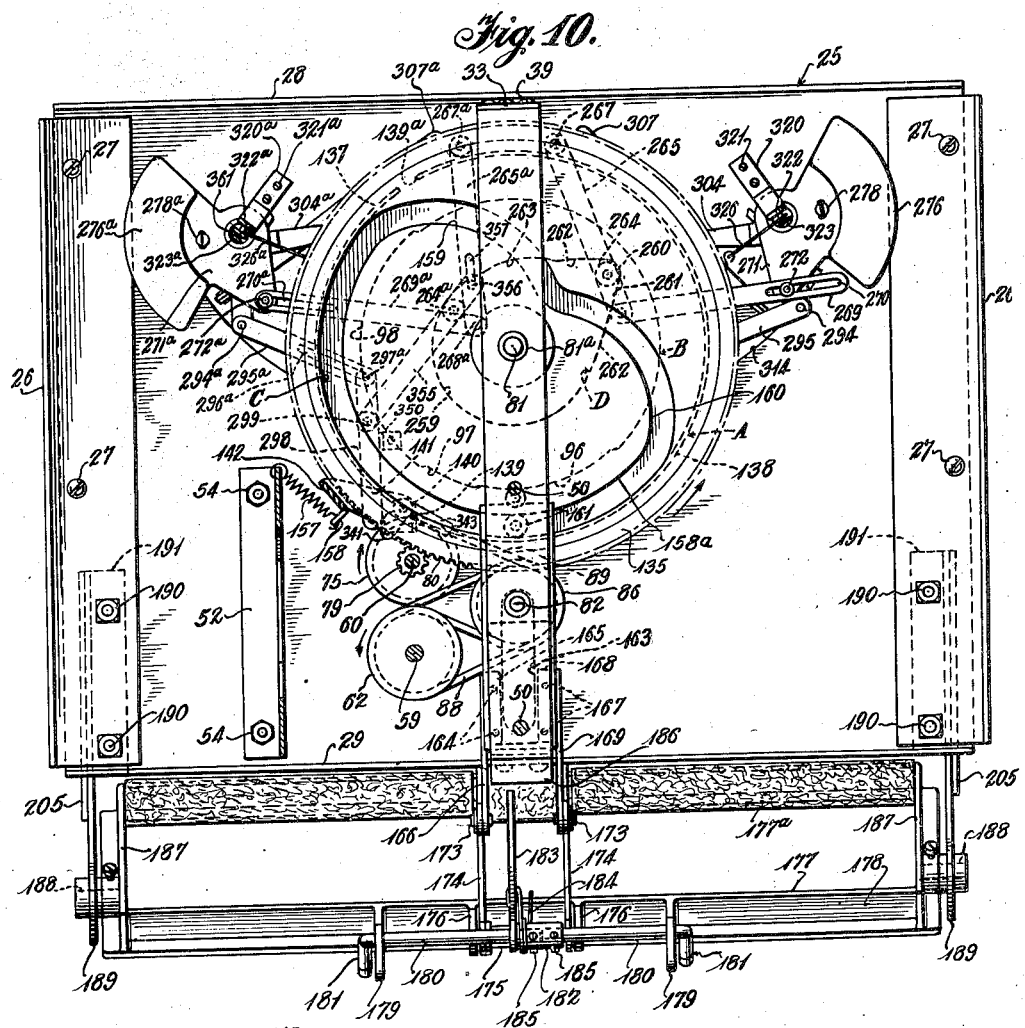
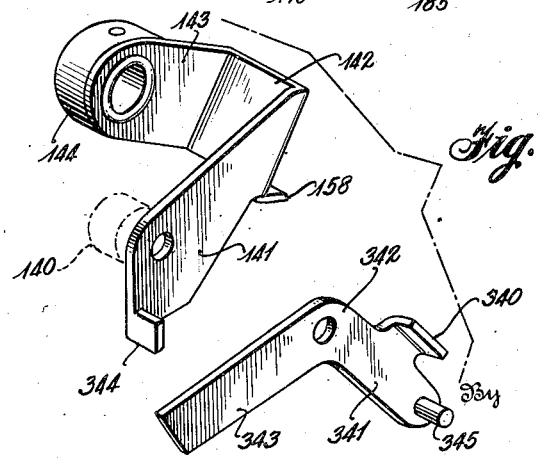

Inventors
Frederic W. Wagner
and Ray Wilson
By Bacon & Thomas
Attorneys

May 16, 1944.  F. W. WAGNER ET AL  2,348,766
AUTOMATIC RECORD PLAYING AND CHANGING APPARATUS
Filed Oct. 19, 1940   24 Sheets-Sheet 8
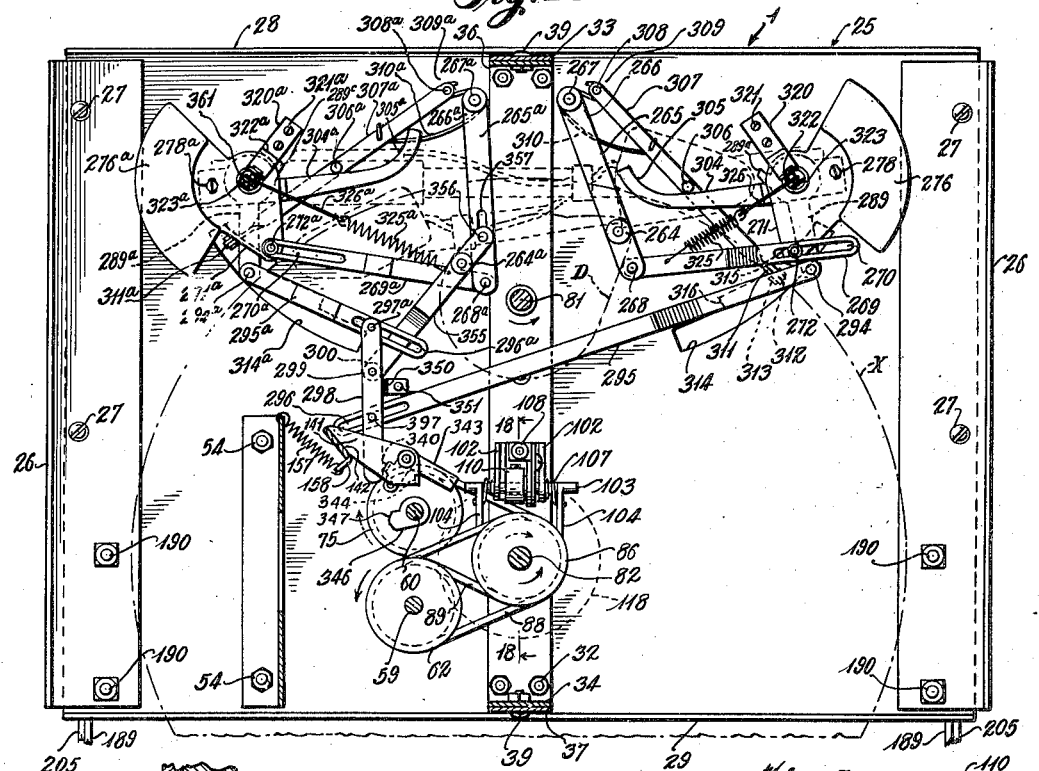
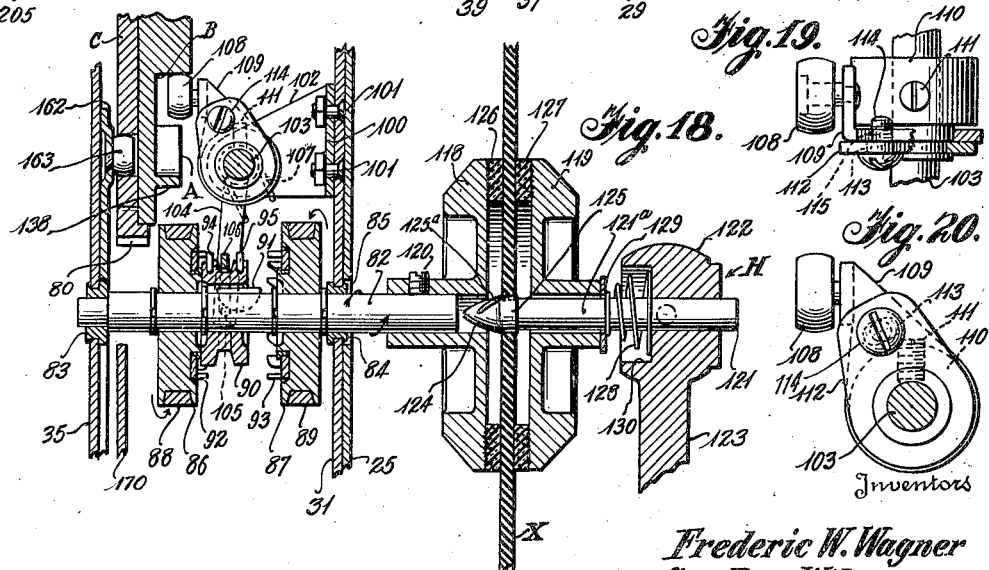
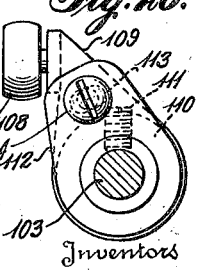
Inventors
Frederic W. Wagner
and Ray Wilson
By Bacon + Thomas
Attorneys

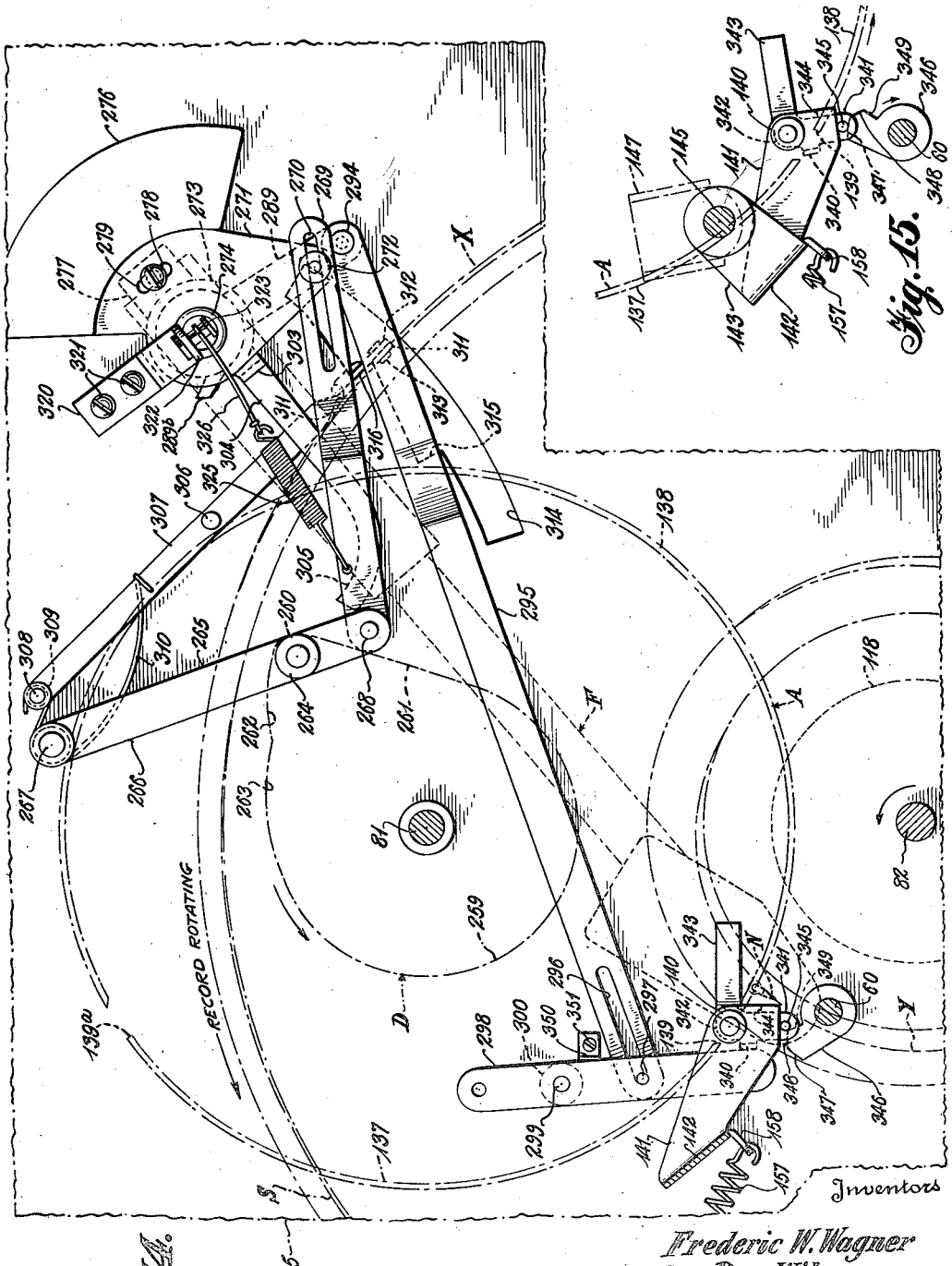

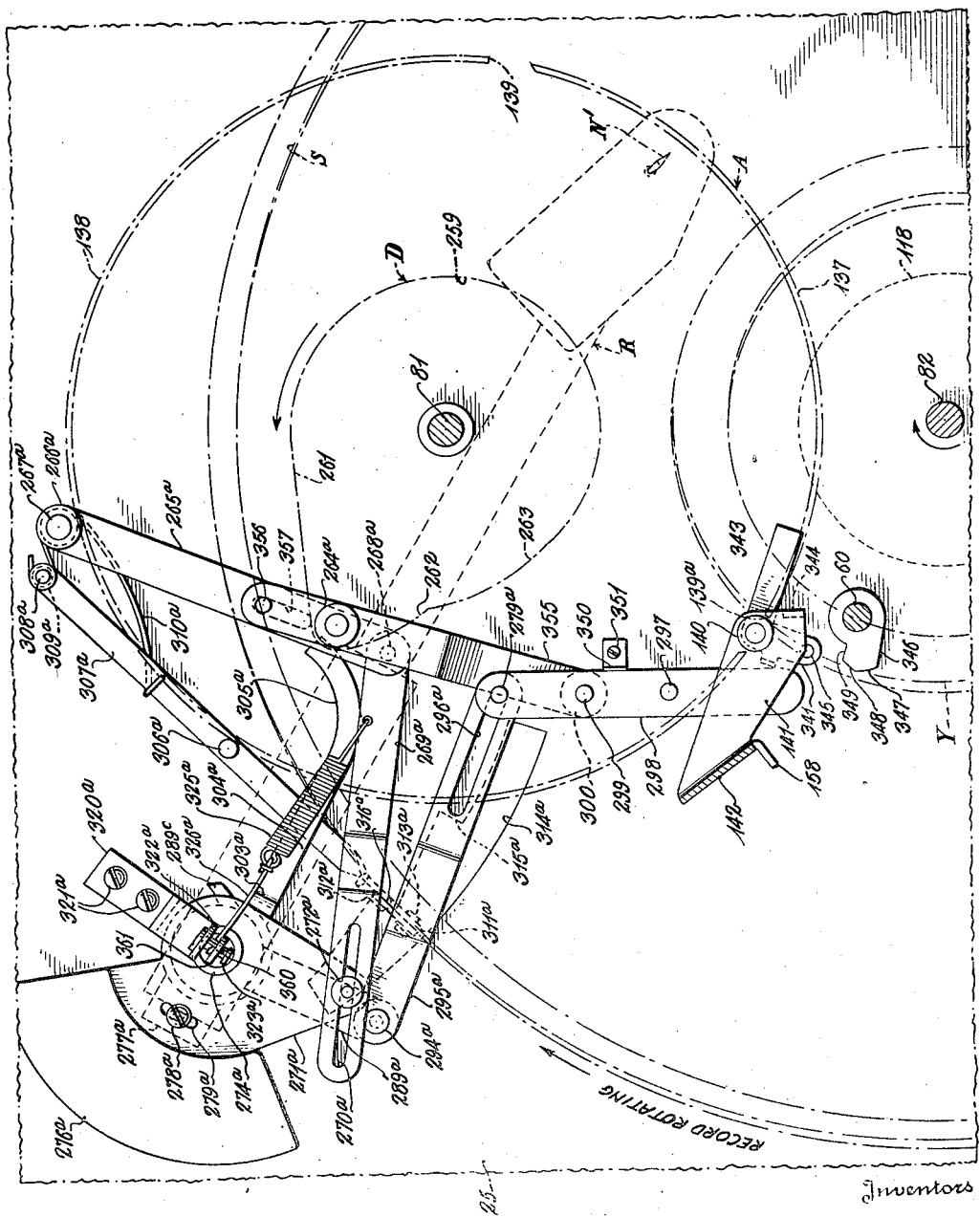

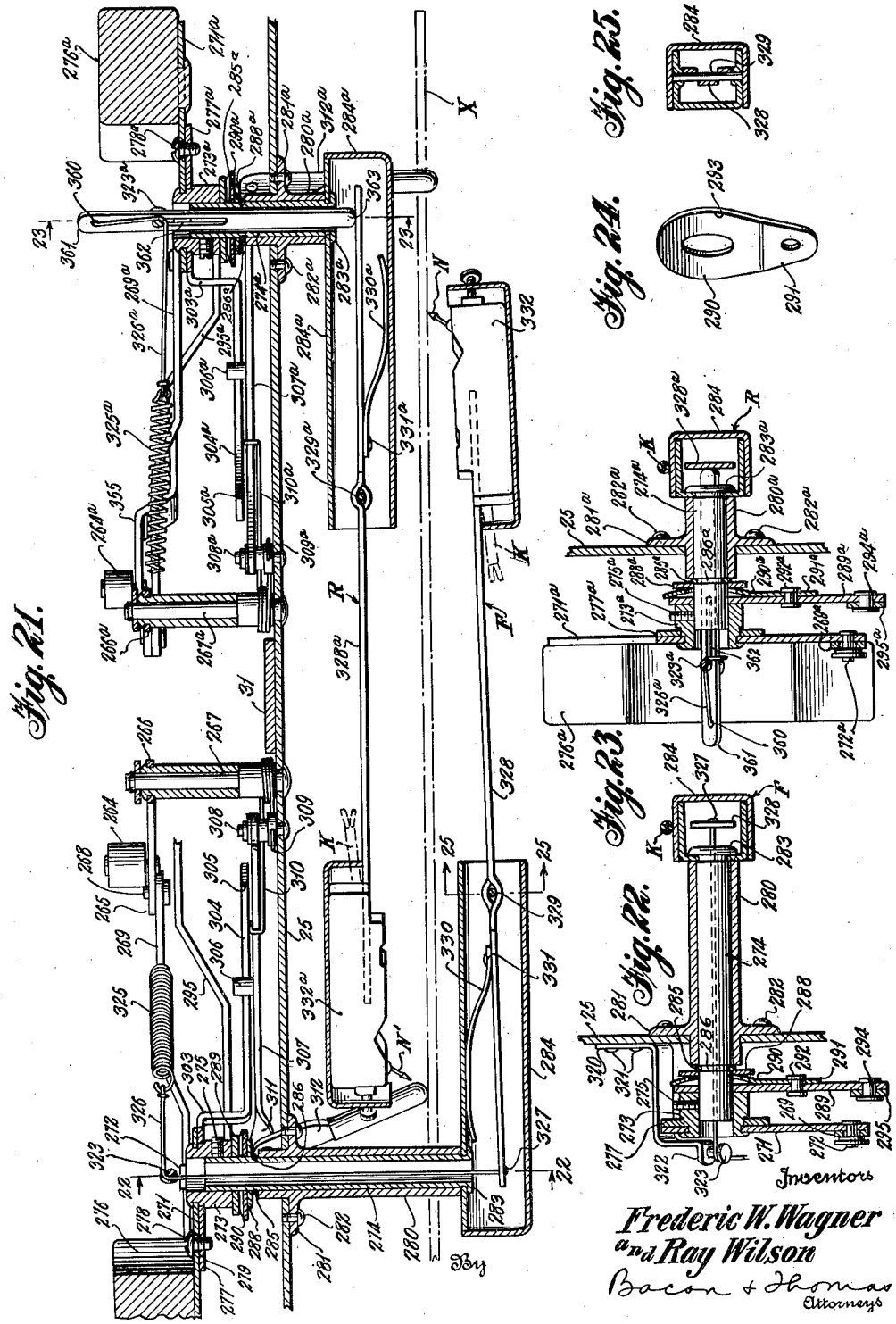

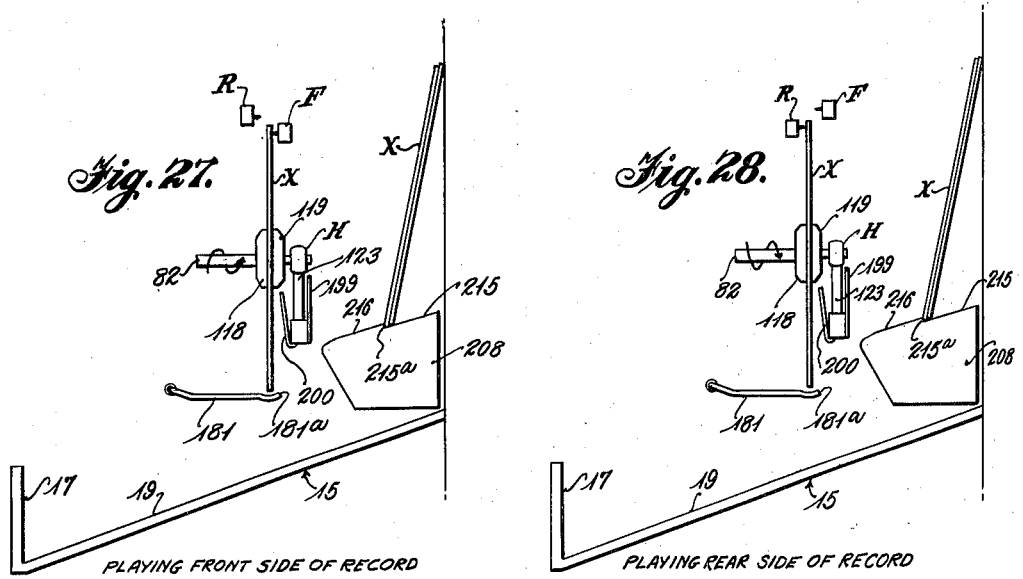
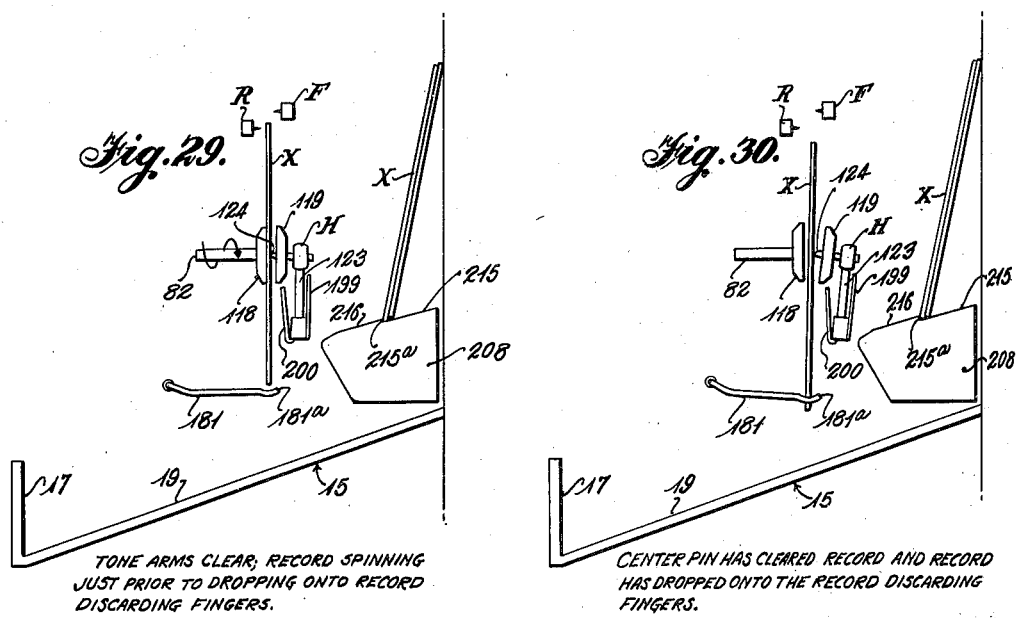

May 16, 1944.  F. W. WAGNER ET AL  2,348,766
AUTOMATIC RECORD PLAYING AND CHANGING APPARATUS
Filed Oct. 19, 1940  24 Sheets-Sheet 13

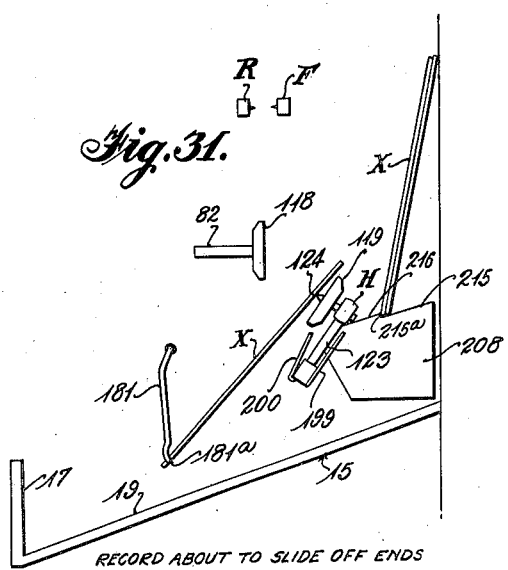

RECORD ABOUT TO SLIDE OFF ENDS OF RECORD DISCARDING FINGERS.

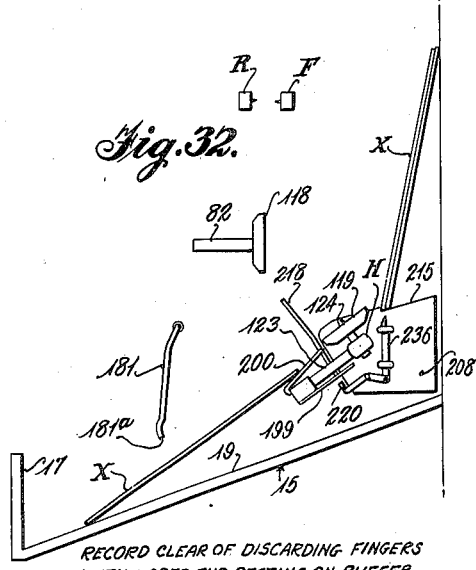

RECORD CLEAR OF DISCARDING FINGERS WITH UPPER END RESTING ON BUFFER.

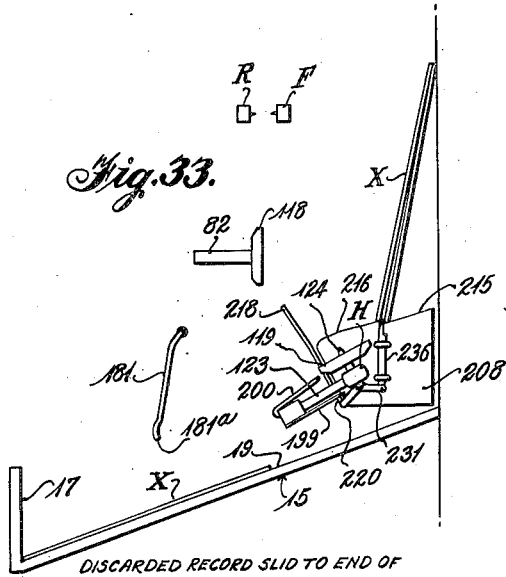

DISCARDED RECORD SLID TO END OF DRAWER. EJECTOR BAR BEGINNING TO RAISE FOREMOST RECORD OF STACK.

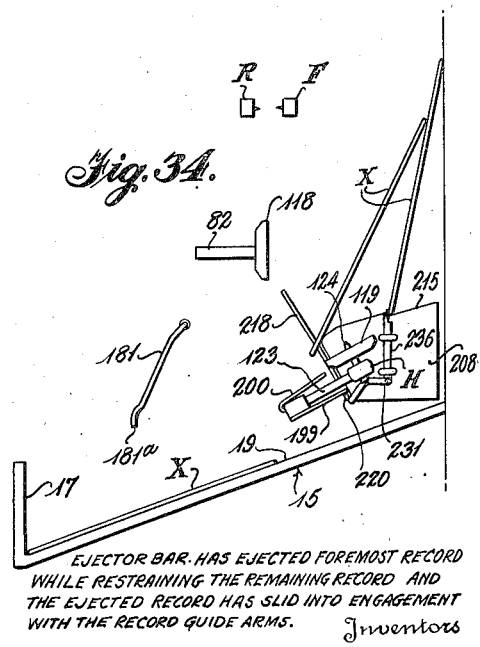

EJECTOR BAR HAS EJECTED FOREMOST RECORD WHILE RESTRAINING THE REMAINING RECORD AND THE EJECTED RECORD HAS SLID INTO ENGAGEMENT WITH THE RECORD GUIDE ARMS.

Inventors
*Frederic W. Wagner*
*and Ray Wilson*
By Bacon & Thomas
Attorneys

May 16, 1944. F. W. WAGNER ET AL 2,348,766
AUTOMATIC RECORD PLAYING AND CHANGING APPARATUS
Filed Oct. 19, 1940 24 Sheets-Sheet 14

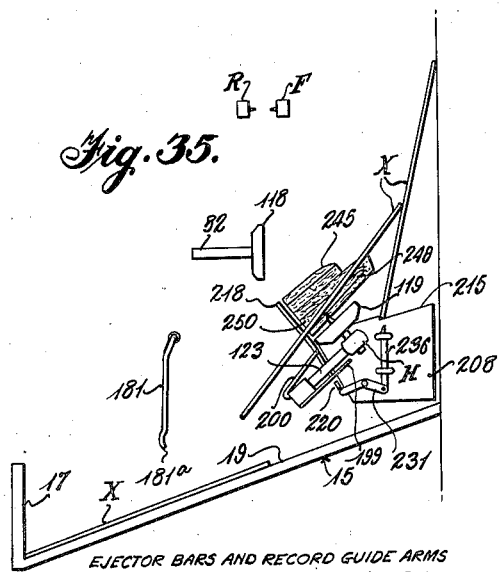

Fig. 35.
EJECTOR BARS AND RECORD GUIDE ARMS HAVE RETRACTED AND RECORD HAS COME TO REST ON POSITIONING BRACKET. CENTER PIN IS ABOUT TO ENTER PIN HOLE TO CONVEY RECORD.

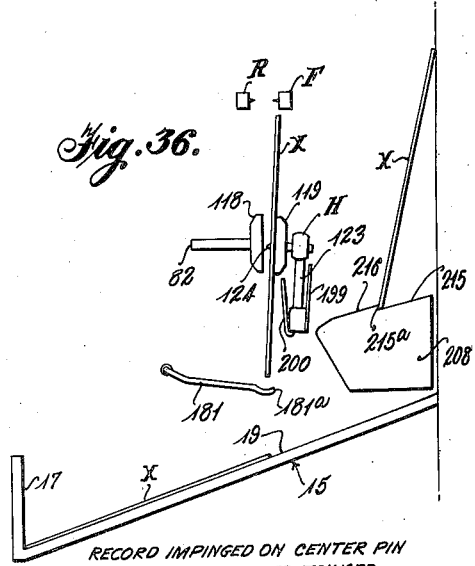

Fig. 36.
RECORD IMPINGED ON CENTER PIN AND BEING CONVEYED TOWARD TURNTABLE.

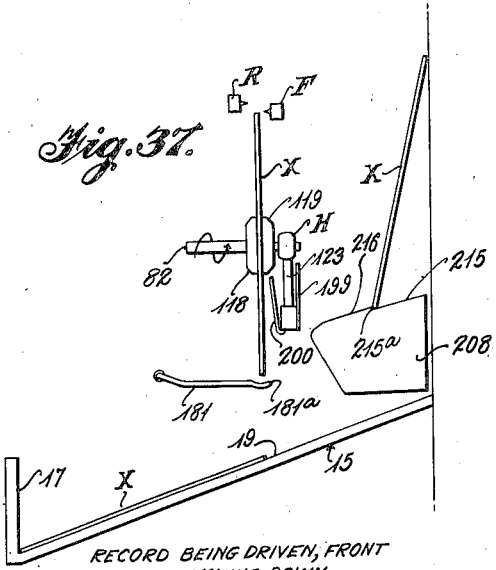

Fig. 37.
RECORD BEING DRIVEN, FRONT TONE ARM MOVING DOWN.

Inventors
Frederic W. Wagner
and Ray Wilson
By Bacon & Thomas
Attorneys

May 16, 1944. F. W. WAGNER ET AL 2,348,766
AUTOMATIC RECORD PLAYING AND CHANGING APPARATUS
Filed Oct. 19, 1940 24 Sheets-Sheet 16
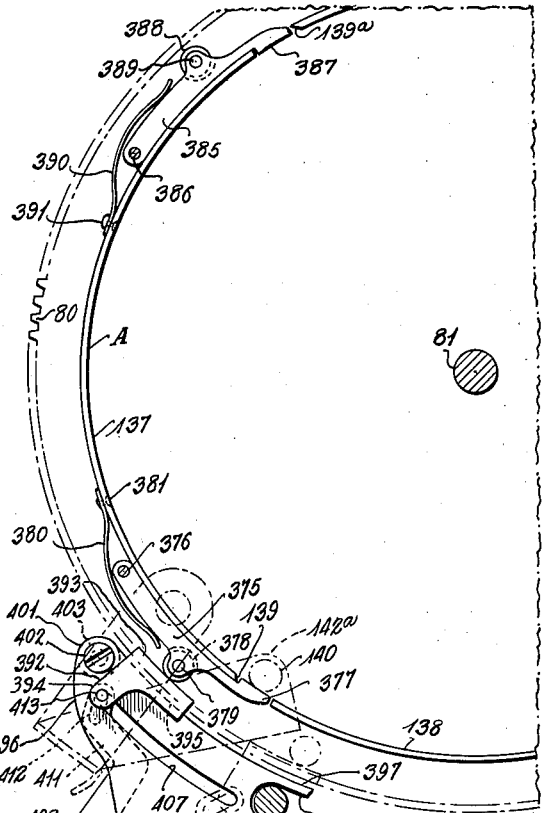
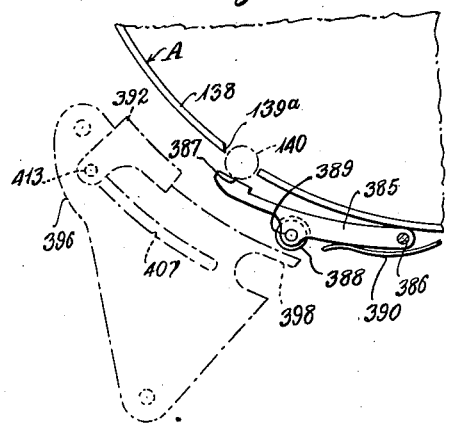
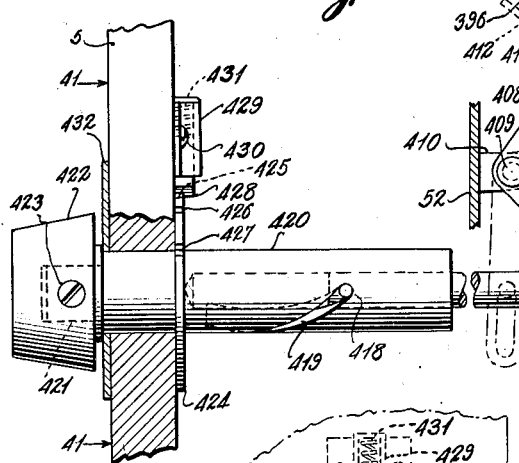
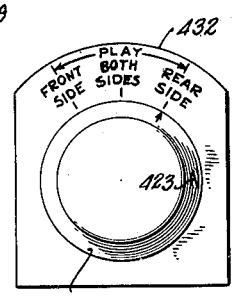
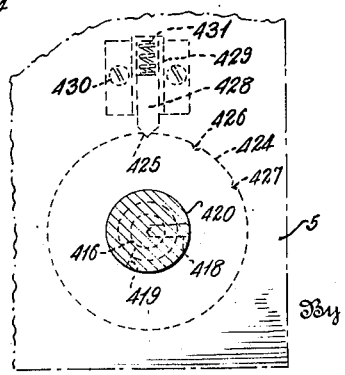
Inventors
Frederic W. Wagner
and Ray Wilson
Bacon & Thomas
Attorneys May 16, 1944.　　F. W. WAGNER ET AL　　2,348,766
AUTOMATIC RECORD PLAYING AND CHANGING APPARATUS
Filed Oct. 19, 1940　　24 Sheets-Sheet 17

Inventors
Frederic W. Wagner
and Ray Wilson
By Bacon & Thomas
Attorneys

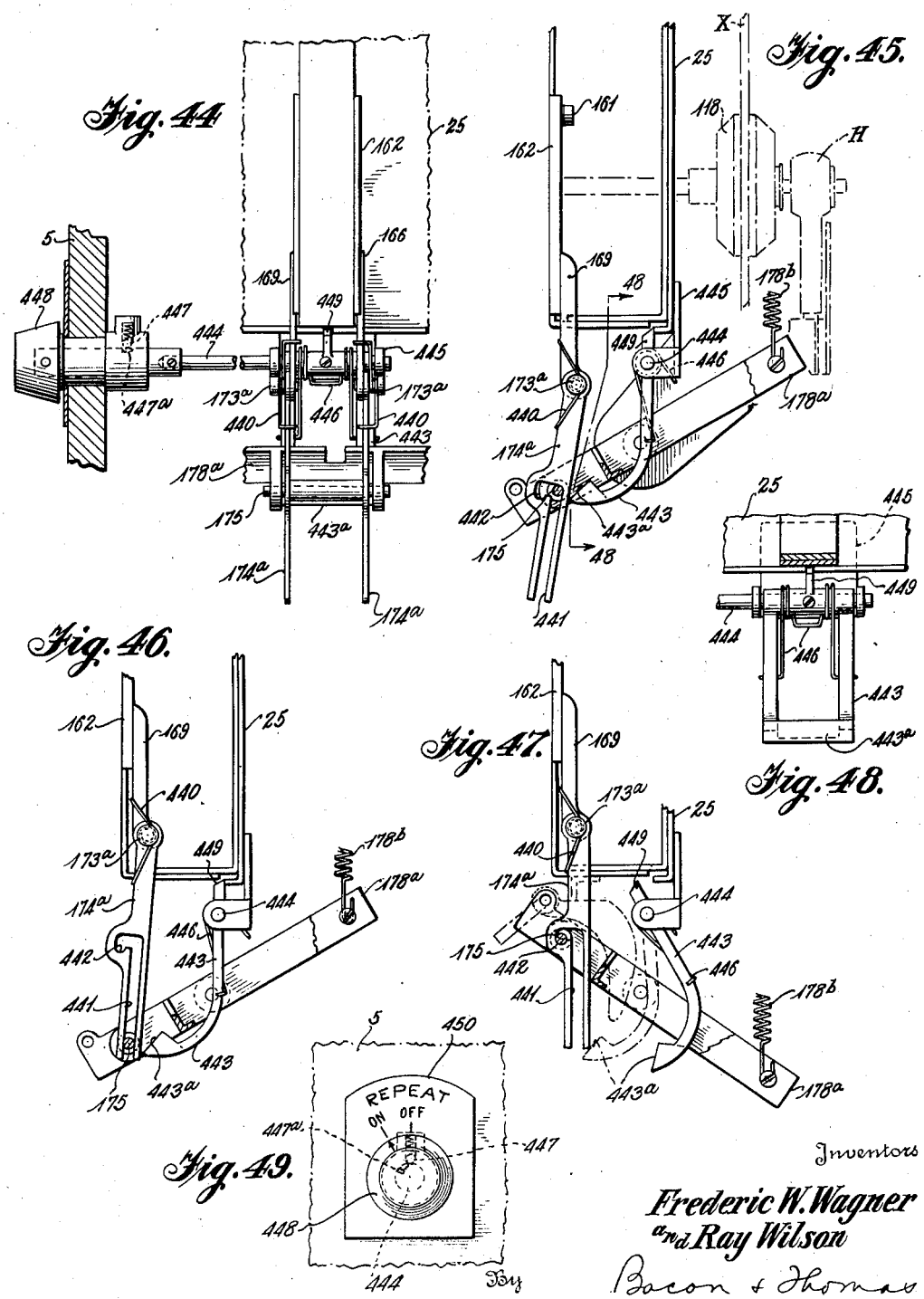

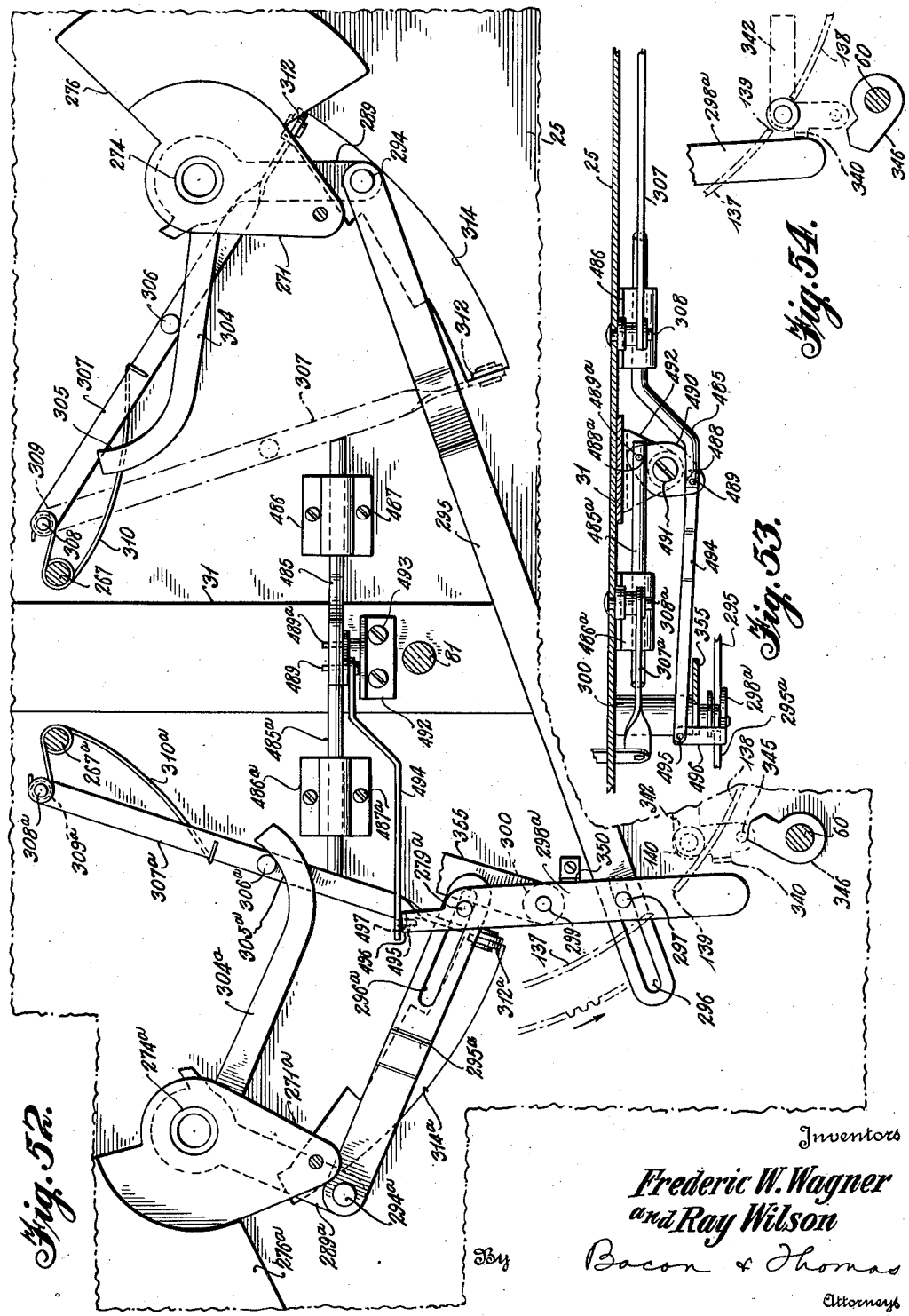

May 16, 1944.  F. W. WAGNER ET AL  2,348,766
AUTOMATIC RECORD PLAYING AND CHANGING APPARATUS
Filed Oct. 19, 1940  24 Sheets—Sheet 21
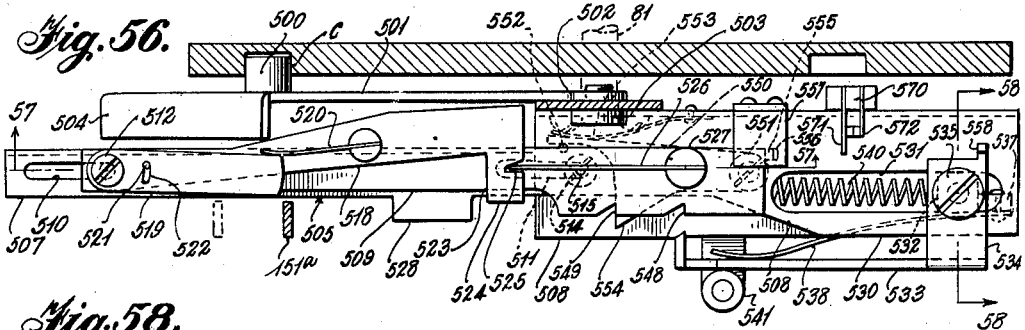
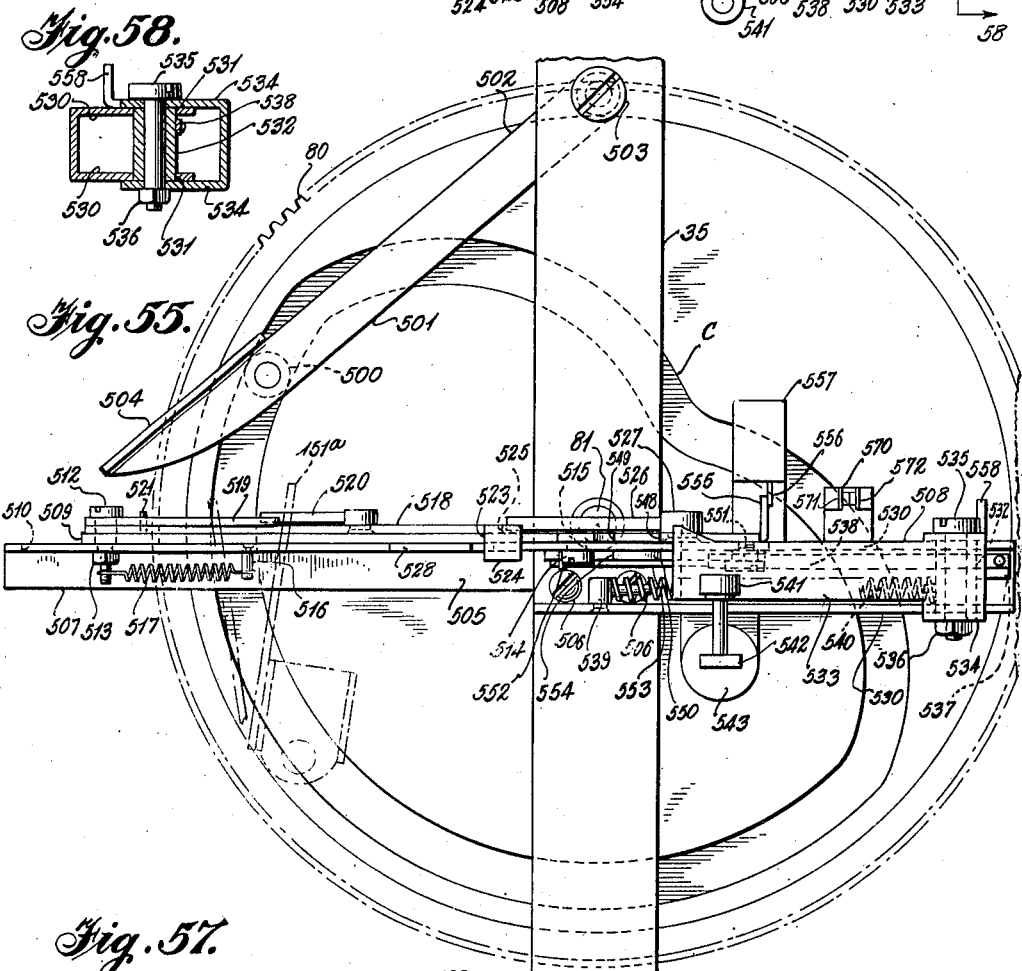
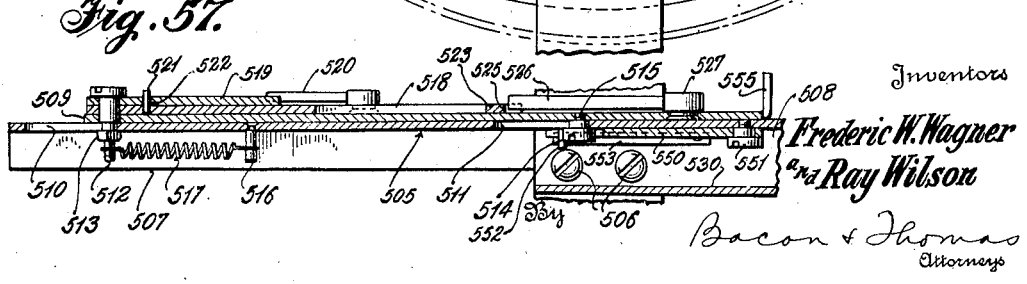
Inventors
Frederic W. Wagner
and Ray Wilson
Bacon & Thomas
Attorneys May 16, 1944.   F. W. WAGNER ET AL   2,348,766
AUTOMATIC RECORD PLAYING AND CHANGING APPARATUS
Filed Oct. 19, 1940   24 Sheets-Sheet 22

Inventors
Frederic W. Wagner
and Ray Wilson
By Bacon + Thomas
Attorneys

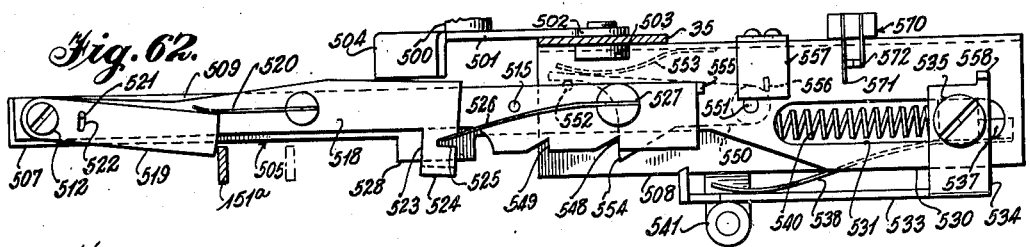
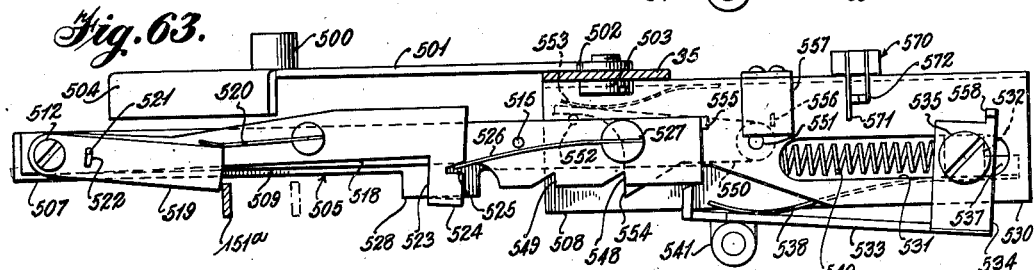
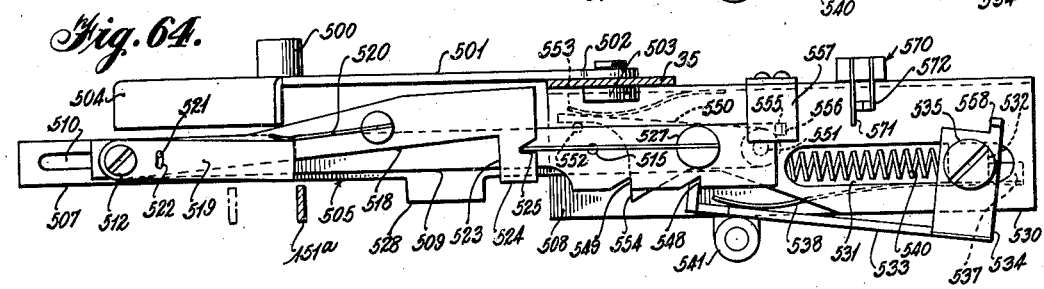
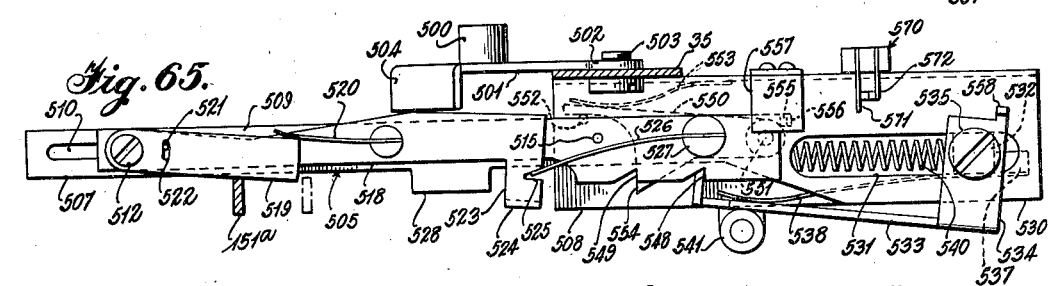
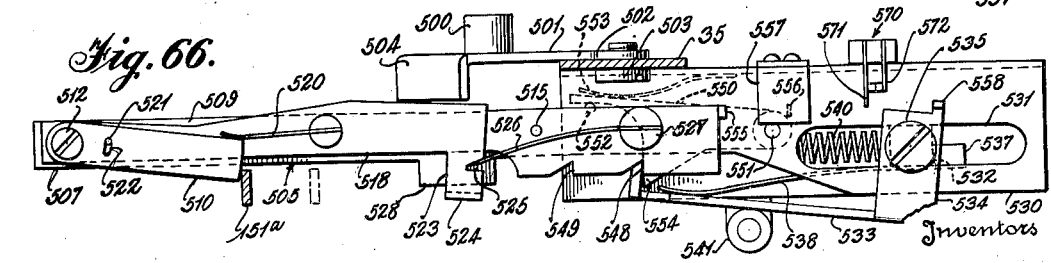

May 16, 1944.  F. W. WAGNER ET AL  2,348,766
AUTOMATIC RECORD PLAYING AND CHANGING APPARATUS
Filed Oct. 19, 1940  24 Sheets-Sheet 24
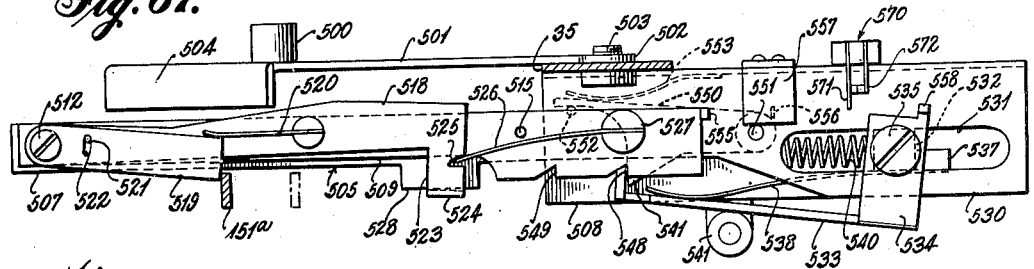
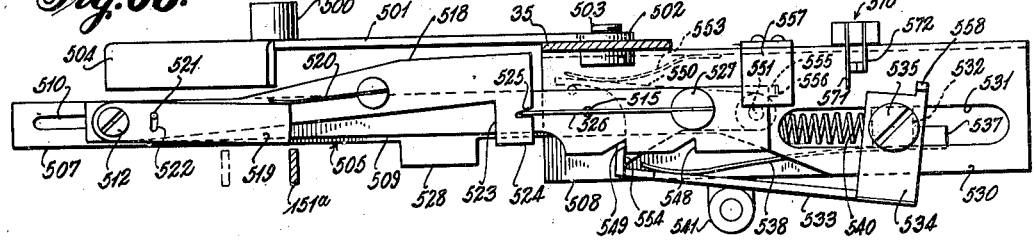
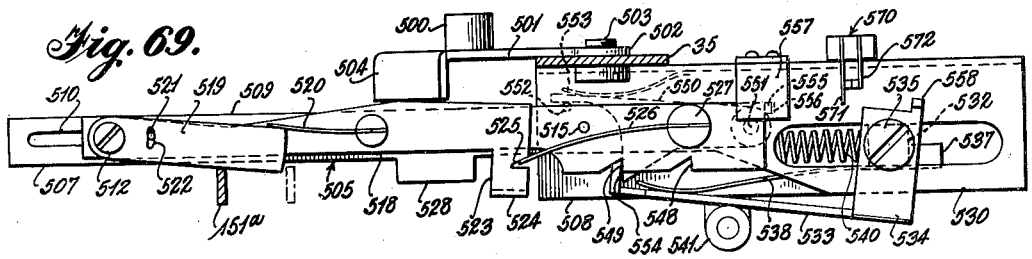
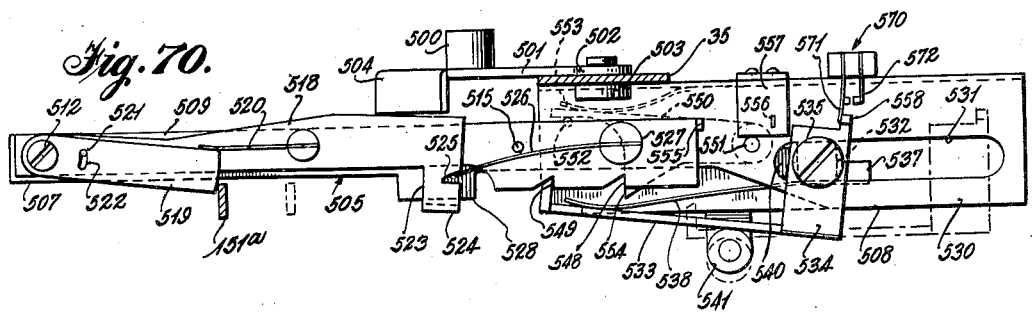
Inventors
Frederic W. Wagner
and Ray Wilson
By Bacon + Thomas
Attorneys Patented May 16, 1944

2,348,766

UNITED STATES PATENT OFFICE 2,348,766

AUTOMATIC RECORD PLAYING AND CHANGING APPARATUS

Frederic W. Wagner and Ray Wilson, Chicago, Ill., assignors to Zenith Radio Corporation, Chicago, Ill., a corporation of Illinois Application October 19, 1940, Serial No. 361,972

97 Claims. (Cl. 274—10)

This invention relates to sound reproducing apparatus, and more particularly to apparatus for reproducing sound from phonograph records.

More specifically, the invention relates to automatic record playing and changing apparatus arranged to remove records from a stack and to normally successively play both sides of double-face records, or the one side of single-face records, prior to discarding.

The principal object of the invention is to provide a fully automatic record playing and changing apparatus.

Another object of the invention is to provide an automatic record playing and changing apparatus which will play a series of single-face and/or successively play both sides of a series of double-face records and/or one side of a series of double-face records.

Another object of the invention is to provide an automatic record playing and changing apparatus adapted to play single and double-face records, respectively, of different diameters, stacked in any order of size.

Another object of the invention is to provide a record playing apparatus arranged to play both sides of a double-face record while the record is rotating in a substantially vertical plane and without requiring the record to be turned over to play the rear side thereof.

Still another object of the invention is to provide an automatic record playing and changing apparatus adapted to repeat the playing of one side of a record indefinitely.

Still another object of the invention is to provide an automatic record playing and changing apparatus arranged so that the playing of any side may be discontinued at will.

A further object of the invention is to provide an automatic record playing and changing apparatus arranged so that the playing of the front side of a double-face record may be discontinued at will without interfering with the subsequent automatic playing of the rear side of said record.

A still further object of the invention is to provide an automatic record playing and changing apparatus arranged so that the playing of the rear side of a double-face record may be interrupted at will and the record forthwith discarded.

Another object of the invention is to provide a record playing and changing apparatus adapted to be used in a radio-phonograph combination, that is to say, either in direct circuit with a radio set or equipped with a conventional oscillator unit cooperable with a radio set, or alone as a record playing and changing unit.

Another object of the invention is to provide a record playing and changing apparatus arranged so that it will start automatically when one or more of the records to be played has been positioned in the apparatus and which will stop automatically when all of the records have been played.

Still another object of the invention is to provide an automatic record playing and changing apparatus which will come to a stop in a predetermined portion of its cycle.

Still another object of the invention is to provide an automatic record playing and changing apparatus constructed so that the likelihood of damage or injury to records by said apparatus is wholly eliminated.

Other and further objects of the invention will be apparent from the following description and accompanying drawings.

Briefly, the invention comprises an automatic record playing and changing apparatus associated with a door or supply magazine, a drawer or discard magazine and two tone arms, one for playing each side of a record, said apparatus and tone arms being arranged to successively play both sides of a record while said record is rotating in a substantially vertical plane. The apparatus is constructed so that a record is automatically removed from the supply magazine or stack of unplayed records (which stack may include records of different diameters) and conveyed by a clamping head to a vertical position in engagement with a turntable. After the record has reached such position, the turntable starts to rotate and drives said record in a forward direction. The tone arm for playing the front face of the record then descends radially to a predetermined position opposite the starting groove at the outer edge of the record. The tone arm is then moved transversely toward the record so that its needle contacts the rotating record for engagement with the starting groove. The starting groove will, of course, auomatically feed the needle into the groove portion of the record containing the recording. In the event that the record lacks a starting groove, a brush having fairly stiff bristles capable of engaging the record groove (when the tone arm is moved transversely toward the record) is attached to the tone arm, and by means of said bristles the tone arm will be gradually moved across the record so that the tone arm needle will eventually enter the recording groove. In either event, the front tone arm will be carried across the face of the record by engagement of its needle in the recording groove.

A counterweight associated with the respective tone arms accurately counterbalances the weight thereof so that even though the tone arms play the record in a vertical position, the needle imposes no side thrust on the recording groove.

After the front side of the record has been completely played, the needle will enter the automatic ejector groove at the center of the record. This groove will be referred to hereinafter as the eccentric groove, and it may be of helical or other suitable conformation. While the needle is engaged with this groove, a trip mechanism associated with the tone arm effects the engagement of a main drive clutch for rotating a main gear and a series of cams for respectively controlling the tone arms, the direction of rotation of the turntable, the record loading and discarding mechanism, and for releasing said main drive clutch after said main gear has been rotated through a predetermined angle. Thus, upon engagement of said drive clutch, the tone arm cam and control mechanism causes the needle to move transversely away from the record, and as soon as the needle is sufficiently withdrawn from the record it is raised upwardly to its initial idle position. It will be understood that the main gear starts to rotate prior to the time that the tone arm is withdrawn from the record, the movement of the tone arm being under the control of the tone arm cam which is rotated with said gear to effect the aforesaid transverse movement of the needle out of the groove.

While the front tone arm is returning to idle position, the drive of the turntable is interrupted by the shifting of a second clutch actuated by the record direction control cam. This shifting of the clutch allows the turntable to momentarily rest in neutral and then resume rotation, but in a reverse direction. After the record has started to rotate in said reverse direction, a rear tone arm adapted to play the rear side of the record begins to move downwardly to a predetermined position opposite the edge or starting groove on the rear side of the record. This tone arm is then moved transversely toward the rotating record so that its needle can engage the starting groove and then play the record in the same manner described in connection with the operation of the front tone arm. It will be understood that the main gear comes to a stop shortly after the needle engages the starting groove.

After the needle of the rear tone arm has played the rear side of the record, it engages the eccentric groove at the center of the record and a trip mechanism associated with said tone arm again actuates the main drive clutch into engagement and the main gear is again driven through a predetermined angle. Here again, the rear tone arm is not moved away from the record until after the main gear starts to rotate. The rear tone arm is then moved transversely away from the record and returned to its initial idle position in the same manner described in connection with the front tone arm.

After the rear tone arm has been disengaged from the record, said record continues to be rotated for a short interval by the turntable. The record discarding and loading mechanism now becomes effective to release the clamping head, but the record continues to spin in a substantially vertical position after the clamping head starts to move away due to its gyrating energy, and without any tendency to follow the clamping head in its retractive movement. As the clamping head moves away from the turntable, the record is stripped off a cylindrical portion of the center pin onto a tapered end portion or point and due to its rotation it rides off the tapered portion and then drops substantially vertically onto a pair of record discarding fingers arranged to cushion and absorb the shock of the fall of the record.

The record discarding fingers are retracted simultaneously with the clamping head and these fingers effect a gentle release of the discarded record onto an underlying inclined surface of a discard magazine while the clamping head moves toward a position to operate an ejecting mechanism to effect ejection of a record from the forward end of the stack. The ejected record is guided by arms and properly indexed by record supporting brackets so that upon return movement of the clamping head the center pin will be aligned with the pin hole in the record and the record will be picked up and conveyed, while impinged upon said center pin, into engagement with the turntable. The cycle will then be repeated.

The apparatus also preferably includes means for automatically starting the same when a stack of unplayed records is positioned on the door and the door is closed, and for automatically stopping the apparatus after the last record has been played. The apparatus may further include manually operated means for actuating the main drive clutch when it is desired to discontinue the playing of either side of a record. The apparatus may still further include means adapting the same to play single-face records, and to repeat the playing of a given side of a record. The apparatus may still further include means for: locking the door and drawer during the record discarding and loading portion of the cycle; stopping the apparatus if the drawer is open at the time for discarding; and stopping the apparatus when a given number of records has been deposited in the discard magazine or drawer. The apparatus preferably still further includes delayed action means for stopping the apparatus in a predetermined portion of its cycle when the main switch is turned off or if the apparatus is stopped as the result of any of the foregoing conditions.

Referring now to the drawings:

Figure 1 is a view partly in section of a record playing and changing apparatus constructed in accordance with the present invention;

Figure 2 is a sectional plan view of the apparatus taken on the line 2—2 of Figure 1;

Figure 3 is a vertical sectional view taken on the line 3—3 of Figure 2 showing a record clamped in playing position against the turntable, and the mechanism for ejecting a record from a stack;

Figure 4 is a fragmentary view of the record ejecting mechanism shown in Figure 3, but with an ejector bar camming the foremost record upwardly over a restraining abutment;

Figure 5 is a perspective view of the slide mechanism for simultaneously actuating the record conveying or clamping head and the record discarding fingers;

Figure 6 is a sectional view taken on the line 6—6 of Figure 3, illustrating the levers for actuating the record ejector bars and the record guide arms for guiding the record into place upon the record supporting or indexing brackets, all parts of the clamping head being omitted for the sake of clarity;

Figure 7 is a sectional view taken on the line 7—7 of Figure 3, with the record shown in dot and dash outline to facilitate illustration of certain parts which would otherwise be concealed thereby;

Figure 8 is a sectional plan view through the post of the clamping head, taken on the line 8—8 of Figure 7;

Figure 9 is a sectional view taken on the line 9—9 of Figure 7, through one side of the frame which carries the clamping head;

Figure 10 is a sectional view taken on the line 10—10 of Figure 3, and particularly illustrating the contour of the various cams carried by the main gear;

Figure 38:
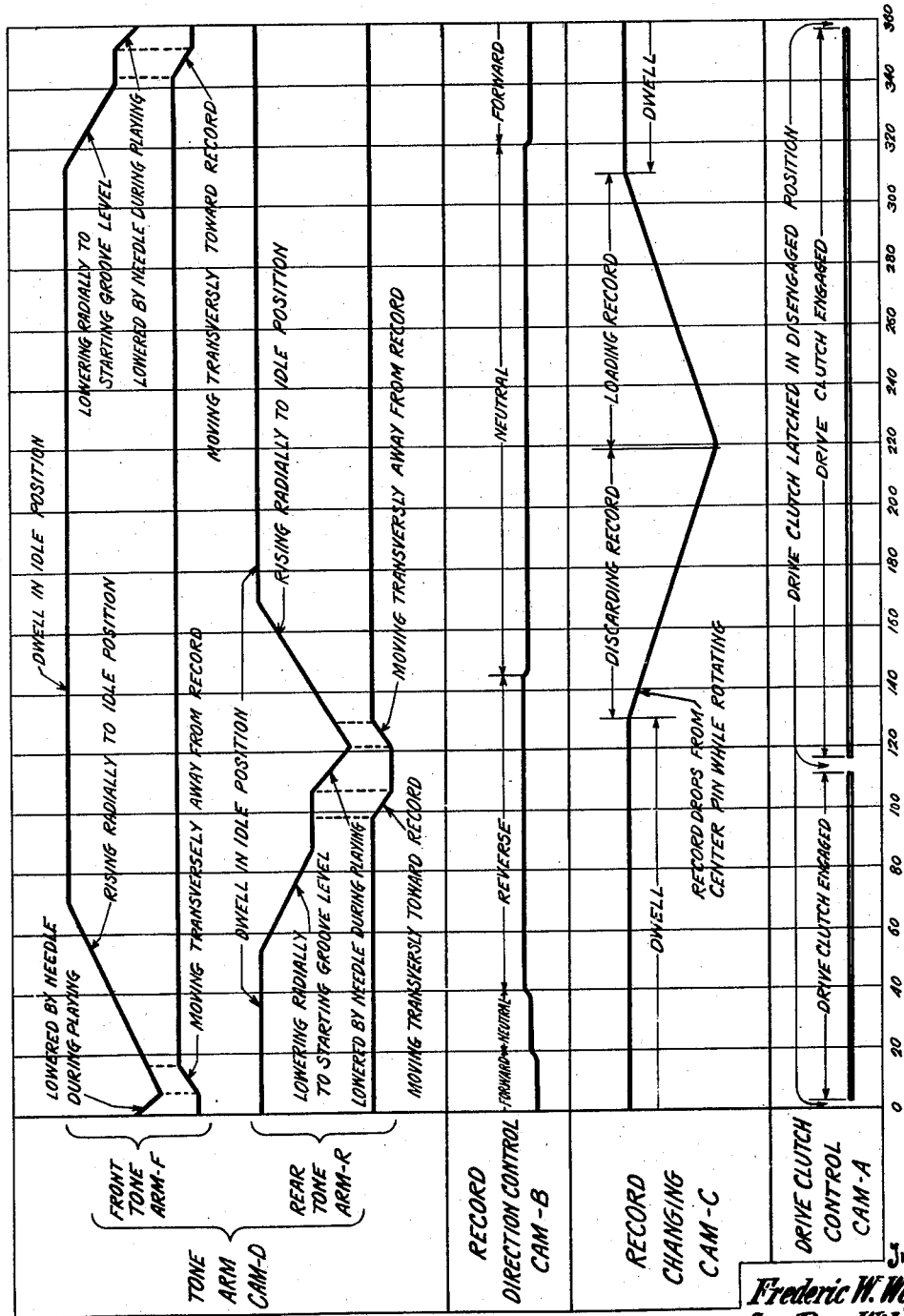
Figure 40:
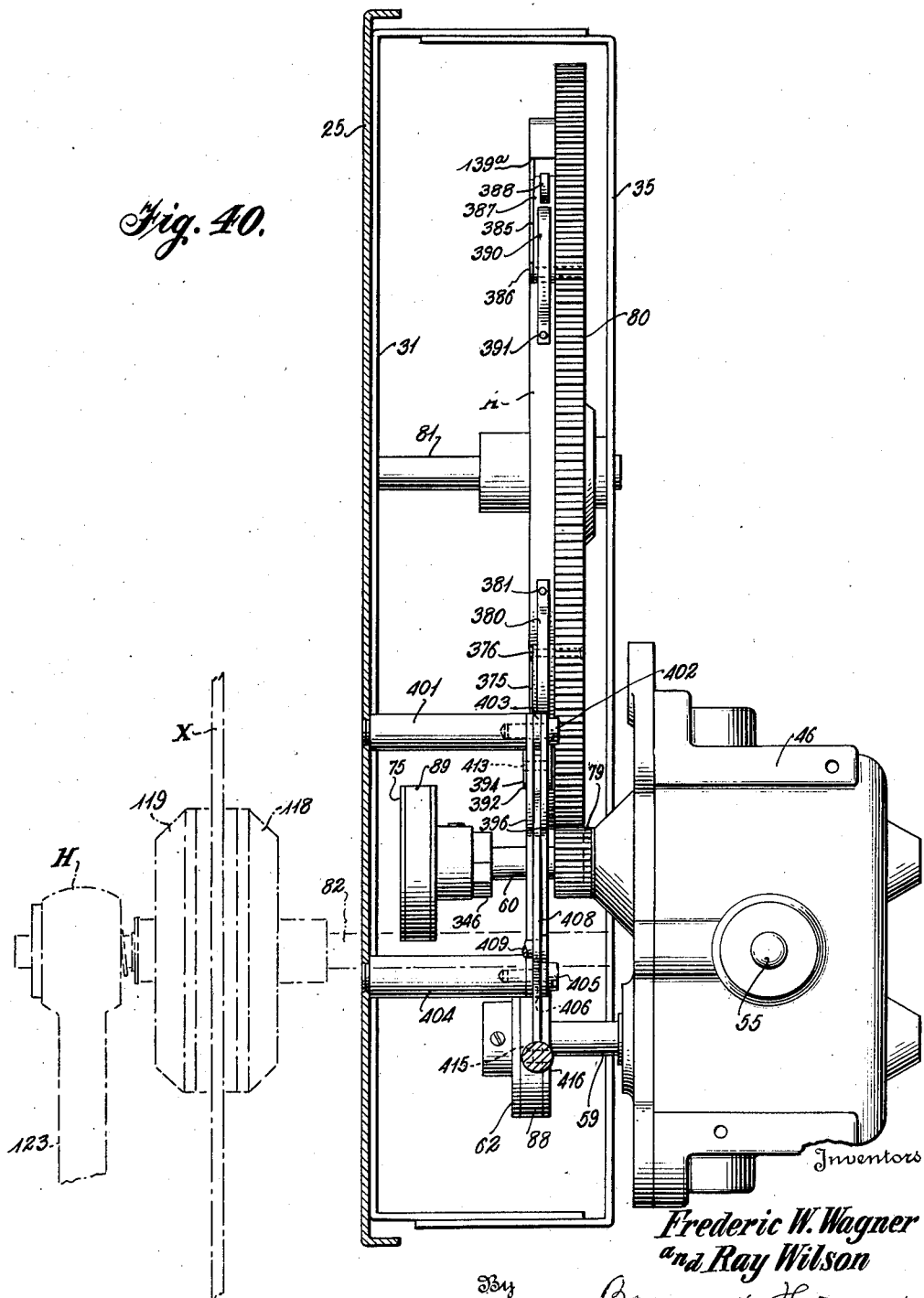
Figure 50:
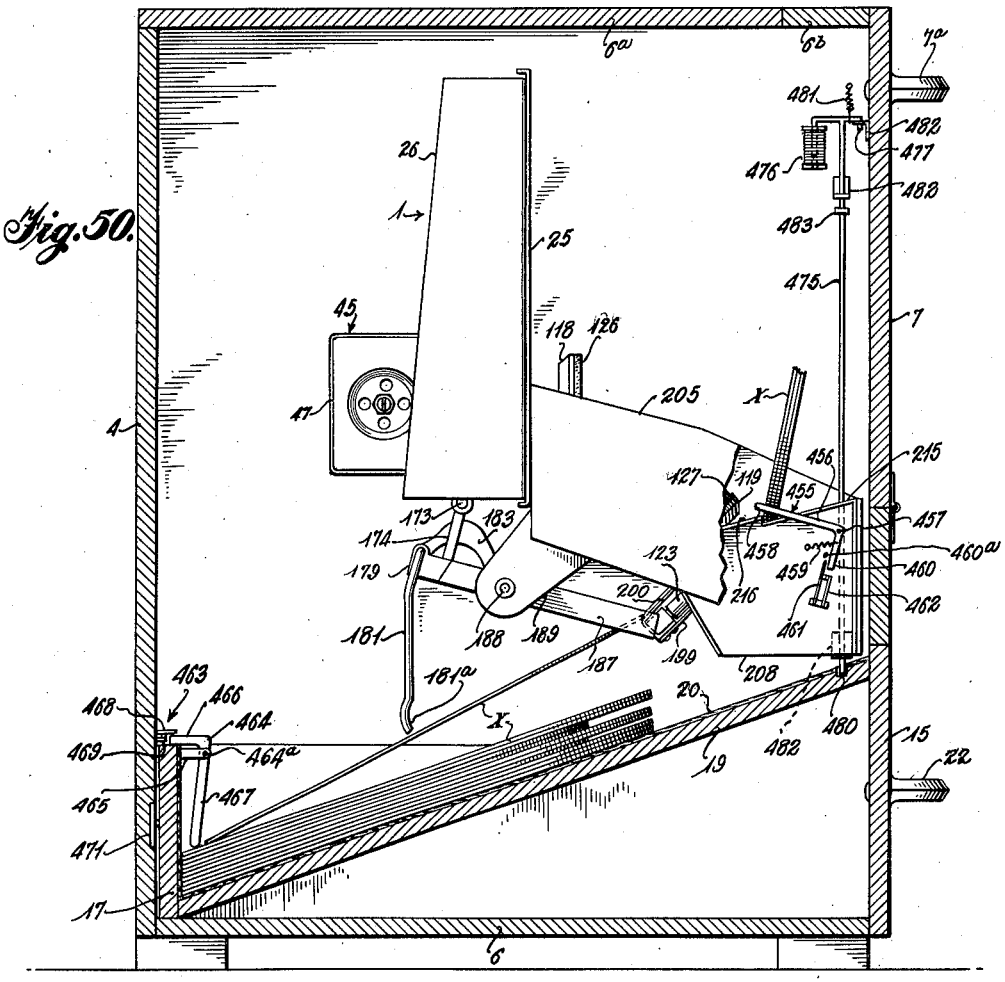
Figure 51:
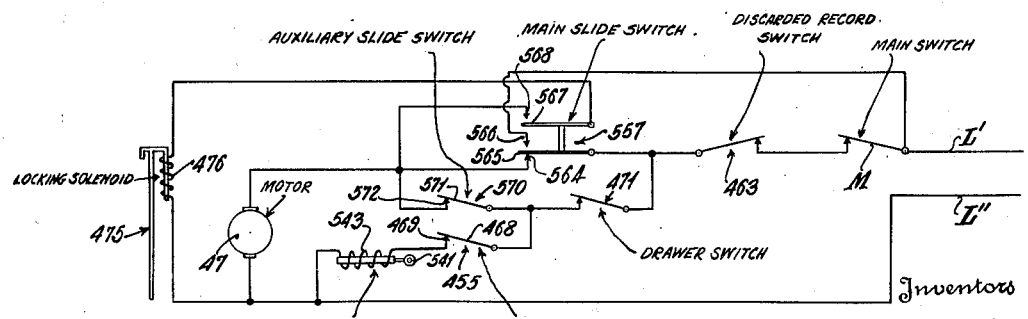
Figure 61:
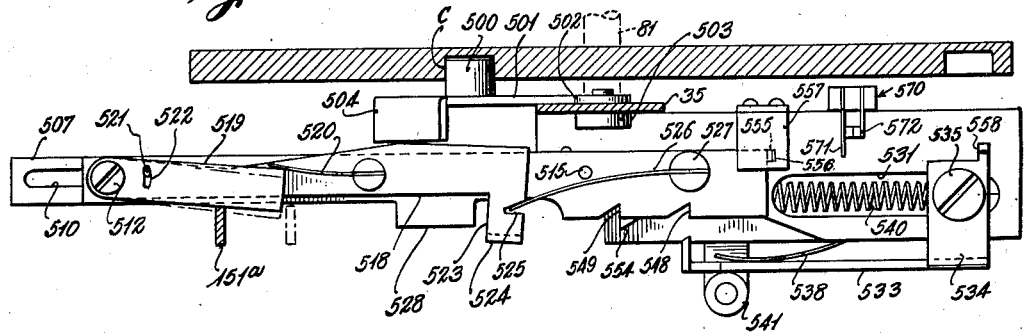
Figure 60:
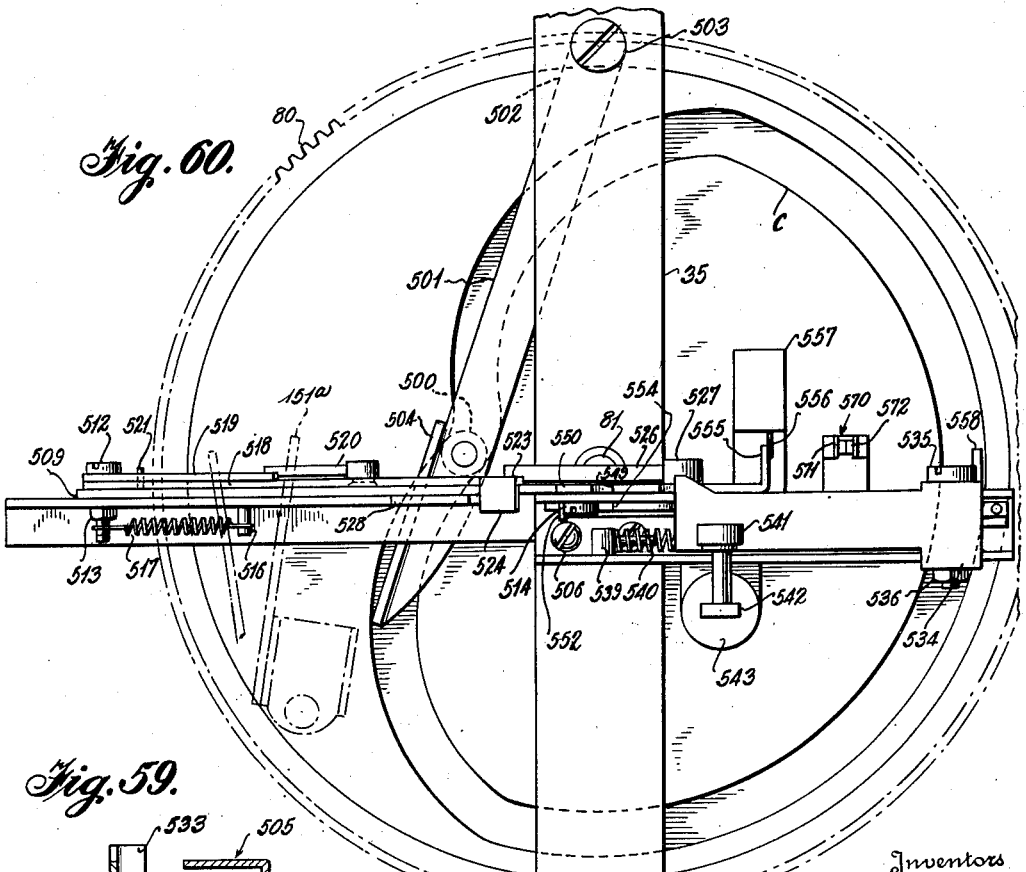
Figure 59:
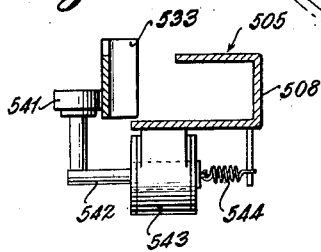

Figure 13 is a sectional view taken on the line 13—13 of Figure 3, showing the tone arm control cam in dot and dash lines and the actuating and clutch trip mechanism for the front tone arm cam in the position it assumes when the needle thereof is at the beginning of the record, and with the tone arm actuating and clutch trip mechanism for the rear tone arm shown corresponding to the idle position of said rear tone arm;

Figure 14 is an enlarged view of the tone arm actuating and trip mechanism for the front tone arm, particularly showing the needle of said tone arm riding in the eccentric groove at the center of the record;

Figure 15 is a view of certain of the parts of Figure 14 shown in different relative positions;

Figure 16 is an enlarged view of the actuating and clutch trip mechanism associated with the rear tone arm and with the needle of said rear tone arm in engagement with the recording-bearing portion of the record groove;

Figure 17 is an enlarged perspective view of the bracket and crank of the main drive clutch actuating mechanism;

Figure 18 is an enlarged sectional view taken on the line 18—18 of Figure 13, showing the details of the turntable, clamping head, and the clutch mechanism for driving the turntable in forward and reverse directions;

Figure 19 is an enlarged plan view of the cam roller and its supporting arm shown in Figure 18;

Figure 20 is an enlarged elevation of the same arm;

Figure 21 is an enlarged sectional view through the tone arms and their associated mechanism taken on the line 21—21 of Figure 7;

Figure 22 is a sectional view through the pivotal support for the front tone arm taken on the line 22—22 of Figure 21;

Figure 23 is a sectional view through the pivotal support for the rear tone arm taken on the line 23—23 of Figure 21;

Figure 24 is a perspective view of a spring element which provides a clutch for frictionally resisting rotation of the respective tone arms relative to a trip arm of the clutch actuating mechanism;

Figure 25 is a detail sectional view taken through the front tone arm on the line 25—25 of Figure 21;

Figure 25a shows a modified tone arm construction in which the reproducing unit carries a small brush suitable for use with records lacking a starting groove to feed the needle into the recording groove;

Figure 26 is a sectional view taken on the line 26—26 of Figure 1 illustrating the relative position of the record supporting arms of the magazine door and the record supporting ways when the door is in closed position;

Figures 27 to 37 diagrammatically illustrate various relative positions of the tone arms, the record ejecting mechanism, the record indexing means, and the clamping head and discarding fingers which occur during a complete cycle of operation;

Figure 38 is a schematic cam diagram graphically illustrating the complete normal cycle of the apparatus, and indicating generally the functions of the various cams which occur simultaneously;

Figures 39 to 43, inclusive, illustrate a modified form of main gear and mechanism associated therewith for adapting the apparatus to play single-face records and/or to consecutively play the front side of a series of double-face records, or the rear side of such series of records;

Figures 44 to 49, inclusive, illustrate various details of a modified structure adapted to provide for a repeat operation, i. e., the repeated playing of a given side of a record;

Figure 50 is a diagrammatic view illustrating certain of the electrical appurtenances that may be included in the apparatus to effect automatic control thereof;

Figure 51 is a diagram of the circuit for effecting the automatic control;

Figures 52, 53 and 54 illustrate a mechanism that may be associated with the tone arm positioning levers to effect automatic tripping of the main drive clutch when there is no record in engagement with the turntable;

Figure 55 is a somewhat diagrammatic view illustrating the record changing cam in the position it assumes during the playing of the front side of a record, and the delayed action mechanism associated therewith for stopping of the apparatus in certain portions of its cycle;

Figure 56 is a plan view of the mechanism shown in Figure 55;

Figure 57 is a sectional view taken on the line 57—57 of Figure 56;

Figure 58 is a sectional view taken on the line 58—58 of Figure 56;

Figure 59 is a diagrammatic view of the solenoid associated with the delayed action mechanism;

Figure 60 is a view somewhat similar to Figure 55, but with the record changing cam shown in the position it assumes during the playing of the rear side of the record;

Figure 61 is a plan view of the mechanism shown in Figure 60; and

Figures 62 to 70, inclusive, illustrate successive positions assumed by the parts of the delayed action mechanism to effect automatic stopping of the record playing and changing apparatus in a predetermined portion of its cycle when the supply of records has become exhausted.

Referring now to Figures 1 and 2, the record playing and changing apparatus or mechanism is generally indicated by the numeral 1. This apparatus may be contained in any suitable enclosure or cabinet 2 comprising a front wall 3, a rear wall 4, side walls 5 and a bottom wall 6. A removable lid 6a provides for easy mounting of the apparatus in the cabinet 2 and further provides for ready access for inspection, lubrication, or other purposes.

The front wall 3 of the cabinet comprises, in part, a magazine door 7 mounted at its lower edge upon a pair of hinges 8. The door 7 may be releasably retained in its closed position by any suitable means, but for purposes of illustration, a simple type of friction catch has been shown, one element 9 of which is fastened to one side wall 5 of the cabinet and another element 9a of which is fastened to the door 7.

A plurality of hinge-like struts 10 are connected to the door 7 and the side walls 5, respectively, to limit the extent of opening of the door 7, as indicated by the dot and dash lines in Figure 1. A handle 7a is mounted on said door to aid in opening and closing the same.

A pair of record supporting arms 11 are mounted in spaced relation on the inner face of the door 7 and these arms are adapted, when said door is opened, to receive thereon a plurality of records X in stack formation. The free ends of the arms 11 are bent upwardly at an angle as indicated at 12 to prevent the records from sliding off said arms when the door 7 is being moved to its normal closed position.

A padded tapered guide 13 is mounted upon the inner face of the door 7 medially of the arms 11 and assures that the records X will always assume an inclined position when the door is closed. A stop 14 depends from a fixed strip 6b at the top of the cabinet, and its lower end is padded to prevent marring any records that may come in contact therewith. The stop 14 serves to preclude rearward tipping of the records should the door 7 be slammed closed suddenly or hard.

A drawer 15 is positioned below the door 7 and slidably rests upon the bottom wall 6 of the cabinet. The drawer 15 comprises a front wall 16, a rear wall 17, and side walls 18. A member 19, which may be considered to constitute the bottom of the drawer, is arranged so that it slopes downwardly from front to back and said member is preferably covered on its upper side with a strip of felt 20. It will be noted from Figure 1 that the felt strip 20 also covers the inner face of the rear wall 17, as indicated at 21. A drawer pull 22 is attached to the front wall 16 to aid in moving the drawer in and out of the cabinet.

The door or magazine 7 and the drawer 15 are so arranged relative to the automatic record playing and changing apparatus 1 that the records X may be successively removed from said stack, played, and then discarded into the drawer 15. The first record discarded will, of course, be deposited upon the felt strip 20 and, in view of the fact that the bottom 19 of the drawer is inclined, said record will slide downwardly by gravity toward the rear 17 of the drawer. The strip of felt permits free sliding movement of the record and also serves as a sort of cushion for the first record to fall upon. Subsequently discarded records are successively piled upon each other in the drawer; no injury to the records occurring as one record slides over the other in view of the fact that the recording is actually at the bottom of the groove and damage which might otherwise occur as one record falls flatwise upon the other is eliminated by the air which forms a cushion between the records as one falls upon the other.

The door 7 and the drawer 15 are further arranged so that both must be in closed position before a fresh supply of records can be played, and neither can be opened during the record discarding portion of the cycle, as will be explained hereinafter.

The record changing and playing mechanism 1 includes a main plate 25 having angle plates 26 secured thereto by screws 27 and integral top and bottom stiffening flanges 28 and 29, respectively. The angle plates 26 serve as a mounting means and these are fastened to the cabinet by bolts 30 extending through the side walls 5 thereof. Any suitable number of bolts 30 may be used. It will be apparent that upon removal of these bolts the mechanism 1 may be removed as a unit from the cabinet 2 for inspection, adjustment, etc.

A strip of metal 31 is secured to the main plate 25 by bolts 32, as best shown in Figure 3. The ends of the strip 31 are bent to provide horizontal flanges 33 and 34. A complemental strip 35, provided with upper and lower flanges 36 and 37, respectively, is arranged in confronting relation to the strip 31 with the flanges of the respective strips overlapped and secured together by bolts 39.

The strips 31 and 35 cooperate to form a mounting on the main plate 25 for a combined motor and speed reduction unit 45. This unit comprises a gear box 46 and a constant speed motor 47. The motor 47 is secured to the gear box 46 by suitable screws 49. The end of the gear box 46 nearest to the motor 47 is mounted upon the strip 35 by screws 50 extending through suitable spacers 51. The other end of the gear box 46 is secured to the main plate 25 by a bracket 52 secured to said gear box by screws 53 and to said main plate by bolts 54.

Figure 11:
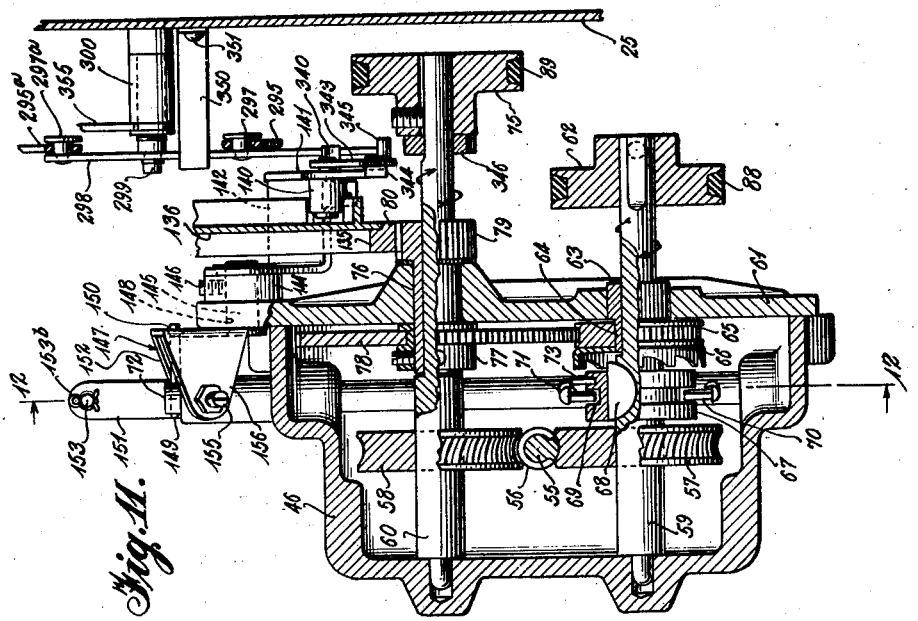
Figure 11 is a sectional view mainly through the gear box of the drive means, taken on the line 11—11 of Figure 12.
Figure 12:
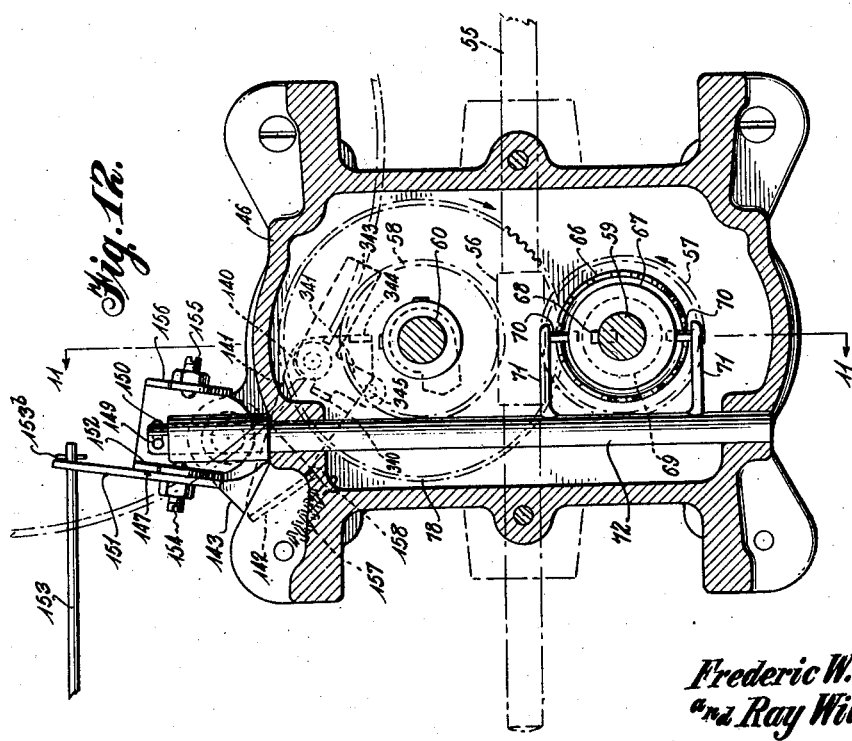
Figure 12 is a sectional view through the same gear box taken on the line 12—12 of Figure 11.

Referring to Figures 11 and 12, a main drive shaft 55 extends from the motor 47 into and through the gear box 46. A worm 56 is carried by the drive shaft 55 and simultaneously meshes with and continuously drives worm wheels 57 and 58, respectively. The worm wheel 57 is secured to a shaft 59 and the worm wheel 58 is secured to a shaft 60. The speed of the motor 47 and the drive ratio of the worm 56 and worm wheels 57 and 58 are preferably such that the shafts 59 and 60 rotate at 78 R. P. M., the conventional speed of phonograph turntables.

The continuously driven shaft 59 projects outwardly beyond a cover 61 for the gear box 46 and has a pulley 62 fixedly secured thereto. A bushing 63 in the cover 61 forms a journal for the shaft 59 and includes a boss portion 64 upon which a pinion 65 and a toothed clutch element 66 are freely mounted, the pinion and toothed clutch element being fastened together by any suitable means to rotate as a unit. A clutch sleeve 67 is mounted for longitudinal sliding movement on the shaft 59, but is prevented from relative rotation with respect thereto by a key 68. The sleeve 67 is provided with a peripheral groove 69 adapted to receive pins 70 projecting from arms 71 secured to a clutch actuating rod 72. The portion of the sleeve 67 between the groove 69 and the toothed clutch element 66 is provided with a radial pin 73 adapted to engage said clutch element 66 when the rod 72 is turned to shift the sleeve 67 along the shaft 59 toward the right as viewed in Figure 11. Thus, while the shaft 59 rotates continuously, the pinion 65 is driven only when the clutch elements 66 and 67 are engaged.

The continuously driven shaft 60 also projects through the cover 61 of the gear box 46 and similarly carries a pulley 75. A sleeve 76 is freely rotatable upon the shaft 60 and extends through the cover 61 into the gear box 46 and has the hub 77 of a gear 78 rigidly secured to one end thereof. The gear 78 constantly meshes with the pinion 65. The opposite end of the sleeve 77 carries a pinion 79 exterior of the gear box 46, said pinion being preferably integral with said sleeve.

It will be evident from the arrows on the shafts 59 and 60 of Figure 11 that these shafts and their respective pulleys 62 and 75 continuously rotate in opposite directions and that the pinion 65 is clutched to the shaft 59 and that then the pinion 79 rotates in the same direction as the shaft 60.

The pinion 79 constantly meshes with a main gear 80 mounted upon a shaft 81 (see Figure 3), the opposite ends of which are supported by bushings 81a mounted in the strips 31 and 35. The main gear 80 carries a drive clutch control cam A for automatically effecting disengagement of the clutch elements 66—67, as will be explained hereinafter. The gear 80 also carries three additional cams: a second cam B designed to control the direction of rotation of a turntable drive shaft to effect rotation in a forward direction while the front side of a record is being played and to reverse the direction of rotation for playing the rear side of a record; a third cam C designed to control the discarding and loading of a record; and a fourth cam D designed to control the movement of the front and rear tone arms F and R, respectively, toward and away from a record, all as will be set forth more fully hereinafter.

Referring now to Figures 3, 13 and 18, a turntable drive shaft 82 is shown supported at one end in a bushing 83 fixed in the strip 35. A second bushing 84 mounted in the strip 31 serves as a support for the opposite end of the turntable drive shaft 82. The shaft 82, of course, projects through an opening 85 in the main supporting plate 25. A pair of loose pulleys 86 and 87 are mounted in spaced apart relation upon the shaft 82. The pulley 86 is driven by a belt 88 from the pulley 62 on the shaft 59, and the pulley 87 is driven by a belt 89 from the pulley 75 on the shaft 60. Inasmuch as the pulleys 62 and 75 are continuously driven in opposite directions, they will drive the pulleys 86 and 87 in correspondingly opposite directions.

A turntable clutch sleeve 90 is longitudinally slidably mounted upon the turntable drive shaft 82 but is restrained from rotating relatively thereto by a key 91. The confronting faces of the pulleys 86 and 87 are each provided with a toothed clutch element 92 and 93, respectively, adapted to cooperate with pins 94 and 95 carried at the edges of the clutch sleeve 90. The clutch sleeve 90 is adapted to be shifted along the shaft 82, by the record direction control cam B. This cam includes a surface 96 (see Figure 10) adapted to actuate a mechanism which will be described below, for maintaining the turntable clutch sleeve 90 in driving relation with the pulley 86 to drive the turntable shaft forwardly to play the front side of the record. The cam B also includes a surface 97 for effecting a shifting of the clutch sleeve 90 into neutral after said front side of the record has been played. Another surface 98 on said cam effects shifting of said clutch sleeve into driving relation with the other pulley 87 to drive the turntable shaft 82 in a reverse direction to play the rear side of the record, and still another surface 99 is provided on said cam for effecting shifting of said clutch sleeve back into neutral.

A bracket 100, see Figure 18, is attached by bolts 101 to the strip 31 directly above the pulleys 86 and 87. The bracket 100 comprises spaced arms 102 which support a clutch actuating shaft 103. Legs 104 project rigidly downwardly from the shaft 103 and are pivotally connected at their lower ends 105 with a yoke 106 cooperable with the turntable clutch sleeve 90 to effect shifting of said sleeve. A torsion spring 107 is associated with each of the legs 104 of the shaft 103 and the arms 102 of the bracket 100 so as to continuously exert force tending to shift the clutch sleeve 90 toward the left as viewed in Figure 18.

A cam roller 108 engages the cam B and is pivotally carried by an arm 109 rotatably mounted upon a hub 110, said hub being secured to the shaft 103 by a set screw 111. A plate 112 is rigidly mounted upon the hub 110 by riveting back a portion of said hub, as shown in Figure 19. Relative radial adjustment between the arm 109 and the plate 112 is provided by forming an elongated slot 113 in the plate 112 and extending the shank of a screw 114 through said opening into a threaded aperture 115 in the arm 109. With the foregoing arrangement, it is possible to effect a slight relative adjustment of the cam roller 108 with respect to the record direction control cam B.

The record direction control clutch 92—90—93, as shown in Figure 18, is in a position for driving a record X during the playing of the front face thereof and the turntable drive shaft 82 will be rotating in the direction indicated by the arrow. In the present construction, the usual large horizontal turntable is dispensed with and the record is supported and driven through a vertical relatively small driving disc or turntable element 118 and a cooperating clamping element or disc 119. The turntable 118 is fastened to the shaft 82 by a set screw 120 or by other suitable means. The clamping element 119 forms part of a clamping head H adapted to hold a record X tightly against the turntable 118. The element 119 is loosely carried by a relatively stationary record center pin 121 mounted in an enlargement 122 at the upper end of a post 123 constituting a part of a record changing mechanism which will be described more fully hereinafter.

The turntable shaft 82 terminates short of the face of the turntable 118 and the center pin 121 is so adjusted relative to the post 123 that it projects into the bore for the shaft 82 provided in said turntable. This end of the center pin 121 is rounded and tapered as indicated at 124. The tapered portion 124 merges into a plain cylindrical portion 125 which is of approximately the same diameter as the pinhole in a conventional record. A portion 121a of the center pin 121 is reduced in diameter forwardly of the cylindrical portion 125 so as to permit the clamping element 119 to have some slight wobble relative thereto, whereby to assure proper alignment of said clamping element with the turn table 118 at all times. A shallow helical groove 125a is cut into the surface of the plain cylindrical portion 125 and extends into the tapered portion 124, to assist in stripping the record from the center pin 121, as will be fully described hereafter.

Annular rings 126 and 127 of yieldable or resilient material, preferably a good grade of sponge rubber, are adhesively secured to the turntable 118 and the clamping element 119, respectively, as illustrated. A spring 128 surrounds the center pin 121 and is interposed between a washer 129 engaging the hub of the clamping disc 119 and the bottom of a recess 130 formed in the post head 122. The spring 128 continuously urges the clamping element 119 toward the left as viewed in Figure 18 and thus causes the resilient annular ring 127 to pressurally engage one face of the record X to thereby urge the opposite face of said record into drive engagement with the resilient annular ring 126 on the turntable 118. With the post 123 in the position shown, rotation will be imparted to the record X through the turntable 118.

The main gear 80, as has been previously stated, is continually in mesh with the pinion 79 formed on the sleeve 76. The gear 80 may include a toothed ring 135 suitably mounted upon the outer edge portion of a disc 136, said disc in turn having a hub mounted upon the shaft 81. The drive clutch 66—67 for the gear 80 is controlled by the cam A carried upon the rear face of said gear, as viewed in Figure 10. The cam A consists of two axially projecting arcuate segments 137 and 138 separated by circumferentially spaced gaps 139 and 139a. A cam roller 140 is shown projecting into the gap 139, latching the clutch 66—67 in idle position.

The cam roller 140, see Figures 11 to 16, is rotatably supported upon an arm 141 of a bracket 142. The bracket 142 is provided with a second arm 143 secured to a hub 144 and said hub in turn is secured to one end of a stud 145 by a set screw 146. The opposite end of the stud 145 is riveted to a yoke 147. Said stud extends through an opening 148 in the cover 61 and is arranged to freely pivot therein. The upper end of the clutch actuating rod 72 projects between arms 152 and 156 of the yoke 147, as best shown in Figure 12. A pin 149 extends radially from the upper extremity of the rod 72 into an opening 150 of slightly larger diameter in the yoke 147. An upright arm member 151 is mounted upon the arm 152 of the yoke 147 and a rod 153 having a knob 153a on one end thereof exterior of the cabinet 2 is connected at its opposite end by a cotter pin 153b with said upright member for manually actuating the yoke 147 to effect engagement of the drive clutch 66—67.

An adjustable stop element 154 is carried by the yoke arm 152 and a similar stop element 155 is carried by the other yoke arm 156 to adjust the pivotal travel of the yoke 147 necessary to effect engagement and/or disengagement of the drive clutch 66—67. It will be apparent that as the yoke 147 is turned upon the pivot 145, it in turn will rotate the drive clutch actuating rod 72 through its connection with the pin 149.

A spring 157 has one end thereof secured to a projection 158 extending from the bracket 142 and the opposite end of the spring is conveniently secured to the gear box supporting bracket 52, as shown in Figure 10. It will be apparent from this figure that the spring 157 continuously tends to pivot the yoke 147 and the bracket 142 about the stud 145 in a clockwise direction. An automatic trip mechanism for raising the roller 140 out of latched position to effect automatic tripping or engagement of the clutch 66—67 will be described more fully hereinafter. It is pointed out here, however, that upon movement of the bracket 142 in a counterclockwise direction against the action of the spring 157, the drive clutch 66—67 will be engaged and the main gear 80 will be driven through the pinion 79. The roller 140 meanwhile will ride upon the inner surface of the segment 137 of the drive clutch control cam A until said gear has rotated through a sufficient angle to place the gap 139a in radial alignment with said roller, whereupon the spring 157 will immediately pull the roller down into said gap and thereby effect a return movement of the bracket 142 and yoke 147 to actuate the rod 72 and effect disengagement of the clutch 66—67. Dislodgement of the roller 140 is again effected automatically by the tripping mechanism to be described later, and said cam roller then rides upon the inner surface of the segment 138 until the gap 139 again becomes aligned with the roller 140, whereupon said roller drops down into latching position, again effecting disengagement of the clutch 66—67. Thus, the main gear 80 is intermittently rotated and stopped in two different positions under the control of the cam A.

The record changing cam C, see Figure 10, is the only cam located on the rear face of the main gear 80. This cam comprises a continuous groove having a concentric dwell portion 158a and curved non-concentric active portions 159 and 160, respectively. A follower or roller 161 is received in the cam groove and is rotatably mounted upon a vertical slide 162. The slide 162 is channel-shaped in cross section and is arranged so that the gear box supporting strip 35 is received as a guide between the legs defining the channel, as best shown in Figure 5. The slide 162 is provided with an elongated slot 163 through which the turntable drive shaft 82 extends. A pair of dowel pins 164 is mounted at the lower end of the slide 162 adjacent one side edge thereof and these pins are adapted to cooperate with correspondingly spaced openings formed in a flange 165 projecting at right angles from a leg 166. A similar dowel arrangement 167 is provided at the opposite side edge of the slide 162 and cooperates with a flange 168 of a leg 169. The flanges 165 and 168 of the legs 166 and 169, respectively, are engaged by an angle bracket 170 which thus forms a cooperating guide for the slide 162. The angle bracket 170 is secured to the flange 34 of the strip 31 and the flange 37 of the strip 35 by bolts 171, as clearly shown in Figure 3.

The lower extremities of the legs 166 and 169 are provided with openings 172 adapted to receive pivot pins 173, see Figures 3 and 10, for securing the upper ends of links 174 to said legs. The lower ends of the links 174 are connected by a pin 175 to lugs 176 extending from a side 177 of an oblong-shaped frame 178. The side 177 is also provided with lugs 179 which are of relatively greater length and are spaced farther apart than the lugs 176. The lugs 179 are apertured to receive and pivotally support angular extensions 180 of a pair of record discarding fingers 181. These fingers are preferably made arcuate at their spaced free ends 181a to facilitate retention of a record thereon during the discarding operation. The opposite and adjacent ends of the extensions 180 are received in a hub 182 secured to a generally crescent-shaped cam 183. A torsion spring 184 includes a coiled portion encircling the hub 182, and one end of said spring is arranged to press against the side 177 of the frame 178 and its opposite end is hooked around the cam 183, as best shown in Figure 3. The record discarding fingers 181 are held against relative rotation with respect to each other and relative to the hub 182 by set screws 185 mounted in said hub and engaging the portions 180.

A follower plate 186 is positioned between the slide legs 166 and 169 and is secured to the under side of the flange 37 of the gear box supporting strip 35 by the same bolts 171 that hold the angle guide bracket 170 in position. The lower edge of the follower plate 186 is preferably rounded and adapted to cooperate with the convex surface of the crescent-shaped cam 183 to control the movement of the record discarding fingers 181 when the slide 162 is being moved upwardly, as will be clear hereinafter.

The oblong frame 178, see Figure 10, has its opposite ends 187 pivotally mounted at 188 for oscillatory movement upon brackets 189 secured to the main plate 25 by bolts 190 extending through said plate and through flanges 191 formed on said brackets.

Referring now to Figures 7 to 9, the frame 178 has a side 177a provided medially of its length with an enlarged portion 195 adapted to receive a square shank portion 196 formed at the lower end of the post 123. As is best shown in Figure 8, the shank 196 of the post 123 is adapted to be adjustably clamped relative to the enlargement 195 by a plate 197 held against said shank by screws 198 threaded into said enlargement. This adjustment provides for accurately aligning the center pin 121 with the axis of the turntable drive shaft 82. The screws 198 also serve to mount a flat strip 199 in fixed superposed relation upon the plate 197, whereby when the frame 178 is oscillated by the slide 162 to the position shown in dot and dash lines in Figure 3, said strip will actuate a pair of levers of a record ejecting and indexing mechanism, as will be described more fully hereinafter.

The frame 178 also carries a buffer 200 which has a lower flanged portion 201 secured to the undersurface of the side 177a of the frame 178 by screws 202. The face of the buffer 200 remote from the post 123 is padded or covered with a strip of felt 203. The inner portion and top edge of the side 177a is also covered with strips of felt 204, as shown in Figures 7 to 9. The purpose of the felt 203 and 204 is to prevent marring of the record during discarding.

It will be noted at this point that upon rotation of the record changing cam C, the active groove portion 159 will actuate the roller 161 to cause the slide 162 to be moved upwardly and that the active groove portion 160 will effect a return of said slide to its initial position. The links 174 will accordingly oscillate the frame 178 and the clamping head H carried thereby about the frame pivots 188 to release or discard a played record and to pick up an unplayed record, as will be apparent hereinafter.

Referring again to Figures 1 and 2, it will be seen that extensions 205 are arranged substantially parallel with the side walls 5 of the cabinet 2 and extend forwardly from the main plate 25. One end of each of said extensions is secured by screws 206 to one of the frame supporting brackets 189. The opposite ends of said extensions are connected together by a plate 207 arranged adjacent to and substantially parallel with the front wall 3 of the cabinet. The plate 207 may be connected with the extensions 205 by welding or any other suitable means.

A pair of record supporting brackets or ways 208 are connected together by struts 209 and 210 flanged at their opposite ends and connected to said brackets by bolts 211 and 212, respectively. The sides of the brackets 208 adjacent the plate 207 have a flange 213 (see Figure 6) and this flange is connected with the plate 207 by bolts 214. The upper edge of each of the ways 208 is provided with offset inclined surfaces formed by flanges 215 and 216, respectively, separated by an abutment 215a. The corners of said inclined flanges are preferably rounded as shown in Figure 26 so as to permit free sliding by gravity of records relative to said flanges. It will be noted from this figure that when the door 7 is in closed position, the weight of the records is borne by the ways 208 and the arms 11 are lowered so as not to interfere with the ejection of the record from said ways, as will be described hereinafter.

The ends of the bracket 208 opposite the flanges 213 are bent in opposite directions away from each other to form flanges 217 of substantial area, as best shown in Figure 6. Each of the flanges 217 has a record guide arm 218 pivotally mounted thereon by a pivot pin 219. An actuating lever 220 is pivotally mounted upon each of the flanges 217 by pivot pins 221. The levers 220 have an offset portion 222 arranged to clear the pivot pins 219. Each of the levers 220 carries a projection 223 adapted to cooperate with the convex side of a curved portion 224 formed at the lower end of the record guide arms 218. The record guide arms 218 are constrained medially of their length by straps 225, one end of each of which is secured at 226 to the flanges 217 and the opposite end of which is fastened at 227 to the ways 208. The straps 225 are spaced from the flanges 217 a distance only slightly greater than the thickness of the guide arms 218 to thereby provide in effect a narrow slot 225a for said fingers to move in. Each of said straps has an offset portion 228 which serves as a stop for limiting the retractile movement of said guide arms. A spring 229 has one end thereof connected to the record guide arms 218 at a point between the pivot pin 219 and stop 228 and its opposite end is connected to the flange 217 and serves to yieldingly maintain said guide arms in their normally retracted position.

The strip 199, which is carried by the pivotally mounted frame 178, is adapted to engage the levers 220 adjacent their free ends to cause said levers to fulcrum about their pivot pins 221 as the post 123 is moved toward the position shown in dot and dash lines in Figure 3; the levers 220 then assuming the relative positions shown in dot and dash lines in Figure 6 and the record guide arms 218 being advanced to the position similarly shown by the engagement of the projections 223 with the lower curved portions 224 of said arms.

During the course of the downward movement of the levers 220, said levers also engage the free end 230 of levers 231 (see Figure 3) pivotally mounted upon pins 232 carried by each of the ways 208. The opposite end 233 of the levers 231 is provided with an elongated slot 234 adapted to receive a pin 235 projecting from vertically movable record ejector bars 236. Each of the ejector bars 236 is arranged adjacent to the strut 210 and is constrained for vertical movement by guides 237 secured to the ways 208 by screws 238. A torsion spring 239 is wound around each of the pivot pins 232 and one end thereof is secured by the screws 238 of the lower guide 237, and the opposite end of said spring overlies the levers 231 between the pivot pins 232 and the projections 235, whereby to normally continously urge the ejector bars 236 downwardly toward inactive position.

The upper portions 240 of the ejector bars 236 are reduced in width and the side of the reduced portion remote from the strut 210 is curved to provide a cam surface 241 terminating in a sharp end 242, and the side 243 opposite the cam surface 241 terminates at a shoulder 244. The function of the cam surface 241 and the straight portion 243 will be pointed out hereinafter.

A pair of record indexing or positioning brackets 245 (see Figures 2, 3 and 6) are each provided with a vertical flange 246 and are held in place by screws 247 passing through elongated slots 247a in the frame supporting brackets 189 and the extensions 205, said screws being threaded into suitable apertures in the flanges 246. The brackets 245 may obviously be adjusted relative to their supporting means by virtue of the screws 247 and slots 247a.

The record positioning brackets 245 are of special shape and of generally stepped configuration, and are designed to support and index a record in an inclined position, after it has been released or ejected from the stack, so that the pin hole of the record registers accurately with the center pin 121 of the clamping head H, as said clamping head returns to its upright position. The brackets 245 preferably have the upper surface thereof covered with a layer of felt 248 to prevent marring of a record as it slides into position thereon. The upper surfaces of the brackets 245 are inclined downwardly toward the rear 4 of the cabinet 2 and one such surface 249 merges into a substantially upright portion 250. The upright portions 250 in turn diverge toward the front 3 of the cabinet and are spaced the proper distance apart to engage the outer edge of, and to form indexing stops for, a conventional ten-inch record X' (shown in dot and dash lines), whereby to prevent said record from moving forward beyond a position suitable for registration with the center pin 121. The inclined surfaces 249 meanwhile support the weight of the record and position it on an angle corresponding substantially to that assumed by the clamping head H as the center pin 121 is about to enter the pin hole in said record.

A second inclined surface 251 on each of the record positioning brackets 245 merges into a second substantially upright portion 252. These portions are adapted to cooperate with a conventional twelve-inch record (not shown) to properly position it to be picked up by the clamping head H in a manner similar to that described in connection with the conventional ten-inch record X'. While the record positioning or indexing brackets 245 have been designed to handle standard ten and twelve inch records, the same may obviously be adapted or adjusted to handle records of other sizes, or any suitable number of different sizes.

It will be apparent from the foregoing, that when the strip 199 engages the adjacent ends of the levers 220, said levers will start to move downwardly into engagement with the ends 230 of ejector bar actuating levers 231 to thereby cause an upward movement of said ejector bars. As the portion 240 of the respective ejector bars 236 engages the stack of records, the sharp end 242 lines up with the front edge of the second record and seeks to gain entrance between the foremost record and said second record. Continued upward movement of said ejector bars causes the cam surface 241 thereof to raise the foremost record bodily and cam it over the abutment 215a onto the inclined flange 216, as illustrated in Figure 4. The straight side 243 of said ejector bars meanwhile engages the second record and restrains it from advancing on the inclined flange 215 while said first record is being raised above the abutment 215a. Simultaneously, the levers 220 will have caused the record guide arms 218 to have advanced to the position shown in dotted lines in Figure 6 to intercept the ejected record.

It will be apparent that upon ejection of the foremost record, the lower edge of said record will slide downwardly on the inclined flanges 216 until it engages the record guide arms 218 immediately adjacent the curved portions 218a (see Figure 6). As the clamping head H begins to return to its initial vertical position, the strip 199 will allow the adjacent ends of the levers 220 to rise, with the result that the record guide arms 218 will be gradually released. The edge of the record will then engage the curved portions 218a, and the springs 229 will act to return said arms to their initial position. Inasmuch as the ejected record bears against the guide arms 218, its weight will assist to some extent in spreading said arms apart to effect their return to inactive position.

It will be understood that the record indexing brackets 245 and the inclined record-stack supporting flanges 216 are so disposed relative to each other that the ejected record in sliding downwardly must assume a position overlying said brackets. Furthermore, it will be observed that the plane of travel of the record guide arms 218 is immediately adjacent the rear end of the record indexing brackets 245 so that, as said arms move apart, the record is permitted to engage with and then slowly slide downwardly upon the surfaces 249 or 251 (depending upon the size of the record) into engagement with the generally upright stops 250 or 252.

Assuming that a ten-inch record is being loaded and that said record has been deposited upon the indexing brackets 245, the record will momentarily come to rest against the stops 250, but immediately thereafter the center pin 121 will enter the pin hole in the record and the clamping head H will then lift the record from the bracket 245 and convey said record, while impinged upon said center pin, to a vertical playing position against the turntable 118.

Simultaneously with the return of said record guide arms, the ejector bars 236 will recede or be withdrawn and the record previously restrained from sliding movement by the straight side 243 of said ejector bars will be allowed to slide into engagement with the abutment 215a. The remaining records in the stack, of course, also slide down correspondingly.

Retraction of the clamping head H will, of course, release a record held in vertical position for purposes of discarding. One of the novel features of the invention is that the record continues to rotate for a short interval after both sides have been played, prior to discarding. This enables the clamping head H to be withdrawn before the record begins to fall by gravity, as will be clear from the following.

The record direction control cam B is so designed that the record will continue to be positively driven at the start of the retractive movement of the clamping head H and this positive drive will continue until after the clamping element 119 has been moved by the post 123 through an angle sufficient to relieve the compressed spring 128, whereupon said spring will shift said clamping element longitudinally on the center pin 121 until it engages the cylindrical portion 125 of said center pin. During this shifting period, the record will still be driven, although the clamping pressure has been substantially relieved. The shifting of the clamping element 119 also assists in stripping the record from the cylindrical portion 125 of the center pin by moving it into contact with the helical groove 125a cut therein which causes the record to move longitudinally of said center pin. Due to this action and to the fact that the inertia of said record continues its rotation in a substantially vertical plane, the record will ride onto the tapered end of said pin without any tendency to follow the clamping head during its retraction, and then drop onto the record discarding fingers 181. A twelve-inch record, of course, will drop a lesser distance than a ten-inch record before its fall is broken by said record discarding fingers.

It will be obvious from Figures 3 and 7 that the record discarding fingers 181 will be in a position to intercept the record as it falls. Inasmuch as the record discarding fingers 181 are normally retained in their uppermost position by the torsion spring 184, these arms will yield, and their free ends 181a will move downwardly under the force of the impact of the record and the shock of the fall will be absorbed by the spring 184. The record discarding fingers 181 recede simultaneously with the retraction of the clamping head H, to their respective positions shown in dot and dash lines, the record meanwhile falling free of said fingers and landing upon the inclined bottom 19 of the drawer 15, or upon a previously discarded record in said drawer.

The clamping head H and the record discarding fingers are actuated by the slide 162 controlled by the record changing cam C. The cam portion 159, when engaged with the roller 161, will cause the slide 162 to rise and thereby oscillate the frame 178 about its pivots 188 so as to release the clamping head H. One the other hand, the cam portion 160 will cause the slide to move downwardly to its initial position, returning the clamping head H with a record thereon to active position against the turntable 118 and restoring the record discarding fingers 181 to a position adjacent the lower edge of the record.

After the clamping head H has positioned the record against the turntable 118 for playing, the record direction control cam B will actuate the clutch member 90 to drive said turntable in the proper direction to effect playing of both sides of the record, as previously described. The tone arm control cam D simultaneously functions to control the movements of the front and rear tone arms, F and R, respectively.

The tone arm control cam D is the innermost cam carried by the front face of the main gear 80. This cam comprises a concentric surface 259 which extends through an angle in excess of 180°. The cam D also includes a pocket portion 260, and a substantially straight surface 261, and two non-concentric arcuate surfaces 262 and 263, respectively, connecting said pocket with said concentric portion. A cam roller 264, adapted to control the movements of the front tone arm F, rests in the pocket 260 during the playing of the front side of the record X, as indicated in Figures 10 and 14.

The roller 264 is mounted upon a lever 265 pivotally mounted at its upper end 266 upon a stud 267 secured to the main plate 25 (see Figure 21). The lower end of the lever 265 is pivotally connected at 268 to one end of a link 269, said link having an elongated slot 270 at the opposite end thereof. A counterweight plate 271 is provided with a pivot pin 272 for connecting the same with the slotted end of said link.

The counterweight plate 271 is fixedly secured to a hub 273 which in turn is mounted upon a hollow sleeve 274 by a set screw 275. A counterweight 276 is fixed to the plate 271 and is adjustable relative to a counterweight arm 277 secured to the hub 273 by means of a seat screw 278 threaded into said arm and an elongated slot 279 formed in said plate (see Figure 14). The set screw 275 permits adjustment of the counterweight 276 with respect to the tone arm F and this adjustment is preferably such that it accurately counterbalances the weight of said tone arm so that side thrust on the recording groove is reduced to a minimum. The adjustment of the counterweight provided by set screw 278 permits the tone arm F, which is associated as stated with the counterweight 276, to properly align the needle N, which it carries, with the starting groove of the record X when the counterweight arm 277 is positioned as stated hereinafter.

Reverting to Figures 21 and 22, the sleeve 274 is rotatably mounted in a hollow tubular journal 280 having a flange 281 secured to the main plate 25 by screws 282. The end 283 of the sleeve 274 remote from the hub 273 is fixedly secured to a hollow casing 284 which forms one end of the tone arm F. The sleeve 274 is prevented from moving longitudinally relative to the support 280 by a split contractile thrust ring 285 seated in a groove 286 formed in said sleeve at the rear end of said journal. An annular washer 288 surrounds the sleeve 274 and frictionally engages the thrust ring 285.

A trip arm 289 is mounted for relative rotational movement upon the sleeve 274 and a spring strip 290 is similarly mounted upon the sleeve 274 but includes a depending lobe 291 which is attached to said trip arm by a rivet 292. The portion of the spring strip 290 above the lobe 291 is dished, as best indicated at 293 in Figure 24. The dished portion 293 of the spring is positioned with its convex side against the loose washer 288 to urge said washer against the thrust ring 285 and to urge the trip arm 289 against the hub 273 so as to provide a friction clutch resisting turning of the sleeve 274 with respect to said trip arm.

The lower extremity of the trip arm 289 is pivotally connected at 294 with one end of a trip link 295. The opposite end of said link is provided with an elongated slot 296, and a pin 297 carried by a trip lever 298 extends into said slot. The trip lever 298 is fulcrumed at 299 upon a stud 300 carried by the main plate 25, see Figure 11.

Referring now to Figures 13, 14 and 21, the counterweight arm 277 includes an offset portion 303 and an extension 304 curved upwardly at its free end to provide a cam portion 305. The cam portion of said arm is adapted to cooperate with a projection 306 carried by a tone arm positioning lever 307. The upper end of the lever 307 is pivotally mounted at 308 upon a stud 309 carried by the main plate 25. A torsion spring 310 is mounted upon the pivot 267 and one end thereof overlies the lever 307 and its opposite end is hooked around the stud 309, whereby a spring force is provided tending to continually urge the lever 307 downwardly. The lower end 311 of the lever 307 is twisted through an angle of 90° relative to the plane of said lever. A latch or finger 312 is pivotally connected at 313 to said twisted end of said lever and projects through a generally arcuate slot 314 in the main plate 25. The lower wall of the slot 314 is defined by a smooth curve, whereas the upper wall defining said slot is notched to provide shoulders 315 and 316. These notches cooperate with the latch 312 to stop the front tone arm F in a predetermined position relative to a record so that its needle N will enter the starting groove S of ten-inch and twelve-inch records, respectively, as will be pointed out more fully hereinafter. It will be understood, however, that any suitable number of notches may be provided in the slot wall to take care of records of diameters departing from the conventional or standard size records.

A cable bracket 320 is secured to the main plate 25 by screws 321. The bracket 320 is arranged adjacent to the hub 273 and includes a laterally projecting flange 322 carrying a pin 323. The pin 323 is arranged so that it extends transversely across the end of the hollow sleeve 274.

One end of a tension spring 325 is connected to the link 269 and the opposite end of said spring is connected to one end of a flexible cable 326. The cable 326 extends over the pin 323 and through the hollow sleeve 274, and its opposite end is connected at 327 to a strip 328 of the front tone arm F, as best shown in Figures 21 and 22. The strip 328 is slit and reversely bent intermediate its ends to provide a passage for a pivot rod 329 carried by the hollow casing 284.

A spring strip 330 is connected at 331 to the tone arm strip 328 and its free end engages the adjacent wall of the casing 284. The opposite end of the tone arm strip 328 carries a conventional electrical phonograph pickup 332 having the needle N mounted therein. The spring strip 330 is arranged so that it normally tends to urge said needle toward the front face of the record X. However, it will be apparent that said needle is precluded from engaging said record except when the pull on the flexible cable 326 is relaxed, thereby allowing the spring 330 to cause the strip 328 to pivot about its pivot rod 329 and move the needle laterally into engagement with the record.

The manner in which the front tone arm F is operated and controlled is as follows:

Assuming that a twelve-inch record has been picked up by the center pin 121 and has been conveyed to playing position by the clamping head H, and that the turntable 118 has begun to drive said record in a forward direction, the portion 263 of the tone arm control cam D will then be engaged with the roller 264 and consequently the lower end of the lever 265, and the link 269 connected thereto will be free to move toward the right, as will be understood from Figure 13. This relieves the positive force applied to said lever and link by the concentric portion 259 of the cam D to maintain the tone arm F in its idle raised position against the downward force of the spring-pressed tone arm positioning lever 307. The tone arm positioning lever 307 can now move downwardly until the latch 312 carried at its twisted end 311 engages the periphery of the rotating record, whereupon said latch is instantly flipped upwardly clear of the record by the rotating record itself and into engagement with the notch 316 to lock said lever against further downward movement, as will be apparent from Figure 7. The pivot connection 313 at this time extends substantially radial to the axis of the record so that movement of the latch 312 by the rotating record is in a direction substantially tangential to the periphery of said record. Simultaneous with the downward movement of the lever 307, the tone arm F is forced downwardly through the coaction of the projection 306 and the cam surface 305 on the counterweight arm extension 304. The parts are so designed that when the latch 312 is engaged in the notch 316, the tone arm F will have been forced down, against the opposition offered by the counterweight 276, to a predetermined position such that its needle N is disposed opposite the starting groove S at the edge of the record. The foregoing movement of the lever 265 and link 269 also relieves the tension on the spring 325 and cable 326, but not enough to allow the needle N to move laterally toward the record. Furthermore, the described movement of the tone arm F does not interfere with the release of the spring tension in view of the lost motion connection between the counterweight plate 271 and the link 269. Similarly, the trip arm 289 can move through the same angle as the tone arm F because of its frictional connection therewith, the slot 296 providing a lost motion connection between said arm and the trip lever 298.

Continued rotation of the tone arm positioning cam D next brings the cam surface 262 into engagement with the roller 264, and while these parts are engaged, the tension in the spring 325 is further and completely released so that the slack in the cable 326 allows the needle carrying end of the tone arm F to be moved laterally by the spring 330 toward the record so that the needle can engage the starting groove S. The cam D then comes to rest with the roller positioned in the pocket 260, as shown in Figures 10 and 14. The roller 264 does not necessarily contact the cam surface at this time, since the tension normally exerted by the spring 325 tending to pull the link 269 toward the right is relaxed, permitting the associated linkage to hang free. The pressure applied to the tone arm F by the spring 330 is preferably only sufficient to maintain the needle N in proper reproducing engagement with the recording groove.

As the tone arm F is carried across the face of the record by engagement of the needle N in the recording groove, the trip arm 289 will tend to move through a corresponding angle by virtue of the frictional connection provided by the dished spring 290. However, the trip arm 289 is provided to cooperate with the tone arm F to automatically trip or effect engagement of the drive clutch 66—67 at the end of the playing of a record, as has been previously indicated, and this is accomplished by the following novel mechanism without requiring said trip arm to move through the same angle as the tone arm.

The trip lever 298 (see Figures 13 and 14), which is connected with the slotted end of the trip link 295, has its lower end arranged to cooperate with a lateral projection 340 extending from an arm 341 of a crank 342. The crank 342 is pivotally mounted upon the bracket 142 on the same pivot that carries the roller 140 associated with the cam A for latching the drive clutch 66—67 in disengaged position. A second arm 343 of the crank 342 is of greater length than the arm 341, and therefore is heavier and, in effect, serves as a counterweight to normally maintain the projection 340 urged toward the lower end of the trip lever 298. A projection 344, extending laterally from the arm 141 of the bracket 142, limits the downward pivotal movement of the arm 243, as shown in Figure 13.

The arm 341 of the crank 342 carries a pin 345 at its lower free end adapted to cooperate with a lug 346 positioned adjacent the pulley 75 on the continuous rotating shaft 60 (see Figure 11). The lug 346 is provided with a concentric cam surface 347 which merges into a nonconcentric cam surface 348 at a shoulder 349. The lug 346 functions to "kick" back the pin 345 during a portion of the playing cycle and to eventually positively engage said pin to cause the bracket 142 and the yoke 147 to simultaneously pivot upon the stud 145 and actuate the rod 72 to effect engagement of the clutch 66—67 at the proper time to effect driving of the main gear 80 and its associated cams, as will be clear from the following:

As the needle N of the front tone arm F gradually moves toward the center of the record, the trip arm 289 will also tend to rotate in the same direction in view of its frictional connection therewith. During the playing of the early part of the record, the lug 346 fails to engage the pin 345 because said pin is held out of the path of travel of said lug by the counterweight crank arm 343, as shown in Figure 13. The trip arm 289 continues to turn with the tone arm F carrying the trip link 295 along with it, but no turning effort is applied to the trip lever 298 until the end of the slot 296 engages the pivot 297. Continued movement of the trip arm 289 then tends to drag the trip lever 298 along with it, and this causes said trip lever to turn about its pivot 299 so that the lower end of said trip lever is urged against the projection 340 tending thereby to rotate the crank 342 about its pivot. In this manner, a definite pull is applied to the trip lever 298 continually tending to move the lower end thereof against the projection 340. This movement of the trip lever 298 is yieldingly opposed by a light flat spring 350 which is secured by a screw 351 to the main plate 25. Notwithstanding, the trip lever 298 overcomes the effectiveness of the spring 350 so that the pin 345 is projected slightly into the path of rotation of the lug 346. As the lug 346 is rotated, the cam surface 348 will engage the pin 345 and urge the same back against the force applied through the trip lever 298. This action will be apparent from the parts as shown in connection with the rear tone arm mechanism in Figure 16. The return force thus produced is transmitted back to the trip arm 289 through the trip link 295 so that it is now positively turned slightly against the friction of the strip 290 in a direction opposite to that in which it was previously moving. So long as the needle N remains in the recording groove, the trip arm 289 will now be continuously returned by the lug 346 on each revolution thereof through the same increment that it was advanced by the radial travel of the tone arm F so that, for all practical purposes, said trip arm remains in a relatively stationary position. As the needle N of the tone arm F comes closer toward the center of the record, the angle of the increment gradually increases so that the lug 346 is required to kick the pin 345 back farther on each succeeding revolution of the shaft 60.

After the record has been completely played, the needle N rides into the eccentric groove Y at the center of the record. Advantage is taken of the quick radial traverse imparted to the tone arm by the eccentric groove Y to transmit a sudden substantial pivotal movement to the trip link 298, it being recalled that the trip arm 289 is frictionally clutched with the tone arm sleeve 274 so that the sudden radial traverse of the needle produces a correspondingly sudden angular movement of the trip arm. The effect of this sudden movement is illustrated in Figures 14 and 15 which show the lower end of the trip lever 298 pulled sufficiently far to the right to cause the pin 345 carried by the crank arm 341 to be engaged by the shoulder 349 of the lug 346. The pin 345 cannot now be kicked back, and therefore the bracket 142 is caused to pivot on the stud 145, the crank 342 being forced bodily upward and the roller 140 being raised clear of the gap 139 in the cam A to the position shown in Figure 15. Inasmuch as the bracket 142 is connected with the yoke 147, said yoke will be simultaneously actuated to cause the rod 72 to engage the main drive clutch 66—67.

The engagement of the main drive clutch 66—67 causes the gear 80 to be rotated by the pinion 79 in the manner previously described and this rotation starts while the needle N is still engaged in the eccentric groove Y at the center of the record. However, shortly after the gear 80 starts to rotate, the roller 264 will be engaged by the surface 261 of the tone arm control cam D and the link 269 will be moved toward the left as viewed in Figures 13 and 14, setting up a tension in the spring 325 and exerting a pull on the cable 326. When the pull on the cable 326 is sufficient to cause the tone arm strip 328 to pivot at 329 and retract the needle N from the groove in the record, the end of the elongated slot 270 will have reached a point where it will engage the pivot pin 272 which connects it with the counterweight arm 271 and impart rotation to the tone arm sleeve 274 to start to raise the tone arm F.

The trip arm 289 is returned with the tone arm F through its frictional connection with the tone arm sleeve 274 and such movement is permitted through the lost motion connection between the trip lever 298 and the slotted trip link 295. However, at about the time that the tone arm F reaches its position opposite the starting groove, the lug 289b on the trip arm 289 will have been moved into close proximity to the adjacent side of the bracket 320.

Upon the return of the tone arm F, the pull on the trip lever 298 previously applied through the trip link 295 is released and the lever 298 is returned to inactive position by the spring 350.

It will be clear that while the roller 264 is engaged with the surface 261 of the tone arm control cam D, the link 269 will be moved farther toward the left and continue to exert a direct pull on the counterweight plate 271, causing the tone arm to be raised to its initial idle position. The tone arm F reaches its fully raised position when the concentric surface 259 of the cam D is engaged with the roller 264. The counterweight arm 304 is rotated with the tone arm and the cam portion 305 thereof forces the tone arm positioning lever 307 upwardly against the action of the spring 310, moving the finger 312 out of engagement with the notch 316 to substantially the upper end of the slot 314. During this raising movement, the lug 289b of the trip arm 289 will be brought into engagement with the bracket 320, and although the tone arm continues to rise, the trip arm 289 will be held relatively stationary by said lug. The lug 289b is so arranged that it stops the trip arm 289 in such position that the slot 296 of the trip link 295 allows free movement of the trip lever 298 relative thereto. This is essential because otherwise it would interfere with the operation of the control and trip mechanism associated with the rear tone arm R, as will be apparent hereinafter.

The front tone arm F will have reached its idle position previous to the time when the tone arm control cam D has been rotated to the idle position indicated in Figure 16. During the travel of the cam D from the position shown in Figure 14 to that shown in Figure 16, the rear tone arm will have been lowered radially to the starting groove level of the rear side of the record and a needle N' carried by said tone arm will have been moved laterally to engage the groove in the record preparatory to playing. The record is engaged by said needle just prior to the stopping of the gear 80 and its associated cams.

The mechanism which controls the rear tone arm R is generally similar in construction to that described hereinbefore in connection with the front tone arm F. Hence, corresponding parts will be given the same number but will be distinguished by the addition of the exponent a. Thus, the mechanism for controlling the rear tone arm R comprises (see Figures 13 and 16) a cam roller 264a adapted to engage with the tone arm control cam D. The roller 264a is mounted upon a lever 355, but this lever is pivotally mounted at its lower end upon the same fixed pivot 299 as the trip lever 298. The upper end of the lever 355 carries a pin 356 which extends into an elongated slot 357 formed in a lever 265a. The lever 265a is pivoted at its upper end 266a upon a stud 267a carried by the main plate 25. The lower end of the lever 265a is pivoted at 268a to one end of a trip link 269a, said link having an elongated slot 270a at the opposite end thereof. A counterweight plate 271a is provided with a pivot pin 272a extending into said elongated slot. The plate 271a is fixedly secured to a hub 273a (see Figures 21 and 23) which in turn is mounted upon a hollow sleeve 274a by a set screw 275a. A counterweight 276a is fixed to the plate 271a and is adjustable relative to a counterweight arm 277a by means of a set screw 278a threaded into said arm and an elongated slot 279a formed in said plate.

The tone arm sleeve 274a is rotatably mounted in a hollow tubular journal 280a having a flange 281a secured to the main plate 25 by screws 282a. The end 283a of the sleeve 274a remote from the hub 273a is fixedly secured to a hollow casing 284a which forms one end of the tone arm R. The sleeve 274a is prevented from moving longitudinally relative to the journal 280a by a split contractile thrust ring 285a seated in a groove 286a formed in said sleeve at the near end of said journal. A loose washer 288a surrounds the sleeve 274a and normally abuts the thrust washer 285a. A trip arm 289a is mounted for relative rotational movement upon the sleeve 274a and a spring strip 290a is similarly mounted upon the sleeve 274a but includes a depending lobe 291a attached to said trip arm by a rivet 292a. The portion of the spring strip 290a above the lobe 291a is preferably dished or bowed, as shown. The bowed portion functions to press the loose washer 288a against the thrust ring 285a and to press the trip arm 289a against the hub 273a so as to provide a friction clutch for resisting turning of the sleeve 274a with respect to said trip arm.

Referring to Figures 13 and 16, it will be seen that the lower extremity of the trip arm 289a is pivotally connected at 294a with one end of a trip link 295a which is of substantially shorter length than the trip link 295. The opposite end of the trip link 295a is provided with an elongated slot 296a, and a pin 297a carried by the trip lever 298 extends into said slot. It will be noted that the pin 297a is spaced substantially the same distance from the pivot 299 of the trip lever 298 as the pin 297. It will be further noted that the roller 264a is spaced substantially the same distance from the pivot 299 of the lever 355 as the roller 264 is spaced from the pivot 267 of the lever 265 so that both tone arms are moved through substantially the same angle by the single cam D.

The counterweight arm 277a includes an offset portion 303a and an extension 304a is curved upwardly at its free end to provide a cam portion 305a. The cam portion 305a is adapted to cooperate with a projection 306a carried by a tone arm positioning lever 307a. The upper end of the arm 307a is pivotally mounted at 308a upon a stud 309a mounted on the main plate 25. A torsion spring 310a is mounted upon the pivot stud 267a and one end thereof overlies the lever 307a and its opposite end is hooked around the stud 309a, whereby a spring force is provided tending to continually urge the tone arm positioning lever 307a in a downward direction. The lower end 311a of the lever 307a is twisted through an angle of 90° relative to the plane of said lever. A latch or finger 312a is pivotally connected at 313a to said end of said lever and projects through a generally arcuate slot 314a in the main plate 25. The walls of the slot 314a are similar in configuration to the walls of the slot 314 and provide notches 315a and 316a. These notches will cooperate with the finger 312a, in the same manner that the latch 312 cooperates with the notches 315 and 316, to position the rear tone arm R in proper predetermined relation to enter the starting groove of ten-inch and twelve-inch records.

A cable bracket 320a is secured to the main plate 25 by screws 321a. The bracket 320a is arranged adjacent to the hub 273a and includes a laterally projecting flange 322a carrying a pin 323a. The pin 323a is arranged so that it extends transversely across the end of the hollow sleeve 274a.

One end of a tension spring 325a is connected to the link 269a and the opposite end of said spring is connected to one end of a flexible cable 326a. The cable 326a extends around the pin 323a and its opposite end is connected at 360 to a projecting end of a flat bar 361 floatingly mounted in the hollow sleeve 274a. The flat bar 361 is provided with an elongated slot 362 intermediate its ends (see Figures 21 and 23) and the pin 323a projects through said slot. The opposite end 363 of said flat bar engages the end of a strip 328a of the tone arm R. The strip 328a is pivotally mounted upon a pivot rod 329a carried by the hollow casing 284a in a manner similar to that described in connection with the strip 328.

A curved spring 330a is connected at 331a to the tone arm strip 328a and is arranged in a manner similar to the spring 330. A conventional electrical phonograph pickup 332a, carrying the needle N' mounted therein, is connected to the opposite end of the strip 328a. The spring 330a is arranged so that it normally tends to urge the needle N' toward the rear face of the record X. However, the needle N' is precluded from engaging said record until the pull on the cable 326a is relaxed, thereby permitting the flat bar 361 to be slid toward the left as viewed in Figure 23 through the force exerted upon its end 363 by the spring 330a.

It will be noted that the front tone arm F laterally approaches the record X when the tension on the cable 325 is relaxed; and similarly, the rear tone arm R is allowed to move toward said record only when cable 325a is relaxed, tone arm R being held away from the record when a pull is exerted on the cable 325a. This relationship is shown in Figure 13 wherefrom it will be noted that the spring 325 is relaxed while the front tone arm F is playing and the spring 325a is under tension while the rear tone arm R is retracted in idle position.

It will be understood that prior to engagement of the rear tone arm R with the rear side of the record, the direction of rotation of the turntable will have been reversed.

The design of the tone arm control cam D is such that the movements of the tone arms are timed so that the rear tone arm R begins to move downwardly during the latter part of the return movement of the front tone arm to its initial idle position. The rear tone arm R is controlled similarly to the front tone arm R, that is, it is lowered to the extent permitted by the finger 312a carried by the tone arm positioning lever 307a; the finger 312a being flipped upwardly into engagement with the notch 315a upon engagement with the periphery of the rotating record. In this manner the tone arm positioning lever 307a is allowed to lower radially to a position such that the needle N' of the tone arm R is disposed at an elevation opposite to the starting groove in the record. The needle N' at this time is spaced from the groove but is permitted to move laterally toward said groove upon continued rotation of the cam D which, through the roller 264a, lever 355, lever 265a and the link 269a, effects a release of the tension on the spring 325a and cable 326a. The cam D, having effected the desired movement of the tone arm R, then comes to rest with the roller 264a in the pocket 261a as shown in Figure 16. The roller 264a does not necessarily engage the surface of the cam because the tension in the spring 325a, which would normally pull the roller into contact with the cam, is now absent.

The slack in the cable 326a allows the curved spring 330, acting through the strip 328a, to cause longitudinal movement of the floating bar 361 in the tone arm sleeve 274a, whereby the needle N' finally engages the record, as will be obvious from Figure 21.

The link 269a can obviously move toward the left as viewed in Figure 16 to effect the foregoing movement of the needle N' without changing the angular position of the tone arm R by virtue of the lost motion connection provided by the elongated slot 270a and its cooperating pivot 272a.

As the tone arm R is carried across the rear side of the record by engagement of the needle N' in the record groove, the trip arm 289a will tend to move in a clockwise direction, as viewed in Figure 16, carrying the trip link 295a with it toward the left. Relative movement between the trip arm 289a and the hollow sleeve 274a is frictionally resisted by the spring strip 290a. As the needle N' gradually moves toward the center of the record, the trip arm 289a will exert a pull upon the trip link 295a tending to rotate the lever 298 counterclockwise about its pivot 299, thereby causing the lower end of said lever to engage the lug 340 projecting from the arm 341 of the crank 342, as shown. The crank 342 will now function in identically the same manner as when a similar turning effort was applied to the lever 298 by the link 295 associated with the front tone arm F. The pin 345 will likewise be repeatedly "kicked" back by the rotating lug 346 to hold the trip arm 289a in a relatively stationary position. Similarly, the trip lever 298 will be caused to suddenly pivot through a substantial angle when the needle N' reaches the eccentric groove at the center of the record, thereby again causing the crank 342 to pivot through an angle such that the pin 345 will be engaged by the shoulder portion 349 of the lug 346 to cause the bracket 142 to pivot upon the stud 145 to raise the roller 140 out of the gap 139a and to simultaneously cause the yoke 147 to actuate the rod 172 to again effect engagement of the main drive clutch 66—67.

The engagement of the clutch 66—67 produces a drive of the main gear 80 through the pinion 79 as previously described. Here again, rotation of the gear 80 starts while the needle N' is still engaged in the eccentric groove at the center of the record. However, shortly after said gear starts to rotate, the rear tone arm control roller 264a will be engaged by the surface 261 of the cam D and the link 269a will be moved toward the right as viewed in Figure 16, setting up a tension in the spring 325a and exerting a pull on the cable 326a. As the pull on the cable 326a becomes sufficient to cause the floating bar 361 to exert force against the end of the tone arm strip 328a, said strip will pivot about its fulcrum 329a and release the needle N' from the groove in the record. Substantially simultaneously, the end of the elongated slot 270a will have reached a point where it will engage the pivot pin 272a which connects it with the counterweight arm 271a and imparts rotation to the tone arm sleeve 274a to automatically start raising the rear tone arm R.

The tone arm R gradually rises upon continued rotation of the tone arm control cam D, and the pull on the cord 326a is increased, thereby causing the flat rod 361a to be projected further into the hollow sleeve 274a to cause further movement of the tone arm strip 328a about its fulcrum 329a to effect further lateral movement of the needle N' away from the record.

After the rear tone arm R has laterally moved its full distance away from the record, it is further raised to its initial idle position. The counterweight arm 304a is thereby necessarily rotated counterclockwise and the cam portion 305a, through engagement with the projection 306a, causes upward movement of the tone arm positioning lever 307a about its pivot 308a, thereby carrying the finger 312a at the lower end of said lever out of the notch 316a to the upper end of the slot 314a so that it will be in a clear position and not interfere with either the discarding of the record that has just been played or with the record which will next be placed in playing position.

The trip arm 289a is provided with a lug 289c which cooperates with the bracket 320a to limit rotation of said trip arm in the same manner set forth in connection with the trip arm 289. Here, however, the lug 289c positions the slot 296a in the trip link 295a so as not to interfere with the actuation of the trip lever 298 during the playing of the front side of the record. Thus, the clutch trip mechanisms associated with the respective tone arms actuate the common trip lever 298 but do not interfere with each other's operation.

Figure 25a shows a modified tone arm construction in which a tone arm strip 369 carries a reproducing unit 370 similar to that of the front and rear tone arms F and R, respectively, but which is provided with a needle N² and a small brush 371 suitably held in place by screws 372. The brush 371 is provided with fairly stiff bristles 373 which engage the recording groove of a record when the needle N² is moved transversely toward the record to playing position. The brush 371 is particularly intended to adapt the tone arms for playing records which do not have a starting groove. Thus, if such record is positioned in the apparatus for playing, the bristles 373 will always engage with the recording groove when the tone arm is lowered to a position opposite the edge of the rotating record and is moved transversely toward the record. The bristles then gradually effect movement of the tone arm across the record until the needle N² engages with the recording groove and the apparatus thus functions as before described, the bristles 373 having no effect on the clutch tripping mechanism when they reach the eccentric groove Y at the center of the record, and the tripping action being effected entirely through the more rigid needle N².

Figures 27 to 37, inclusive, constitute diagrams schematically illustrating various phases in the cycle of playing both sides of a ten-inch record and in the loading and discarding of such record, and Figure 38 schematically shows the functions which are simultaneously performed by the various cams A, B, C and D, respectively. The complete operation of the apparatus will be clear from these diagrams taken in connection with the foregoing detailed description and the following general summary.

Figure 27 corresponds to what has been selected as the zero position of the cam diagram. It will be noted from said diagram that at this position the main drive clutch 66—67 is disengaged and that the roller 140 will therefore be in latched position in the gap 139 of the drive clutch control cam A. The main gear 80 and the several cams carried thereby, namely, the cams A, B, C and D, respectively, will be stationary. It will also be noted that the record changing cam C is now effecting a holding of a record X against the turntable 118. It will be further noted that the record direction control cam B is positioned so that the clutch sleeve 90 is engaged with the pulley 92 to drive the turntable 118 in a forward direction for playing the front side of the record. It will be still further noted that the tone arm cam D is in such position that the front tone arm F is engaged with the record to be carried radially across the face of the record by engagement of the needle N in the record groove.

When the needle N reaches the eccentric groove Y at the center of the record, the drive clutch 66—67 will be actuated through the trip mechanism 289—295—298 associated with the front tone arm F, in the manner described hereinbefore, and the main gear 80 will then start to rotate while the needle N is still engaged in said groove. The roller 140 will be held clear of the gap 139 by the lug 346 until after the main gear has started to rotate, whereby upon disengagement of the lug 346 with the pin 345, the roller 140 will come to rest and ride upon the inner periphery of the portion 137 of the cam A. Such positioning of the roller assures that the drive clutch 66—67 will be maintained in engagement until the gap 139a becomes radially aligned with said roller, whereupon the spring 157 acting on the bracket 142 will cause the roller to automatically drop into latching position to disengage said clutch and thus discontinue the drive of the gear 80.

While the main gear 80 is rotating through the angle between the gaps 139 and 139a, the concentric portion 158 of the record changing cam C will be engaged with the slide roller 161 and the clamping head H will, therefore, remain stationary holding the record against the turntable 118. The tone arm control cam D will move through an angle to produce sufficient tension on the cable 326 to cause the needle N of the front tone arm F to move out of the record groove so that the tone arm can then start returning to its initial position. While the front tone arm F is being raised, the record direction control cam B will have shifted the clutch sleeve 90 into neutral, so that rotation of the record is discontinued. Continued angular movement of the tone arm cam D will mechanically raise the front tone arm F to its idle position and allow lowering of the rear tone arm R, but before said rear tone arm starts to lower, the record direction control cam B again actuates the clutch sleeve 90 to engage it this time with the pulley 87 to drive the turntable 118 in a reverse direction for playing the rear side of the record. While the record is thus rotating, the rear tone arm R will be lowered radially to its poistion opposite the starting groove S of the record, the tension on the cable 326a will now have been removed so that the needle N' is free to be moved laterally into engagement with said groove. The record is then in proper condition for the playing of the rear side thereof, and this phase of the cycle is diagrammatically illustrated by Figure 28. It will be understood that the needle N' is engaged with the starting groove S of the record for a very short interval before the main gear 80 actually comes to a standstill with the roller 140 latched in the gap 139a.

The main gear 80 will remain stationary while the needle N' of the rear tone arm R is traversing the record and until said needle enters the eccentric groove Y at the center of the record and actuates the clutch 66—67 through the trip mechanism 289a—295a—298 associated with said rear tone arm R to cause re-engagement of said clutch in the manner fully described hereinbefore. The needle N' will remain in engagement with the eccentric groove Y for a short time after the main gear 80 has started to rotate, or, in other words, until the tone arm control cam D has rotated sufficiently to effect a pull on the cable 326a to release the needle from said groove. The needle N' continues to retract and when it is sufficiently withdrawn from the record the rear tone arm R is moved radially upwardly to its initial idle position. Meanwhile, the record will still be rotating in the reverse direction and the record changing cam C will actuate the clamping head H to release the record. This phase of the cycle is diagrammatically shown in Figure 29.

As is apparent from the cam diagram of Figure 38, the turntable 118 continues to rotate for a short period after the clamping head H has fully released the record. The record is stripped from the center pin 121 by the clamping element 119 and the groove 125a, in the manner previously described, and rotates under its own inertia on the tapered end portion 124 of the center pin until it finally rides off said center pin and drops down onto the record discarding fingers 181 which are in a position ready to receive the same and absorb the shock of the fall of the record, as diagrammatically shown in Figures 29 and 30.

After the record has dropped onto the record discarding fingers 181, the record direction control cam B shifts the clutch sleeve 90 into neutral position and the turntable 118 stops rotating. At this phase of the cycle, the record changing cam C is the only cam which is active, and it is raising the slide 162 to oscillate the frame 178 carrying both the clamping head H and the record discarding fingers 181. The clamping head H and the record discarding fingers 181 recede simultaneously until said record discarding fingers assume a position such that the record is about to slide off the curved ends 181a thereof as diagrammatically shown in Figure 31. It will be noted that at this time the upper portion of the record is leaning against the rounded end of the center pin 121. When a twelve-inch record is being discarded, it will engage with the rear ends of the brackets 245 instead of engaging the center pin during this phase of discarding.

Continued simultaneous retraction of the clamping head H and the record discarding fingers 181 causes the lower edge of the record to drop off said fingers onto the bottom 19 of the drawer 15 (or upon a previously discarded record in said drawer) and the upper portion of the record rests upon the padded buffer 200 as diagrammatically shown in Figure 32. The record immediately slides off said buffer 200 by gravity and moves downwardly to the back 17 of said drawer. Meanwhile, the clamping head H will have receded to such a position that the strip 199 will engage the adjacent ends of the levers 220 to raise the ejector bars 236 into engagement with the foremost record in the stack and to position the record guide arms 218 to intercept the record after it has been ejected or cammed above the abutment 215a. Figure 33 illustrates the ejector bars 236 in the act of camming the record above the abutments 215a; whereas, Figure 34 shows the record X in ejected position and intercepted by the record guide arms 218. Figure 34 also shows the straight portion 243 of the ejector bars 236 restraining the remaining record in the stack from sliding downwardly on the inclined portions 215.

After the record has been ejected, the slide 162 is forced downwardly by the record changing cam C so that the clamping head H begins to move back toward the turntable 118. The return of said clamping head, of course, carries the strip 199 away from the levers 220 so that the record guide arms 218 can retract to inactive position. However, during the retractive movement of said guide arms, the record X is caused to engage upon the inclined padded surfaces 249 of the record indexing or supporting brackets 245. The record X will slide downwardly on these surfaces as the guide arms 218 are retracted and the downward sliding movement of the record will be halted by engagement of the edge of the record with the upright stop portion 250 of said record supporting brackets 245, whereby to properly index the pin hole of the ejected record with the center pin 121 of the approaching clamping head H. The positioning of the record X in proper relation to be picked up by the clamping head H is diagrammatically illustrated in Figure 35.

Continued movement of the clamping head H toward the turntable 118 will result in the entry of the center pin 121 in the pin hole of the record and the conveying of said record while impinged upon said pin into engagement with said turntable. The clamping head H is illustrated in the act of conveying the record toward the turntable 118 in Figure 36.

After the record has been engaged with the turntable, the record direction control cam B actuates the clutch sleeve 90 to again engage the same with the pulley 92 to drive the turntable in a forward direction corresponding to the playing of the front side of the record. At about the time that the record starts to rotate in a forward direction, the tone arm control cam D allows the front tone arm F to begin to move downwardly toward a position opposite the starting groove of the record. This phase of the cycle is diagrammatically illustrated in Figure 37. The needle N of the front tone arm F is then permitted to move laterally toward the record in the manner previously described. Here again, the needle N engages with the record before the roller 140 returns into the gap 139 to effect automatic disengagement of the main drive clutch 66—67. The disengagement of said clutch stops the gear 80 in its initial position after having made one complete revolution. The front tone arm then starts to travel across the face of the record as indicated in Figure 27, which figure also illustrates the starting point for the cycle described herein.

The tone arms F and R may have the wires K thereof connected with the oscillator unit O shown in Figure 1 in a manner well understood, or said tone arms may be connected in circuit with suitable sound amplifying apparatus.

The apparatus hereinbefore described is completely satisfactory for playing both sides of double-face records, and it will be apparent that the playing of the front and rear sides of the record, respectively, may be interrupted at will by manual actuation of the yoke 147 by a pull on the knob 153a connected to the rod 153. Such manual actuation will directly cause engagement of the clutch element 66—67 and incidentally raise the roller 140 out of the gap 139 (or 139a). Thus, even though one of the tone arms may be in the act of reproducing the recording on one side of the record, manual actuation of said clutch will cause the main gear 80 to start rotating, and the cams carried by said gear will function in the same way as if the recording had been completely played. In other words, the needle will be released from the groove and the tone arm moved transversely away from the record and raised radially to its initial idle position. This arrangement has the advantage that an operator may immediately discontinue the playing of a record at will without interfering with the automatic playing of the remaining side of the record, if the interruption has occurred during the playing of the front face of the record; and without interfering with the discarding of the record and playing of the remaining records in the stack, if the interruption has occurred during the playing of the rear side of the record.

While the above represents a practical advantage not found in known automatic record players, it is also desirable to incorporate means in the apparatus which will adapt it to play a series of single-face records, and also to adapt the same to play either the front side or the rear side of a series of double-face records, as will appear more fully hereinafter.

Accordingly, a modified form of the main gear 80 is illustrated in Figures 39 to 43, inclusive, designed to prevent the automatic disengagement of the drive clutch 66—67 by precluding the roller 140 from entering one or the other of the gaps 139 or 139a in the clutch control cam A. The mechanism for effecting the above is controlled manually and may be set to allow playing of the one side of a series of single-face records, or both sides of double-face records, or set to allow playing only of the front side or rear side, respectively, of a series of double-face records.

This mechanism comprises a latch member 375 pivotally mounted at one end upon the gear 80 by a pin 376. The opposite end of said latch is provided with a pad 377 adapted to enter the gap 139, as illustrated in Figure 39. A roller 378 is mounted upon the latch 375 upon a pin 379. A spring 380 is secured at one end by a rivet 381 or other suitable means to the arcuate segment 137 of the drive clutch control cam A. The opposite end of said spring is engaged with the latch 375 adjacent the roller 378 and normally tends to position the latch with the pad 377 projecting into the gap 139.

A similar latch 385 is pivotally mounted at one end upon the main gear 80 by a pin 386. The opposite end of said latch 385 is provided with a pad 387 adapted to project into the gap 139a. A roller 388 is mounted medially of the ends of said latch upon a pin 389. A spring 390 is suitably connected at 391 to the portion 137 of the cam A and the opposite end of said spring engages the latch 385 for normally urging the pad 387 into the gap 139a.

It will be recalled that the bracket 142 carrying the roller 140 is normally urged about its pivot 145 in a direction tending to force the roller into the gap 139 or 139a when said gaps become radially aligned with said roller. It will also be recalled that when the roller 140 enters either of said gaps, the drive clutch 66—67 becomes disengaged. Therefore, if said roller can be prevented from entering one or the other of said gaps, the clutch 66—67 will be maintained in engagement and the gear 80 will continue to rotate and make a complete revolution instead of rotating through only a portion thereof. Such continued rotation will cause the mechanism to cycle through instead of stopping to permit playing of one of the sides of the record.

An arrangement which may be employed to achieve this objective is best illustrated in Figure 39. Here, a block 392 is illustrated which may be slid from the position shown in full lines to that shown in dot and dash lines. The block 392 comprises an outer surface 393, a pair of legs 394, and an inner surface 395. The outer surface 393 is now shown engaged by the roller 378 with the legs 394 stradding a pair of supporting plates 396, the inner surface 395 being engaged with the upper arcuate edges 397 of said plates, and the arc being concentric with the axis of the gear shaft 81. The plates 396 are notched as indicated at 398 to clear the shaft 60 and are held apart adjacent the notch by a spacer 399 secured in place by a rivet 400. The upper ends of the plates are secured to a stud 401 by a screw 402 which also serves to hold a spacer 403 in position. The lower ends of the plates 396 are secured to a similar stud 404 by a screw 405 which also holds a spacer 406 in place. It will thus be seen that the plates 396 are rigidly mounted relative to the cam A and main gear 80.

The plates 396 are each provided with a slot 407 concentric with their upper surfaces 397. A lever 408 is pivotally supported at 409 upon a bracket 410 which may be carried by the gear box mounting plate 52 or conveniently supported by any other suitable means. One arm 411 of said lever is arranged to operate between the plates 396 and is provided with an elongated slot 412 which cooperates with a pin 413 that extends through the slots 407 in said plates and the legs 394 of the block 392. The other arm 414 of said lever is pivotally connected at 415 with a reciprocable actuating bar 416. The arm 414 is provided with an elongated slot 417 to permit movement thereof to the position indicated in dot and dash lines to accommodate the reciprocating movement of the bar 416.

Reciprocation of the bar 416 is effected through a pin 418 carried by said bar and a cooperating cam slot 419 formed in a rotatable sleeve 420. The sleeve 420 may be rotatably supported in the side wall 5 of the cabinet with one end 421 projecting exteriorly of said wall. A knob 422 is secured to the projecting end 421 by a set screw 423, whereby upon rotation of the knob 422 the sleeve 420 will also be rotated. A flange 424 is secured to the sleeve 420 and is provided with three notches 425, 426 and 427, respectively, adapted to be engaged by a spring-pressed detent 428 carried in a housing 429 secured to the wall 5 by screws 430. As shown, the detent 428 is continuously urged downwardly by a spring 431 to lock the sleeve 420 in any desired position of adjustment. The detent 428 is now shown engaged with the notch 425 to lock the sleeve 420 and its associated mechanism in a position such that the block 392 will prevent the pad 377 of the latch 375 from being moved out of the gap 139 by the roller 140 to thereby release the clutch 66—67 and interrupt the driving of the gear 80. Accordingly, the gear 80 will now continue to rotate until the gap 139a is radially aligned therewith, but since the block 392 will remain in its full line position until it is manually moved to another position, the pad 387 of the latch 385 will merely be pushed back by the roller 140, as indicated in Figure 43, and the rotation of the gear 80 will be interrupted by disengagement of the clutch 66—67 in a manner obvious from the foregoing. The bracket 142a now used with the yoke 147 is slightly modified from the bracket 142 to clear the plates 396, as shown in dot and dash lines in Figure 39.

A plate 432, see Figure 42, is mounted on the exterior of the cabinet wall 5 and cooperates with the knob 422 to indicate the operation which the block 392 will effect. As shown, the arrow on the knob 422 indicates that the block 392 is now in a position to effect playing of only the "rear side" of a record. The plate 432 bears additional indicia for indicating when the block 392 is in position (shown in dot and dash lines in Figure 39) to effect playing only of the "front side" of a record. The block 392 also has an intermediate or neutral position, indicated by the words "both sides," which will permit the playing of both sides of a double-face record.

When a single-face record is being played, or when only one side of a double-face record is being played, the tone arm mechanism, of course, will go through the movements of engaging the inactive tone arm with the starting groove in the record, but now that the gear 80 continues to rotate the inactive tone arm is immediately withdrawn without playing, so that if the knob 422 is set as shown, the main gear 80 will not stop to allow playing of the front side of the record but will continue to rotate to position the rear tone arm R for playing the record, and said tone arm will continue to engage the record and normally completely play the same. The rear tone arm R will then be retracted and the record discarded in the manner already described.

If the block 392 is moved to the position shown in dot and dash lines, it will cooperate with the roller 388 of the latch 385 to similarly prevent the roller 140 from dropping into the gap 139a. Under such conditions, it will be clear that only the front side of a double-face record will be played and that, although the rear tone arm R is carried through the motions of engagement with the starting groove, the gear 80 does not stop to permit playing of the rear side of the record, but effects a return of the rear tone arm R to its initial idle position and the mechanism proceeds to discard the record.

It will be obvious from the foregoing description in connection with the playing of only one side of a double-face record that a series of single-face records may be arranged in the cabinet and played by either the front or rear tone arm, depending upon whether the grooves in the record are disposed toward the front or rear of the door when they are placed upon the record supporting arms 11 carried by said door. If the block 392 is adjusted to the position shown in full lines in Figure 39, the single-face records should be positioned on the door with the grooves of all said records arranged to correspond to what would normally be the rear side of a double-face record. These single-face records will then be played by the rear tone arm R. The front tone arm F, as explained, will move toward the blank side of such records, and the absence of a starting groove has no effect because the front tone arm will soon move away from the record inasmuch as it is immediately retracted. Conversely, if the block 392 is in the dot and dash line position, the single-face records should be oppositely arranged on the door 7 so that they will be played by the front tone arm F.

It is also desirable to include means in the apparatus for effecting a "repeat" operation, that is to say, repeat the playing of a given side of a record indefinitely. One way in which this may be accomplished is by preventing the release of the clamping head so that it will remain in engagement with a record and not move away therefrom to effect discarding of the record then being played. This may readily be accomplished by suitably interrupting the oscillatory movement of the frame 178a carrying said clamping head H so that, even though the slide 162 is reciprocated by the cam C no movement will be imparted to the frame.

A fairly simple repeat mechanism is illustrated in Figures 44 to 49, inclusive. Here, the links 174 have been replaced by links 174a. The upper ends of the links 174a and connected to the depending legs 169 of the slide mechanism by pins 173a. A torsion spring 440 encircles each of the pins 173a and the opposite ends thereof are arranged to normally urge the links 174a in a counterclockwise direction.

The lower ends of the links 174a are each provided with a longitudinal slot 441 adapted to cooperate with the connecting pin 175 on a modified frame 178a. One or more springs 178b are connected to said frame and normally urge the same upwardly to hold the clamping head H in operative relation to the turntable 118.

The upper end of the slots 441 merge with a notch 442. During the upward movement of the slide 162, the pin 175 will be engaged in the notches 442, as shown in Figure 47, to impart a positive upward movement to the adjacent side of the frame 178a, such movement being opposed by the springs 178b.

It will be evident that, as the links 174a are moved to such position that the pin 175 rides in the slot 441, as shown in Figure 46, the slide 162 may be reciprocated indefinitely without imparting any oscillatory movement to the frame 178a. A device which may be employed to so position the links 174 includes an actuating member 443 fixedly secured to a shaft 444 suitably mounted in a bracket 445 on the main plate 25. A rattrap spring 446 is arranged so that it tends to move the actuating member 443 toward the links 174a.

The shaft 444 is adapted to be engaged by a spring-pressed detent 447 to lock the actuating member 443 in its inactive position, shown by full lines in Figure 47. A knob 448 is mounted upon an end of said shaft exterior of the side wall 5 of the cabinet. It will be apparent that if the slide 162 is idle when the shaft 444 is moved to its unlocked position, the actuator 443 will engage the sides of the links 174a and tend to rotate the same about their pivots 173a and thus move said links to a position where the pin 175 will be out of alignment with the notches 442, the strength of the spring 446 exceeding that of the springs 440 so that the pivotal movement of the links 174a can take place. The parts will then assume the position indicated in Figure 45. It will be obvious from this figure that the links 174a can move up and down with the slide 162 without effecting any actuation of the frame 178a. It will also be evident that so long as the slotted portion 441 is engaged with the pin 175, the actuating member 443 need exert no positive pressure upon said links. Hence, a stop 449, adapted to engage the flange 29 on the main plate 25, is formed upon the actuating member 443 to limit the turning movement of said actuating member. The stop 449, however, is so positioned that it engages the flange 29 only when the links 174a have been moved as far toward the left as is necessary to align the slots 441 with the pin 175.

It is preferable to operate the repeat mechanism while the side of the record to be heard again is being played, although the mechanism is so arranged that no damage will result if it is actuated at some other time.

One of the advantages of the present construction is that the notches 442 will prevent the links 174a from being actuated to effect a repeat operation if the slide 162 is in the act of being moved either upwardly or downwardly, or in other words, in the act of effecting discarding of a played record or positioning an unplayed record against the turntable 118. If the knob 448 is actuated during the playing of a given side of a record, the notches 442 will be clear of the pin 175 and the actuating member 443 will be effective to position the links 174a so that said given side will be repeated indefinitely. As will be obvious, the engagement of the actuating member 443 with the links 174a will cause the same to pivot upon the pins 173a to position the slots 441 in alignment with the pin 175, as shown in Figure 45.

On the other hand, if the knob 448 is actuated after the playing of a record, i. e., during the record discarding and loading portion of the cycle, the actuating member 443 will move toward the links 174a but will be ineffective for causing said links to pivot about the pins 173a. If the member 443 is actuated while the slide is moving upwardly to effect discarding of the record, the member will engage the links 174a but inasmuch as the pin 175 is now seated in the notches 442, said member will be unable to cause said links to rotate. The pin 175 remains seated in said notches 442 during the upward movement of slide 162 in view of the fact that the slide in moving upwardly must overcome the force of the springs 178b. Similarly, upon the downward movement of said slide the pin 175 will remain seated in the notches 442 due to the force applied to the frame 178a through the springs 178b. However, when the slide 162 reaches its lower limit of travel, the clamping head H will then be in its normal record holding position and the links will assume a position relative to the pin 175 that will permit the member 443 to now shift said links so that the slots 441 of said links line up with said pin, as shown in Figure 45. Any movement of the slide thereafter will produce no oscillation of the frame 178a due to the fact that the pin 175 now rides in the slots 441.

It will be evident from Figure 47 that if the slide 162 is moving downwardly when the actuating member is unlocked and moved from its inactive full line position by the spring 446 to the dot and dash line position, said member will assume such position that the lower extremity thereof will be in a position to be engaged by the lower ends of the links 174a. In order to prevent any damage to the actuating member 443 upon downward movement of links 174a, the actuating member is provided with a cam surface 443a which is engaged by the lower ends of said links to harmlessly cam said member aside. The extent of the cam is best shown in Figure 48, which is a sectional view taken on the line 48—48 of Figure 45. The member 443 is cammed back against the action of the spring 446 so that it will be effective to disengage the links 174a when they are next raised to the position shown in Figure 45.

The knob 448 of the repeat mechanism is associated with a plate 450 bearing indicia indicating in conjunction with an arrow formed on said knob whether said mechanism is in an "on" or "off" position. Figure 49 indicates that the repeat mechanism is "on" and it will be noted that the detent 447 is out of its seat 447a so that the shaft 444 is free to be turned by the spring 446 to engage the member 443 with the links 174a.

The record playing and changing apparatus disclosed hereinabove may be made fully automatic and foolproof and controlled by the use of a circuit and a plurality of switches and solenoids connected therein, together with delayed action means for actuating certain of the switches to stop the apparatus in a predetermined portion of its cycle. An auxiliary operating device for the drive clutch 66—67 is also included and is arranged so that it is operable only when the tone arms are lowered and no record is engaged with the turntable.

In keeping with the fully automatic control of the record playing and changing mechanism, it is desirable to have said mechanism automatically shut off after the supply of records has been exhausted from the supply magazine 7. The automatic shut-off is assisted by a switch which is held closed by the records in the supply magazine 7 and which opens when the supply of records becomes exhausted. This switch is hereinafter referred to as a supply magazine switch.

It is also desirable to prevent possible damage to the records and/or mechanism by limiting the number of records that may be discarded into the drawer 15. This objective can be attained by positioning a discarded-record switch relative to the drawer so that it will be actuated by a discarded record after a predetermined number of records have been piled in said drawer.

It is still further desirable to prevent possible damage to a record or to the record changing mechanism by preventing the magazine door 7 and the discard drawer 15 from being opened during the record discarding and loading portion of the cycle. This is accomplished by the use of a locking solenoid arranged in the circuit so that it will effect locking of said door and drawer during said portion of the cycle, as will be described more fully hereinafter.

In the event that the drawer 15 is withdrawn during the playing portion of the cycle for the purpose of removing records and is not replaced before the record discarding portion of the cycle is reached, it also becomes obviously desirable to prevent the drawer from being reinserted under conditions that would result in injury or damage. Such injury or damage can be avoided by associating a drawer switch with the drawer 15 so arranged in the circuit that the record playing and changing mechanism will stop just prior to discarding a record, in the event that said drawer has not been replaced or fully closed. If the door 7 is opened during playing and left open or not properly closed, the supply magazine switch will effect shutting off of the apparatus the same as if the supply of records had been exhausted, i. e., prior to a record discarding operation.

The supply magazine switch is diagrammatically indicated at 455 in Figure 50 and is associated with one of the record supporting ways 208. This switch is arranged so that it will normally be held closed by the stack of records, but will automatically open upon the ejection of the last record of the stack. It will be recalled that when the door 7 is closed, the weight of the records is transferred to the ways 208 and is, therefore, effective to actuate the switch 455 to hold it in its closed position.

Current is supplied to the supply magazine switch 455 through lead wires L' and L'' and said current is controlled by a manually operable main starting and stopping switch M. The switch 455 may include a bell crank 456 pivotally mounted at 457. One arm 458 of said bell crank is normally urged upwardly by a spring 459. The other arm 460 of said bell crank is adapted to engage and operate a spring contact 461 normally engaged with a cooperating contact 462.

It will be apparent from the drawing that so long as any records remain upon the inclined portion 215 of the ways 208, the crank 456 will be urged downwardly by said records against the force of the spring 459. However, as soon as the supply of records has become exhausted, the crank 456 will be rotated upon its pivot 457 by the spring 459 and the arm 460 thereof will become engaged with the stop 460a. Such rotation will move the spring contact 461 away from its cooperating contact 462 and thus open the switch 455 to break the circuit at this point.

A relatively simple expedient for preventing the pile of discarded records from reaching an undesirable height in the drawer 15 is also diagrammatically illustrated in Figure 50. Here, a discarded-record switch 463 comprises a bell crank 464 pivotally mounted at 464a upon a bracket 465 secured to the back portion 17 of the drawer 15. One arm 466 of said bell crank is adapted to normally rest upon the upper edge of the back portion 17 so as to maintain the other arm 467 of said bell crank in a substantially vertical position. The free extremity of the arm 467 is spaced a predetermined distance from the bottom 19 of the drawer 15 and governs the height to which the pile of discarded records may rise in said drawer before the record changing and playing apparatus is automatically shut off. The crank arm 466 is arranged to engage a spring contact 468 to move it away from a cooperating contact 469 to effect opening of the switch.

It will be evident from the drawing that, after the discard pile has reached the height shown, only one more record need be discarded to cause the bell crank 464 to be tripped to actuate the discarded-record switch 463 by separating the contacts 468 and 469 thereof. Such record is shown being discarded in Figure 50, the lower edge of said record just engaging the arm 467.

The discarded-record switch 463 is arranged so that when it is actuated, the apparatus will be automatically shut off, but the shutting off does not normally occur immediately upon the actuation of said switch. Instead, there is a delayed action, permitting the record picked up on the return movement of the clamping head H to be placed in condition for the playing of the front side thereof. In other words, the apparatus automatically stops at the end of the record loading operation.

A drawer switch 471, which may be of the push button type, is mounted upon the rear wall 4 of the cabinet in a position such that when the drawer 15 is fully closed, it will engage said switch to maintain the same in closed position. The function of this switch is to stop the mechanism prior to a record discarding operation when the drawer is partially or completely removed.

The magazine door 7 and the discard drawer 15 may be simultaneously locked at the beginning of and remain locked during the record discarding and loading portion of the cycle by a bar 475 operated by a locking solenoid 476. The upper end of the bar 475 is provided with a hooked portion 477 adapted to cooperate with a keeper 478 mounted upon the inner face of the door. The lower end 479 of said bar is adapted to cooperate with a suitable recess or opening 480 provided in the drawer 15. When the solenoid 476 is energized the door 7 and drawer 15 will both be locked. Upon de-energization of the solenoid 476, the bar 475 is returned to its inactive position by a spring 481, and the door 7 and drawer 15 are simultaneously unlocked. The bar 475 may be guided in its reciprocating movements in a pair of angle brackets 482, and a stop 483 mounted upon said bar engages with the upper of said brackets to limit the extent to which the spring 481 can retract said bar.

The auxiliary device for automatically tripping the drive clutch 66—67, and which is operable only when no record is positioned against the turntable 118, is illustrated in Figures 52 to 54. The parts previously described herein which cooperate with said device will be referred to by the same numerals previously applied thereto.

It will be recalled that the crank 342 is actuated by the trip lever 298 through the eccentric record groove Y and the tone arms F and R to effect the raising of the roller 140 out of the gaps 139 (or 139a) of the drive clutch control cam A to cause engagement of the main drive clutch 66—67. It will be evident, therefore, that if the crank 342 can be moved to a similar position when no record is positioned against the turntable, an identical tripping of the clutch can be obtained. To obtain such movement, advantage is taken of the fact that normally the tone arm positioning levers 307 and 307a do not move downwardly to a position beyond the lowermost notches 315 and 315a in the arcuate slots 314 and 314a, said levers normally being positioned opposite either the notches 315—315a or 316—316a when either a twelve-inch or ten-inch record, respectively, is being supported by the turntable. When no record is supported by the turntable there is, of course, nothing for the fingers 312 and 312a to engage, and accordingly the levers 307 and 307a continue their downward movement until said fingers engage the lower end portion of said slots, as indicated in Figure 52. The movement of the levers 307 and 307a in the space between the notches 315 and 315a and the adjacent end of the slots 314 and 314a actually provides more movement than is required for positioning the trip lever in accordance with the mechanism disclosed.

As shown in Figures 52 and 53, the tone arm positioning levers 307 and 307a are arranged to respectively engage cooperating bars 485 and 485a. These bars are slidably supported relatively to the main plate 25 by guides 486 and 486a mounted upon said plate by screws 487 and 487a.

One end of the bar 485 is provided with an aperture 488 adapted to receive a pin 489 fixed to a lever 490. One end of the bar 485a is also provided with an aperture 488a adapted to cooperate with a pin 489a also fixedly carried by the lever 490.

The lever 490 is pivotally mounted at 491 upon a bracket 492 secured to the trip 31 by screws 493. One end of a link 494 is pivotally mounted upon the pin 489 and its opposite end fixedly carries a pin 495. A lever 298a, which is substituted for the lever 298, is provided with an extended and angularly bent portion 496 suitably apertured at 497 to receive the pin 495.

It will be recalled from the previous description of the operation of the tone arms that said tone arms are lowered toward the starting groove of the record prior to the interruption of the drive of the gear 80 through the clutch 66—67. Accordingly, the parts have been illustrated in Figure 52 in substantially the position that they assume when the rear tone arm R is lowered. As the rear tone arm positioning lever 307a forces the arm 304a downwardly, said lever will engage the free end of the bar 485a and move the same toward the right and thereby cause the lever 490 to turn clockwise upon its pivot to the position shown. Such movement of the lever 490 will cause the link 494 to be shifted to the left, thereby causing the trip lever 298a to assume the slightly inclined position shown. Inasmuch as the roller 140 at this instant is riding upon the inner surface of the segment 138 of the cam A, the bell crank 342 is in such position that the trip lever 298a cannot engage with the lug 340. It is also apparent that the pin 345 is now maintained in such position that it is substantially clear of the lug 346. However, only a short interval is required for the main gear 80 to rotate through the angle necessary to radially align the gap 139 with the roller 140. When such alignment occurs, the roller 140 drops into the gap 139 in the same manner previously described, to effect disengagement of the clutch 66—67, but the lug 340 on the crank 342 will be immediately engaged by the lower end of the arm 298a and said crank accordingly will be required to take the position shown in Figure 54, wherefrom it will be apparent that the roller 140 will be immediately raised upon engagement of the lug 346 with the pin 345, thereby causing re-engagement of the clutch 66—67 and further driving of the main gear 80.

It will be clear from Figure 52 that the above described operation will also occur when the front tone arm F is lowered and there is no record in engagement with the turntable 118. The front tone arm positioning lever 307 then assumes the position shown in dot and dash lines and in so doing it engages the adjacent end of the bar 485 to move the lever 490 in the same direction in which it was previously moved by the rear tone arm R. Thus, the lever 490 is always turned in a clockwise direction as viewed in Figure 53 to actuate the trip lever 298a. The spring 350 will return the lever 490 to inactive position when the lever 307 (or 307a) is raised through the tone arm cam D.

The mechanism for obtaining a delayed stopping of the record changing apparatus when either the supply of records has been exhausted, the manual switch M is opened during a record changing operation, an excess of discarded records has been deposited in the drawer 15, or when said drawer or the door 7 has been opened and left open during a playing operation, is illustrated in Figures 55 to 70. This mechanism is designed to be actuated by the record changing cam C and therefore, it can never get out of phase with the record discarding and loading portion of the cycle.

Referring now to Figures 55 to 59, Figure 55 shows the record changing cam C in the idle position that it occupies during the playing of the front side of a record. A roller 500 pivotally carried by a cam arm 501 is engaged in the groove of said cam. The upper end 502 of the cam arm 501 is pivotally mounted upon the inner side of the strip 35 by a screw 503. The lower end of said arm is provided with a laterally extending flange or cam portion 504 adapted to actuate the time delay mechanism, as will be apparent more fully hereinafter.

A support 505 is fixedly mounted by screws 506 upon the strip 35. The support 505 includes a portion 507 which is right angular in cross section and a portion 508 which is channel-shaped in cross section. The portion 507 carries a main slide 509 and is slotted at two places as indicated at 510 and 511. A bolt 512 extends through one end of the slide 509 and through the slot 510 and is held in place by a nut 513. The opposite end portion of said slide is held in place by a screw 514 which projects through the slot 511 and is threaded into said slide as indicated at 515. A pin 516 is fixedly secured to the support 505 and a spring 517 has one end hooked around said pin and its opposite end hooked around the bolt 512 and serves to continuously urge the main slide 509 toward the right as viewed in Figure 55.

An arm 518 rests upon the slide 509 and is arranged to pivot at one end thereof about the bolt 512. A latch 519 in turn rests upon the arm 518 and is also pivotally mounted upon the bolt 512. A spring 520 is suitably secured to the arm 518 and the free end thereof engages the latch 519 to normally hold the same against a stop pin 521 carried by the arm 518. An elongated slot 522 in the latch 519 permits movement of said latch relative to the arm 518 against the force of the spring 520.

The end of the arm 518 opposite its pivotal support 512 includes a lateral portion 523 terminating in a downwardly bent flange 524. The lateral portion 523 is notched as indicated at 525 to receive one end of a spring 526 suitably mounted at 527 upon the slide 509. The spring 526 is arranged to normally maintain the flange 524 in engagement with the edge of the support 505. A lug 528 is formed on the support 505 and is adapted to cooperate with the flange 524 of the arm 518 in a manner which will be set forth hereinafter.

The channel-shaped portion 508 of the support 505 comprises opposed flanges 530 each of which is provided with an elongated slot 531. A substantially square block 532 projects into said slots and is adapted to be reciprocated in said slots.

The block 532 serves as a slidable pivot for an auxiliary slide or pawl 533. This pawl includes opposed flange portions 534 arranged to overlie the flanges 530 and to receive the block 532 therebetween, as best shown in Figure 58. A pivot pin 535 extends through the flanges 534 and block 532 and is held in place by a nut 536. The block 532 is provided with a projection 537 upon which one end of a spring 538 is mounted. The spring 538 is arranged to engage the inner surface of the pawl 533 and continuously tends to move said pawl away from the support 505. A pin 539 is secured to the lowermost of the flanges 530 and forms an abutment for one end of a pawl return spring 540. The opposite end of said spring is arranged to abut the block 532 to effect a return of the auxiliary slide or pawl 533 to its initial position, as will be apparent hereinafter.

The outer surface of the pawl 533 is adapted to be engaged by a roller 541 carried by the armature 542 of a pawl solenoid 543. A spring 544 is connected with the armature and normally tends to pull the roller 541 and the pawl 533 toward the main slide 509 when the solenoid 543 is de-energized. However, as will be apparent from the circuit shown in Figure 51, the solenoid 543 is arranged so that it is energized only so long as the supply magazine switch 455 is in closed position, or, in other words, so long as there are any unplayed records on the ways 208. When the pawl solenoid 543 is energized, it overcomes the pull of the spring 544 and thus permits the spring 538 to push the pawl 533 away from the support 505, as indicated in Figure 56.

The pawl 533 is adapted to cooperate with ratchet teeth 548 and 549 formed in one edge of the slide 509. A pawl latch 550 is pivotally mounted at 551 upon the under side of the upper flange 530. The opposite end of said pawl latch 550 is adapted to engage a stop pin 552 and is continuously urged toward said stop pin by a spring 553. The ratchet teeth 548 and 549 are adapted to successively engage the slidable pawl 533 to shift or slide the same longitudinally relative to the support 505 in two successive steps, and the pawl latch 550 is provided with a tooth 554 which cooperates with said pawl to retain the same in an advanced position at the end of its first step of sliding movement.

The main slide 509 carries a vertical projection 555 adapted to engage an element 556 of a double contact main slide switch 557 diagrammatically shown in Figures 55 and 56, and better shown in the circuit of Figure 51. When the slide 509 is in its retracted position, the stationary contact 564 will be engaged with a movable contact 565 of the double contact switch 557; whereas, when said slide is in its advanced position, as indicated for example in Figure 61, the movable contact 565 will be engaged with a stationary contact 566 and a second movable contact 567 will be engaged with a second stationary contact 568.

The upper flange 534 of the pawl 533 also carries a substantially vertical projection 558 adapted to open a normally closed auxiliary slide switch 570 which serves to finally cut off the flow of current to the motor 47 when the slidable pawl 533 is advanced through its second step. The projection 558 is arranged to engage a spring contact element 571 of the switch 570 to move the same away from a cooperating contact element 572, as shown in Figure 70. Simultaneously, the main slide switch 557 is actuated so that when it opens the contacts 567—568 it cuts off the current to the locking solenoid 476 and the apparatus stops with the door 7 and drawer 15 unlocked.

Figures 60 and 61 illustrate the record changing cam A in the stationary position that it assumes during the playing of the rear side of a record. It will be noted that the flange 504 of the cam arm 501 has been moved inwardly toward the center of the cam and in so doing has caused the arm 518 to move from the position shown in Figure 56 to the position shown in Figure 61. The cam arm 501 is actuated, of course, while the cam A is rotated from the stationary position for playing the front side of a record to that for playing the rear side of a record. While the cam A is being rotated, and after it comes to a stop, a modified arm 151a secured to the yoke 147 will occupy the respective positions indicated by dot and dash lines in Figure 60. The arm 151a will be in the extreme left position of its movement during rotation of the cam, and therefore will be engaged by the side of the latch 519. However, since the latch 519 engages the arm 151a before the arm 518 has been moved by the cam arm 501 through its full travel, the latch stops upon engaging the arm 151a, but the arm 518 continues to move in a direction away from the cam A. As previously pointed out, relative movement between the latch 519 and the arm 518 is permitted by the elongated slot 522 in said latch, the spring 520 yielding to permit such movement.

During the playing of the front side of a record, the arm 151a will assume its leftward position diagrammatically illustrated in full lines in Figure 56 and will move to the dot and dash position when the clutch 66—67 is actuated to drive the main gear 80 and the cam A to the position shown in Figure 60. It is while the arm 151a is in this position that it is engaged by the latch 519 as illustrated in Figure 61. When said cam and gear are positioned for playing the rear side of the record, the arm 151a will return to the position shown in dot and dash lines in Figure 61. The arm 151a, in returning to said position, pushes the latch 519 out of its path and the latch then snaps back into position behind said arm as indicated by the dot and dash position of said latch in Figure 61.

It will be recalled that, after the playing of the rear side of the record, the record changing cam C becomes effective to discard the played record and to load an unplayed record in playing position in the apparatus. In order to effect the discarding and loading operation, it is necessary for the clutch 66—67 to be again engaged and this requires the arm 151a to again be moved toward the left. In effecting such movement, the arm 151a will move from the dot and dash line position to assume the position diagrammatically shown in full lines in Figure 62, and since the latch 519 projects into the path of movement of said arm, said latch is moved bodily toward the left by said arm, thereby imparting a corresponding movement to the main slide 509. Such movement of the slide 509 carries the projection 555 away from the element 556 of the main slide switch 557, and this allows the contacts 564 and 565 to separate and open the switch.

During the normal playing of a record, with a supply of records in the supply magazine and no records or insufficient records in the discard magazine to actuate the discarded-record switch 463, the remaining switches are in the position shown in Figure 51. That is to say, switches M, 463, 455, 471 and 570 are closed, contacts 564—565 of switch 557 are closed and contacts 564—566 and 567—568 of said switch are open. A power circuit for the motor 47 may be traced from one side of the line L', through switches M, 463, 471, 570, to the motor 47 with a return through the other side of the line L''. It will be noted that the contacts 564—565 are in parallel with a series circuit containing the switches 570 and 471 so that another motor circuit may be traced from L', through switches M, 463, contacts 564—565 of the switch 557, motor M, and return to L''. Opening either or both of switches 570 and 471 is therefore ineffective to stop the motor with the switch 557 in the position shown. Opening either switch M or 463 or both will, however, stop the motor with switch 557 in the position shown. As described in detail hereafter, the switch 557 is actuated to open contacts 564—565 and to close contacts 565—566 and 567—568 just prior to the record changing portion of the cycle. If either switch 570 or 471 is open at this time the circuit to the motor will be broken and the apparatus will stop.

As has already been indicated, the switch 557 is retained in actuated position, with the contacts 564—565 open and contacts 565—566 and 567—568 closed, during the complete record changing and loading portion of the cycle and the movable contacts 565 and 567 are allowed to return to the position shown at the end of such portion of the cycle. In the actuated condition of the switch 557, a power circuit for the motor 47 may be traced from L', through closed contacts 565—566 of switch 557, switches 471 and 570, motor 47 to L''. Another motor circuit may be traced from L', through switches M, 463, 471, 570 and motor 47 to L''. It will be noted that contacts 565—566 of switch 557 are in parallel with a series circuit containing the switches M and 463 so that these switches are ineffective to break the motor circuit with the switch 557 in actuated position. If either of these switches are open at the end of a record changing cycle, the motor circuit will be broken as the switch 557 is then returned to the position shown in the drawings. As also explained hereafter, switches 471 and 570 cannot be opened during the record changing portion of the cycle so that the motor 47 cannot be stopped during such portion of the cycle.

In order to illustrate the manner in which the apparatus is automatically stopped when the supply of records is exhausted, Figures 56 and 61, respectively, may be considered to show the position of the parts of the delayed action mechanism during the playing of the front and rear sides, respectively, of the next to the last record. Figure 62 illustrates the relative position of the parts during the discarding of said record; whereas Figure 63 illustrates the same parts during the loading of the last record, and it will be noted that the roller 541 is engaged with the pawl 533 due to the fact that the ejection of the last record from the ways 208 has allowed the supply magazine switch 455 to open the circuit to the pawl solenoid 543 (see Figure 51). Accordingly, the solenoid spring 544 is relieved of the pull previously exerted thereon by the armature 542 and said spring overcomes the pawl spring 538 and the pawl 533 is brought into engagement with the main slide 509 as shown. It will be further noted from this figure that, although the cam arm 501 has been retracted, the arm 518 is retained in its substantially advanced position by engagement of the flange 524 thereof with the lug 528 on the support. By means of this arrangement, the arm 518 cannot return to its initial inactive position and carry the latch 519 out of engagement with the arm 151a. Therefore, the slide 509 remains advanced and the contacts 564 and 565 of the main slide switch 557 remain open during the entire record discarding and loading portion of the cycle, and the contacts 565—566 and 567—568 are simultaneously closed and remain closed during said portion of the cycle. When the latter contacts are closed, the door 7 and drawer 15 will be locked by completion of the circuit to the locking solenoid 476 through the contacts 567—568 and the circuit to the motor 47 is maintained through the contacts 565—566; the current to the motor passing through the drawer switch 471 and the auxiliary slide switch 570 which are both closed.

At the end of the loading of the last record, the cam C again comes to rest in the position shown in Figure 55 and the parts of the delayed action mechanism assume substantially the same positions as shown in Figure 56, except that the pawl 533 is pressurally engaged with the adjacent side of the main slide 509. Stopping of the cam C in its stationary position for the playing of the front side of the last record requires that the arm 151a be returned to the dot and dash line position shown in Figure 63. It will be apparent that the return movement of the arm 151a allows the spring 517 to return the main slide 509 to its retracted position on the support 505, as shown in Figure 64. Upon the return movement of said slide, the pawl 533 engages the ratchet tooth 548 so that upon the next movement of said slide, said pawl will be advanced with it. Coincident with the return of the slide 509, the circuit to the locking solenoid 476 will be broken, as will be obvious.

After the playing of the front side of the last record, the arm 518 and the latch 519 will take the position shown in Figure 65 during the rotation of the cam C to its next stationary position to allow playing of the rear side of the record. Upon stopping of the cam C in this stationary position, the arm 151a will return to the dot and dash line position shown in Figure 65, and upon completion of the playing of said rear side of the last record, discarding is effected by actuation of the clutch 66—67 and this requires movement of the arm 151a to the full line position diagrammatically shown in Figure 66. Such movement of the arm 151a again effects advancement of the main slide 509. However, upon this advance movement of said slide, the pawl 533 is also moved because of its engagement with the ratchet tooth 548. The pawl latch 550 is cammed back by the pawl 533 but is returned by the spring 553 to a position to hold said pawl advanced for its first step. Here again, the circuit to the locking solenoid 476 is completed and the circuit to the motor 47 is maintained as previously described. Similarly, the arm 519 slides forward relative to the flange 504 of the cam arm 501 so that during rotation of the cam C during discarding, or, in other words, toward its stationary position corresponding to the playing of the front side of a record, the support lug 528 will be engaged by the flange 524 of the arm 519 (even though the cam arm 501 moves to a retracted position, as shown in Figure 67) and thereby prevents the slide 509 from being retracted until the gear 80 and the cam C stop and the arm 151a assumes the position shown in dot and dash lines.

It will be understood, however, that, since the last record has already been discarded, no record is now being held against the turntable 118 to have the front side thereof played. The apparatus then goes through a "blank" playing operation, that is to say, both tone arms are lowered without any playing. Accordingly, while the front tone arm F is lowered as usual to engage with a record prior to the stopping of the gear 80, no means (record) is now present to be engaged by the finger 312 to limit the downward movement of said tone arm. Hence, the front tone arm F moves downwardly to the full extent permitted by the slot 314 and in so doing the lever 307 actuates the bar 465 to trip the lever 298a to effect immediate re-engagement of the clutch 66—67, as previously described herein. The arm 151a then normally returns to the full line position shown in Figure 68, thereby allowing the main slide 509 to be again retracted by the spring 517. During this retractive movement of said main slide, the pawl 533 is cammed outwardly by the angular portion of the ratchet tooth 548 against the action of the solenoid spring 544, but is prevented from being returned to its initial position through the spring 531 by the pawl latch 550. When the slide 509 reaches the end of its return movement, the pawl 533 will be brought into engagement with the second ratchet tooth 549 of said slide and the projection 555 will again effect actuation of the double contact switch 557.

The foregoing action occurs during the brief interval that the clutch 66—67 is disengaged. Due to the tripping action effected by the front tone arm F, said clutch is immediately re-engaged and the main gear 80 and the cam A are again rotated toward a position corresponding to the stationary position thereof during the playing of the rear side of a record. While the cam and gear are being so moved, the cam arm 501 is again brought into engagement with the arm 519 to position the same as shown in Figure 69. The arm 518 in moving transversely again positions the latch 519 against the side of the arm 151a as shown in full lines. Just prior to the time that the gear 80 reaches its normal stationary position to permit playing of the rear side of a record, the rear tone arm R is lowered and, in the absence of a record, it automatically positions the lever 298a through the lever 307a and the bar 485a to effect re-engagement of the clutch 66—67. Re-engagement of said clutch requires movement of the arm 151a from the dotted line to the full line position shown in Figure 70. Such movement of the arm 151a again causes the main slide 509 to be advanced and during this advance movement, the pawl 533 is advanced for its second step. The projection 555 is withdrawn from the element 556 and the contacts 564—565 of the main slide switch 557 are again opened and the contacts 565—566 and 567—568 are closed. Substantially simultaneously, the projection 558 on the sliding pawl 533 is brought into engagement with the spring contact 571 to open the auxiliary slide switch 570. Such opening of the switch 570 not only interrupts the circuit to the motor to automatically stop the mechanism at the beginning of the record discarding portion of the cycle, but also breaks the circuit to the locking solenoid 476 inasmuch as no current can now reach the contacts 565—566.

The apparatus will now remain in the shut-off position with the magazine door 7 and the discard drawer 15 unlocked so that the drawer may be withdrawn to remove the played or discarded records and the magazine door 7 opened to place a new supply of records thereon. To resume playing, the drawer 15 should preferably be closed and the loaded magazine 7 then returned to its closed position. Upon closing of the door 7, the mechanism will start operating as soon as the records engage the supply magazine switch 455 because the closing of this switch will effect energization of the solenoid 543, moving the roller 541 away from the pawl 533 against the action of the spring 544 so that the spring 538 can now move the pawl 533 away from the support 505 and out of engagement with the ratchet tooth 549. Upon disengagement of the pawl 533 from the ratchet tooth 549, the spring 531 immediately returns said pawl to its initial position shown in Figure 56 (or to the position shown in dot and dash lines in Figure 70). The apparatus is now conditioned for automatically playing the supply of records just placed in the magazine.

If the apparatus is thus started and the drawer 15 has not been returned oto its fully closed position (or if the drawer 15 is partly or wholly removed while a record is being played), the drawer switch 471 will be open. Accordingly, the circuit to the motor through the auxiliary slide switch 570 will now be open. Then, when the contacts 564—565 of the main slide switch 557 are open at the beginning of the record discarding portion of the cycle, the mechanism will be immediately stopped and discarding of the record at this time will be prevented. Closing of the drawer 15 will, of course, complete the circuit to the motor and the apparatus will then proceed to discard the record and to load another record.

It will be understood that whenever the mechanism is stopped at the beginning of the record discarding portion of the cycle, the drive clutch 66—67 remains engaged to drive the gear 80 and record changing cam C to later effect discarding. Therefore, when the motor 47 is started again the gear 80 and cam C, as well as the turntable 118, are immediately driven. It will be recalled that the several cams are designed so that the turntable 118 is driven for a short interval after the record discarding operation begins. This affords ample time for the turntable 118 to rotate the record at sufficient speed to give it enough gyrating force to keep the same from following the clamping head, prior to the time that said clamping head starts its retractive movement. Thus, the stopping of the cycle does not interfere with the subsequent dropping and discarding of the record.

The main switch M can be manually operated at any time and it will immediately stop the apparatus, except during the record discarding and loading portion of the cycle. If the main switch M is opened while a record is being played, the circuit to the motor 47 is directly broken and the apparatus stops immediately. On the other hand, if the main switch M is operated when a record is being discarded or loaded, the contacts 564—565 of the main slide switch 557 will be separated, but the circuit to the motor will be maintained through engagement of the movable contact 565 with the stationary contact 566. Therefore, the motor 47 will be driven until the gear 80 has arrived at its stationary position corresponding to the playing of the front side of the record, whereupon the clutch 66—67 is automatically disengaged by the drive clutch cam C. The return of the arm 151a upon disengagement of the clutch will then allow the slide 509 to move to its retracted position and the contacts 565—566 will be disengaged, as hereinbefore described. The circuit to the motor is then automatically broken and the mechanism comes to a stop with the front tone arm F ready to play the front side of the record, or in other wards, at the end of the record discarding and loading portion of the cycle.

The mechanism is also stopped automatically at the end of the record discarding and loading portion of the cycle when the discarded-record switch 463 is opened as the result of too many records having been allowed to collect in the discard drawer 15. The opening of this switch occurs during the record-discarding portion of the cycle but the mechanism proceeds to load another record because the contacts 565—566, which are now engaged, are in parallel with the discarded-record switch 463. The switch 463 cannot be closed except by withdrawal of the drawer 15, but said drawer cannot be withdrawn until after the completion of the record discarding and loading operation, or in other words, not until after the mechanism has been stopped at the end of the loading operation and the locking solenoid 476 has been incidentally de-energized. Withdrawal of the drawer 15 allows the discarded-record switch 463 to close and simultaneously allows opening of the drawer switch 471. Closing of the discarded-record switch 463 completes the circuit to the motor 47 through the contacts 564—565 of the main slide switch 557 and the apparatus then starts with the playing of the front side of the record.

The time consumed in playing both sides of the record is many times that required to empty the drawer 15, but in the event that the drawer is not returned to close the drawer switch 471, the mechanism will be again stopped in the manner previously described to prevent the discarding of a record when the drawer 15 is withdrawn or partly open so as not to be in a proper position to receive the same.

Similarly, if the supply magazine door 7 is opened during the playing of a record and not closed prior to the discarding of said record, the supply magazine switch 455 will be open and it will de-energize the pawl solenoid 543 to condition the slide switches 557 and 570 to stop the mechanism the same as if the supply of records had been exhausted. Prompt closing of the door 7 will, of course, effect closing of the supply magazine switch 455 and the pawl solenoid 543 will again be energized, so that the apparatus will continue to function as normally, except that it will go through a complete "blank" cycle before another record is ejected from the supply magazine 7 and conveyed to playing position.

It will be understood that if the door 7 is not closed during the playing of a record it will be prevented from being moved to fully closed position during the record discarding and loading portion of the cycle by the hook 477 on the bar 475. This will prevent closing of the supply magazine switch 455 until said portion of the cycle has been completed. If the supply magazine or door 7 is closed when the pawl 533 is in its first step of advancement, said pawl will immediately return to its normal position upon energization of the pawl solenoid 543 so that the machine continues to operate without interruption.

To summarize the operation of the automatic control system, opening the manual control switch M at any time will cause the apparatus to immediately stop, unless the apparatus is performing a record changing operation, in which case said apparatus will automatically stop at the end of the record loading portion of the cycle.

Opening of the discarded-record switch 463 normally occurs only during the record discarding portion of the cycle when a record in excess of the desired capacity of the drawer 15 is discarded thereinto. The apparatus will then complete the record changing operation and automatically stop at the end of the loading operation. Upon opening of the drawer 15, the discarded-record switch 463 will be closed and the drawer switch 471 will be opened. The apparatus will then start playing, but if the drawer 15 is shoved closed again without removal of any records therefrom, the discarded-record switch 463 will be opened and the apparatus will then stop immediately because no current can reach the motor 47 during the playing operation if the switch 463 is open.

The supply magazine switch 455 is opened whenever the records on the supply door or magazine 7 are exhausted, or said supply magazine is open. Opening of this switch allows the apparatus to finish playing the record then in playing position and to discard the same. The apparatus will then go through a "blank" playing operation and stop at the beginning of the next record changing operation. However, if additional records are placed in the supply magazine 7 and said magazine is closed before the completion of playing of the record in playing position, the apparatus will continue as in normal operation. If records are placed in the supply magazine 7 and said magazine is not closed until after the apparatus has stopped (due to lack of records), the apparatus will start, go through a blank discarding operation, load another record and then continue playing so long as records are available in said supply magazine.

The drawer switch 471 is closed when the drawer 15 is in record receiving position and is open whenever said drawer is withdrawn. Opening of the drawer switch 471 allows the apparatus to continue operation until just prior to the next record changing operation, at which time said apparatus automatically stops. This prevents the discarding of a record unless the drawer 15 is in position to receive the same. Since the drawer 15 cannot be opened during the record changing portion of the cycle, the drawer switch 471 cannot be opened during a record changing operation.

The main slide switch 557 is in its normal position shown in Figure 51 during the playing operation and is moved to its actuated position at the end of said playing operation, i. e., just prior to a record changing operation; is retained in its actuated position during the record playing operation; and is then returned to its normal position. This switch, in conjunction with the auxiliary slide switch 570, is associated with the circuit and the other switches so that an effective time delay action is accomplished wherever necessary. The switch 570 produces the necessary time delay when the record supply is exhausted, or if the main switch M is opened during the record discarding and loading portion of the cycle, or the door 7 is open so that the last record in the apparatus is completely played and discarded before the apparatus is automatically stopped.

The solenoid 476 locks the door 7 and the discard drawer 15 in closed position during a record changing operation if these magazines are closed at the beginning of such operation and also locks the door 7 in partly open position if said door is open at the beginning of the record changing operation. It will be remembered that a record changing operation cannot start if the drawer 15 is open and, therefore, that the locking solenoid 476 is not energized until the drawer 15 has been closed from open position and the record changing operation has started.

In any case, stopping of the apparatus by either the manual control switch M or any of the automatic control switches leaves all solenoids as well as the motor disconnected from the source of power.

It will be understood that various changes or substitutions may be made in the automatic record playing and changing unit and/or in the automatic control means therefor without departing from the spirit of the invention or the scope of the appended claims.

We claim:

1. The combination in sound-reproducing apparatus comprising: a cabinet; a door hingedly mounted upon said cabinet; means carried by the inner face of said door for supporting a stack of records at their lower edges when said door is open; and record-supporting means within said cabinet positioned to receive the weight of said records and support said records at their edges when said door is in fully closed position.

2. In sound-reproducing apparatus, the combination comprising: a cabinet; a door pivotally mounted at its lower edge upon said cabinet and adapted to be tilted outwardly relative to said cabinet to open position; means limiting the outward tilting movement of said door; means on said door for supporting a stack of records at their lower edges when said door is in its open position; and record-supporting means within said cabinet positioned to receive the weight of said records and support said records at their edges when said door is in vertical, substantially fully closed position.

3. Sound reproducing apparatus comprising: a cabinet; a door hingedly mounted at its lower edge upon said cabinet; a pair of spaced record supporting arms carried by the inner face of said door; and spaced record supporting ways within said cabinet arranged to receive and support the weight of said records when said door is in fully closed position.

4. Sound reproducing apparatus comprising: a cabinet; and means in said carbinet for supporting a series of records arranged in stack formation, said means including a pair of spaced ways each having inclined upper surfaces relatively offset with respect to each other to provide an abutment therebetween.

5. Sound reproducing apparatus comprising: a cabinet; a door hingedly mounted at its lower edge upon said cabinet; a pair of spaced record supporting arms carried by the inner face of said door; and a tapered guide strip arranged on the inner face of said door intermediate said record supporting arms.

6. In sound reproducing apparatus, the combination comprising: a cabinet; a door hingedly mounted at its lower edge upon said cabinet and extending substantially vertically when in its closed position; record supporting means carried by the inner face of said door for supporting a stack of records thereon in substantially vertical position; a stop member mounted in said cabinet arranged to prevent forward tilting of the upper end of said records when said door is moved to closed position; and record supporting means in said cabinet arranged to receive and support the weight of said records when said door is in fully closed position.

7. Sound-reproducing apparatus comprising: a cabinet; means in said cabinet for supporting a series of records arranged in stack formation; automatic record changing and playing mechanism in said cabinet including means for removing records one at a time from said stack, playing said records and then discarding said records substantially flatwise beneath said record changing and playing mechanism; and a slidable drawer in said cabinet beneath said record playing and changing mechanism adapted to receive discarded records when in its closed position, said drawer having a bottom surface inclined downwardly in a direction from the front of said drawer, whereby the records discarded into said drawer slide by gravity toward the rear of said drawer.

8. Automatic record playing and changing apparatus comprising: a turntable having a shaft adapted to be driven in opposite directions; means for driving said turntable shaft; automatic means including a movable clamping head oscillatable about an axis below said turntable shaft for conveying an unplayed record into engagement with said turntable and for discarding said record after it has been played; a pair of tone arms, one adapted to engage one side of said record while said record is rotating in one direction and the other adapted to engage the opposite side of said record while said record is rotating in the opposite direction; means for controlling the direction of rotation of said turntable; means for causing said tone arms to successively engage said record; and means for actuating said record conveying and discarding mechanism after both sides of said record have been engaged by said tone arms.

9. Automatic record playing and changing apparatus comprising: a turntable having a shaft adapted to be driven in opposite directions; means including a clutch for driving said turntable shaft in opposite directions; means for conveying an unplayed record into engagement with said turntable and for discarding said record after it has been played; a pair of tone arms, one adapted to engage one side of said record while said record is rotating in one direction and the other adapted to engage the opposite side of said record while said record is rotating in the opposite direction; a cam for controlling the actuation of said clutch and hence the direction of rotation of said turntable; a second cam arranged to cause said tone arms to successively engage said record; a third cam for actuating said record conveying and discarding mechanism after both sides of said record have been engaged by said tone arms; and means for driving said cams.

10. Record playing apparatus comprising: a substantially constant speed motor; a motor shaft; a worm on said motor shaft; a pair of shafts extending transversely of said motor shaft; a worm wheel on each of said shafts engaged with the worm on said motor shaft, said worm wheels being of substantially the same diameter, whereby said transversely extending shafts will be driven at the same speed in opposite directions; a member rotatably mounted upon one of said shafts; a drive member rotatably mounted on the other of said shafts for driving said first mentioned member; and means for drivingly connecting said drive member to said other of said shafts.

11. Record playing apparatus comprising: a gear box; a pair of shafts extending from said gear box; gearing in said gear box for driving said shafts in opposite directions at the same speed; a pinion rotatably mounted relative to one of said shafts; means for drivingly connecting said pinion with said one shaft; a gear rotatably mounted upon the other of said shafts and arranged to be driven by said pinion; and a second pinion drivingly connected with said gear.

12. Record playing apparatus comprising: a gear box; a drive shaft extending into said gear box; a pair of driven shafts extending through from said gear box; gearing arranged in said gear box to drive said driven shafts in opposite directions at the same speed; a turntable element; a turntable shaft connected with said turntable element; means between said turntable shaft and said extended gear box shafts for driving said turntable shaft in opposite directions; and means for controlling the direction of rotation of said turntable shaft.

13. Record playing apparatus comprising: a gear box; a pair of shafts rotatably carried by said gear box; gearing in said gear box arranged to drive said gear box shafts in opposite directions and at the same speed; a pulley fixed to each of said gear box shafts; a turntable element;

a turntable shaft drivingly connected with said turntable element; a pair of cooperating pulleys loosely mounted on said turntable shaft; belts for driving said loose pulleys from the pulleys on said gear box shafts; and clutch means arranged to effect driving of said turntable shaft through either of said loose pulleys, whereby said turntable element may be driven in opposite directions.

14. Record playing apparatus comprising: a driven shaft; a substantially vertical turntable carried by said shaft; a clamping head cooperable with said turntable to retain a record in engagement therewith; a pair of pulleys loosely mounted upon said shaft; means for driving said pulleys in opposite directions; clutch means cooperable with said loose pulleys for connecting one or the other of said pulleys to said shaft to drive said shaft in a forward or a reverse direction; a pair of tone arms, one for playing each side of said record; and means for successively engaging said tone arms with said record, one tone arm being engaged while said record is rotating in a forward direction and the other tone arm being engaged while said record is rotating in a reverse direction.

15. Automatic record playing apparatus comprising: a turntable; means for driving said turntable including a gear box having a pair of shafts continuously rotating in opposite directions; a pinion loosely mounted relative to one of said shafts; a clutch element secured against rotation relative to said pinion; a second clutch element slidably mounted for longitudinal movement upon said one shaft in circumferentially keyed relation thereto and adapted to engage said first-mentioned clutch element for rotating said pinion; a gear rotatably mounted relative to the second of said pair of shafts, said gear being constantly in mesh with said pinion; a sleeve connected with said gear for rotation therewith; a pinion carried by said sleeve; a gear constantly in mesh with said second-mentioned pinion; a clutch control cam carried by said last-mentioned gear; a tone arm having a reproducer unit and a needle carried by said unit, said needle being adapted to engage the groove in a record; and means actuable by said tone arm to effect engagement of said clutch when said needle is riding in the eccentric groove at the center of the record.

16. Record playing apparatus comprising: means for driving a record in opposite directions including a gear box having a pair of shafts and gearing for continuously rotating said shafts in opposite directions at the same speed; a pulley fixed to each of said shafts; a pinion rotatably mounted relative to one of said shafts; a clutch element secured to said pinion to rotate therewith; a second clutch element slidably keyed upon said first-mentioned shaft and adapted to engage said first-mentioned clutch element for rotating said pinion; a sleeve rotatably mounted upon the other of said shafts; a gear secured to one end of said sleeve and continuously meshing with said pinion; a pinion carried by the opposite end of said sleeve; a gear meshing with said last-mentioned pinion; a cam carried by said last-mentioned gear; means for engaging said clutch elements; a turntable shaft; a pair of pulleys loosely mounted upon said turntable shaft; a belt connecting said loose pulleys with the pulleys fixed upon said gear box shafts; means for clutching one or the other of said loose pulleys to said turntable shaft; and means cooperable with said cam for actuating said last-mentioned clutch means.

17. Record playing apparatus comprising: a gear, means including a clutch for effecting a drive of said gear; a turntable for driving a record in opposite directions; means for driving said turntable in opposite directions; a pair of tone arms, one for playing each side of said record; means supporting said tone arms for actuation about respective axes; means operatively associated with said gear for independently actuating said tone arms to successively engage said tone arms with said record; mechanism operatively connected with each of said tone arms for successively actuating said gear drive means to effect a drive of said gear and disengagement of said tone arms; and means for reversing the direction of rotation of said turntable drive means between the successive actuations of said gear drive means.

18. Record playing apparatus comprising: a gear; means including a clutch for effecting a drive of said gear; a turntable for supporting and driving a record; a tone arm having a needle engageable with the front side of said record; means pivotally supporting said tone arm means operable upon rotation of said gear for engaging said needle with said record; mechanism controlled through said tone arm for actuating said clutch to drive said gear during the engagement of said needle with the eccentric groove in the front side of said record to effect retraction of said tone arm; means for interrupting the drive of said gear upon rotation thereof through a predetermined angle; a second tone arm having a needle engageable with the rear side of said record; means pivotally supporting said second tone arm for movement independently of said first-mentioned tone arm; means operable upon rotation of said gear for engaging said second needle with said record; mechanism controlled through said second tone arm for again actuating said clutch to drive said gear during the engagement of said second needle with the eccentric groove in the rear side of said record to effect retraction of said tone arm; and means for again interrupting the drive of said gear upon rotation thereof through a further predetermined angle.

19. Record playing apparatus comprising: a gear; means for effecting a drive of said gear; a turntable for driving a record; means for driving said turntable in opposite directions; clamping means for holding a record in engagement with said turntable and for releasing said record to discard the same; a tone arm; mechanism controlled through said tone arm for actuating said gear drive means to effect a drive of said gear during the engagement of said tone arm with the eccentric groove in the front side of said record; means rotatable with said gear for effecting deactuation of said gear drive means upon rotation of said gear through a predetermined angle; a second tone arm; mechanism controlled through said second tone arm for again actuating said gear drive means to resume driving of said gear upon engagement of said second tone arm with the eccentric groove in the rear side of a record; means rotatable with said gear for again effecting deactuation of said gear drive means after said main gear has been driven through a further predetermined angle; and means rotatable with said gear for respectively successively engaging said tone arms with said record, reversing the direction of rotation of said record prior to engagement of said second tone arm with said record, and for actuating said clamping means to release said record to discard the same.

20. Record playing apparatus comprising: a main gear; means for effecting a drive of said gear; a turntable for supporting and driving a record in opposite directions; means for driving said turntable in opposite directions; a tone arm having a needle engageable with said record; means pivotally supporting said tone arm; means operable upon rotation of said gear for engaging said needle with the front side of said record; mechanism controlled through said tone arm for actuating said gear drive means to drive said gear during the engagement of said needle with the eccentric groove in the front side of said record to effect retraction of said tone arm; means for interrupting the drive of said gear upon rotation thereof through a predetermined angle; a second tone arm having a needle engageable with the rear side of said record; means pivotally supporting said second tone arm for movement independently of said first-mentioned tone arm; means operable upon rotation of said gear for engaging said second needle with said record; means for reversing the direction of rotation of said turntable prior to the engagement of said second needle with said record; mechanism controlled through said second tone arm for again actuating said gear driving means to drive said gear during the engagement of said second needle with the eccentric groove in the rear side of said record to effect retraction of said second tone arm; and means for again interrupting the drive of said gear upon rotation thereof through a further predetermined angle.

21. Record playing apparatus comprising: a gear; means for effecting a drive of said gear; a turntable for driving a record; means for driving said turntable in opposite directions; a tone arm; mechanism controlled through said tone arm for actuating said gear drive means to effect a drive of said gear during the engagement of said tone arm with the eccentric groove in the front side of said record; means on said main gear for effecting deactuation of said gear drive means upon rotation of said gear through a predetermined angle; a second tone arm; mechanism controlled through said second tone arm for again actuating said gear drive means to resume driving of said gear upon engagement of said second tone arm with the eccentric groove in the rear side of a record; means on said gear for again effecting deactuation of said gear drive means after said main gear has been driven through a further predetermined angle; means carried by said gear for successively engaging said tone arms with said record; and means carried by said gear for reversing the direction of rotation of said turntable prior to engagement of said second tone arm with said record.

22. Record playing apparatus comprising: a main gear; a main clutch for effecting the driving of said main gear; a turntable for driving a record; means including a turntable clutch for driving said turntable in opposite directions; a record direction control cam for controlling said turntable clutch; a pair of tone arms, one for playing each side of a record; a tone arm control cam for successively engaging said tone arms with said record; a trip mechanism operatively arranged between the respective tone arms and said main clutch for successively effecting engagement of said main clutch to initiate the drive of said main gear during the engagement of a tone arm with an eccentric groove at the center of the respective sides of a record; and a cam for automatically successively effecting disengagement of said main clutch after said main gear has been driven through a predetermined angle.

23. Automatic record playing and changing apparatus comprising: a turntable having a shaft adapted to be driven in opposite directions; means for driving said turntable shaft; means for supporting a plurality of unplayed records in a stack; means for ejecting records from said stack one at a time; clamping means including a center pin for holding an unplayed record in engagement with said turntable and for releasing said record after it has been played; means for indexing an ejected record in a position such that the pin hole thereof registers with said center pin; a pair of tone arms, one adapted to engage one side of said record while said record is rotating in one direction and the other adapted to engage the opposite side of said record while said record is rotating in the opposite direction; a cam for controlling the direction of rotation of said turntable; a second cam arranged to cause said tone arms to successively engage said record; a third cam for actuating said record clamping means; a clutch for effecting a drive of said cams; and means actuable by said tone arms, respectively, during the engagement of the needles thereof in the eccentric grooves at the center of the respective sides of said record for engaging said clutch.

24. Automatic record playing and changing apparatus comprising: means for supporting a plurality of records in a stack; means for successively ejecting records from said stack one at a time; clamping means including a clamping head and a center pin adapted to carry a record thereon; means for positioning an ejected record in a generally flatwise position such that the pin hole thereof registers with said center pin; a rotatable turntable element; means for moving said center pin and clamping head into engagement with said record and then moving said clamping head to a substantially vertical position and engaging the record with said turntable element; a tone arm; a reproducer including a needle carried by said tone arm, said tone arm having a normal inactive position in which said needle is free from engagement with said record; automatic means for engaging said needle with the groove in said record after said turntable element starts to drive said record; and means actuable by said tone arm during the engagement of said needle with the eccentric groove at the center of the record for causing the release of said needle from the record groove and the return of said tone arm to its initial inactive position.

25. Automatic record playing and changing apparatus comprising: means for supporting a plurality of unplayed records in a stack; means for ejecting records from said stack one at a time; clamping means including a center pin; means for indexing an ejected record in a position such that the pin hole thereof registers with said center pin; a rotatable turntable element; means for moving said center pin and clamping means to a substantially vertical position and engaging the record with said turntable element; a front tone arm; a reproducer including a needle carried by said tone arm; means for engaging said needle with the groove in said record; means actuable by said tone arm during the engagement of said needle with the eccentric groove at the center of the record for causing the release of said needle from the record groove and the return of said tone arm to its initial starting position; means for reversing the direction of rotation of said turntable element; a second tone arm; reproducing means including a needle carried by said second tone arm; means for engaging said needle with the rear side of said record; means operable to release said needle from the record groove after it has entered the eccentric portion of the groove at the center of the rear side of said record and for returning said second tone arm to its initial position; means operable to release said clamping means while said record is still rotating; and means for interrupting said record as it drops by gravity upon release of said clamping head and for discarding said record.

26. Record playing apparatus comprising: a main gear; a continuously driven shaft; a pinion loose on said shaft and meshing with said main gear to drive the same; a clutch for effecting a drive of said pinion; and means for actuating said clutch including a yoke and bracket connected together; a roller carried by said bracket; means pivotally supporting said yoke and bracket relative to said main gear, and a cam carried by said gear cooperable with said roller to maintain said yoke and bracket in clutch actuating position.

27. Record playing apparatus comprising: a rotatable turntable; oscillatable means including a center pin for conveying a record while impinged upon said center pin into engagement with said turntable; a spring-pressed record engaging plate rotatably mounted upon said center pin and means for oscillating said turntable.

28. Record playing apparatus comprising: a driven turntable element arranged to rotate in a substantially vertical plane; a movable clamping head for holding a record in engagement with said turntable; a center pin carried by said clamping head adapted to be received in a pin hole in a record; means for moving said clamping head toward and away from said turntable element; and means on said center pin for stripping a record off said center pin as said clamping head is moved away from said turntable.

29. Record playing apparatus comprising: a turntable element arranged to be driven in a vertical plane; and a clamping head for positioning a record in engagement with said turntable element, said clamping head including a post, a center pin mounted in said post and adapted to project through the pin hole of a record to thereby support the same, a cooperating turntable element, and a spring between said cooperating turntable element and said post, said spring being arranged to move said cooperating turntable element longitudinally of said center pin to strip said record from said pin when said clamping head is released; and means for effecting the release of said clamping head.

30. Record playing apparatus comprising: a shaft adapted to be driven in opposite directions; a vertically disposed turntable element secured to said driven shaft; a clamping head arranged to maintain a record in engagement with said turntable element, said clamping head including a center pin adapted to project through the pin hole of a record to thereby support the same, a cooperating turntable element loosely mounted upon said center pin, and resilient means for urging said last mentioned turntable element into engagement with a record positioned between said turntable elements.

31. Automatic record changing and playing apparatus comprising: means for supporting a series of unplayed records in substantially vertical stack formation; a rotatable vertical turntable element; means for driving said turntable element; means for ejecting a record from said stack; means for supporting said ejected record generally flatwise in a plane at a substantial angle to said stack; and means for picking up said ejected record from said supporting means and conveying said record to a vertical position in engagement with said turntable element.

32. Automatic record changing and playing apparatus comprising: spaced inclined means for supporting a series of unplayed records in substantially vertical stack formation; a vertical turntable element; means for driving said turntable element; means for ejecting a record from said stack; means for supporting said ejected record generally flatwise in a plane disposed at a substantial angle to said stack; and means for picking up said ejected record from said supporting means and conveying said record to a vertical position in engagement with said turntable element.

33. In an automatic record playing and changing apparatus, the combination comprising: means for supporting a series of records edgewise in substantially vertical stack formation; a vertical turntable; means for driving said turntable; means for ejecting a record from said stack; means engageable with substantially diametrically opposed portions of said ejected record for supporting said record generally flatwise in a plane at a substantial angle to said stack; and means for picking up said ejected record from said supporting means and conveying said record to a vertical position in engagement with said turntable element.

34. In an automatic record playing and changing apparatus, the combination comprising: means for supporting a series of records in substantially vertical stack formation; a substantially vertical turntable; means for driving said turntable; means for ejecting records from said stack one at a time; inclined bracket means for engaging substantially diametrically opposed underside portions of said ejected record and supporting said ejected record generally flatwise in a plane at a substantial angle to said stack; and means for picking up said ejected record from said bracket means and conveying said record to a substantially vertical position in engagement with said turntable.

35. In an automatic record playing and changing apparatus, the combination comprising: means for supporting a series of records edgewise in substantially vertical stack formation; a rotatable, vertical turntable; means for driving said turntable; means for successively ejecting one record at a time from said stack; means for supporting the ejected record generally flatwise in a plane at a substantial angle to said stack; and means including an oscillatable clamping head for picking up the ejected record from said supporting means and conveying the same to a vertical position in engagement with said turntable.

36. Record playing apparatus comprising: a tone arm; a turntable; a pair of spaced ways having upper inclined surfaces adapted to support a stack of unplayed records; means for ejecting the records singly from said stack; a clamping head for picking up the ejected record and carrying it to playing position; and means cooperable with said ejecting means and clamping head for properly indexing the record with respect to said clamping head prior to engagement of said record by said clamping head.

37. Record playing apparatus comprising: record supporting means adapted to receive a stack of records thereon, said record supporting means including two inclined surfaces and an abutment between said inclined surfaces, the foremost record of said stack normally engaging with and being restrained by said abutment; and ejector means operable to elevate the foremost record of said stack from one of said inclined surfaces and above said abutment onto the other of said inclined surfaces.

38. Sound reproducing apparatus comprising: a cabinet; means in said cabinet for supporting a series of records arranged in stack formation, said means including a pair of spaced ways each having inclined upper surfaces relatively offset with respect to each other to provide an abutment therebetween; and means for raising a record above said abutments.

39. Record playing apparatus comprising: an inclined supporting surface for a stack of records; an abutment at the lower end of said inclined surface; an ejector bar mounted for reciprocable movement below said stack, the upper end of said ejector bar having a cam surface arranged to engage the foremost record to elevate said record above said abutment and cam it forward when it clears said abutment, said ejector bar including a plain substantially vertical portion adapted to engage the adjacent record and restrain it from moving down said incline toward said abutment until after said ejector bar has receded below the level of said inclined surface.

40. Record playing apparatus comprising: a tone arm; a turntable; a pair of spaced ways having upper inclined surfaces adapted to support a stack of unplayed records; means for ejecting said records singly from said stack; a clamping head for picking up the ejected record and carrying it to playing position; and means cooperable with said ejecting means and clamping head for properly indexing the record with said clamping head including a pair of record positioning brackets and record guiding arms pivotally supported relative to said ways; levers mounted on said ways adapted to be engaged by said clamping head for actuating said record guiding arms to move said record guiding arms toward each other; and springs for returning said record guiding arms to their initial position upon return of said record clamping head and the disengagement thereof with said levers.

41. Record playing apparatus comprising: record supporting ways having upper inclined surfaces and an abutment for restraining a stack of records from sliding down said inclined surfaces; a pair of ejector bars for elevating the foremost record of said stack above said abutments; a pair of record guide arms arranged to intercept said record after it has been elevated above said abutments; and means for substantially simultaneously raising said ejector bars and positioning said record guide arms in said intercepting position.

42. Record playing apparatus comprising: a tone arm; a turntable; a clamping head including a center pin for conveying a record into engagement with said turntable; spaced record supporting ways, said record supporting ways having upper edges provided with a forward portion and a rearward portion inclined in the same direction with an abutment therebetween, one of said portions being adapted to receive and support a stack of unplayed records; ejector means for elevating the foremost record of the stack above said abutment onto the other of said inclined portions while restraining the adjacent record from sliding downwardly toward said abutment; record guiding arms arranged to intercept the ejected record when it reaches the lower end of said last-mentioned inclined portion; and means cooperable with said arms for positioning said record in predetermined desired relation to said center pin.

43. Record playing apparatus comprising: a pair of spaced ways arranged to receive a stack of records on the upper edge thereof, the upper edge of said ways including two downwardly inclined portions offset from each other with an abutment therebetween; an ejector bar mounted upon each of said ways; guide means for said ejector bars secured to said ways; a lever pivotally mounted intermediate its ends upon each of said ways; one end of said lever being connected with the lower end of said ejector bars and the opposite end of said levers being adapted to be engaged by actuating means for causing said levers to rotate about their pivots and move said slidable ejector bars upwardly; means for returning said ejector bars to their initial inactive position; a tone arm; a turntable; means for conveying an ejected record into engagement with said turntable; and means for actuating said levers.

44. Record playing apparatus comprising: a tone arm; a turntable element; a shaft for driving said turntable; a clamping head including a cooperating turntable element and a center pin; a pair of spaced record supporting ways having their upper edges provided with inclined record supporting surfaces offset from each other by an abutment; a slidable ejector bar and a record guiding arm carried by each of said ways; a lever pivotally mounted upon each of said ways arranged to simultaneously actuate said ejector bars and said guide arms; means carried by said clamping head arranged to engage said levers as said clamping head is retracted from record clamping position, said record guide arms being arranged to intercept the ejected record as it reaches the lowermost end of said inclined surfaces; and a pair of record indexing or positioning brackets arranged to cooperate with said guide arms to position the record with its pin hole located for proper alignment with said center pin upon the return movement of said clamping head.

45. Record playing apparatus comprising: a tone arm; a rotatable turntable; a clamping head for holding a record against said turntable in a substantially vertical position; means mounting said clamping head for oscillating movement relative to said turntable so that said clamping head may be withdrawn to release a record by downward movement and pick up a record upon its return movement; a pair of spaced record positioning brackets; and a pair of curved guide arms cooperable with said record positioning brackets arranged to be operated by said clamping head during the return movement thereof to guide a record onto said record positioning brackets so that the pin hole in the record will register with the center pin of said clamping head.

46. In sound-reproducing apparatus, the combination comprising: means for supporting a series of unplayed records in stack formation slightly inclined to the vertical; a rotatable, vertical turntable element; means for intermittently driving said turntable element; means for ejecting a record from said stack; means for supporting the ejected record in a plane at a substantial angle to said stack; oscillatable means for conveying an ejected record from said supporting means into engagement with said vertical turntable element; means for oscillating said conveying means; and means operatively associated with said turntable drive means and said conveying means, whereby said conveying means engages the ejected record with said vertical turntable at a time when said turntable element is stationary.

47. Record playing apparatus comprising: a turntable rotatable in a substantially vertical plane; a member supported below said record in oscillatable relation thereto; means carried by said member for retaining a record in engagement with said turntable; a pair of record discarding fingers pivotally mounted upon said member; and means for controlling the oscillation of said member to effect simultaneous movement of said record holding means and said record discarding fingers.

48. Record playing apparatus comprising: a turntable rotatable in a substantially vertical plane; a frame supported below said record in oscillatable relation thereto; a clamping head for retaining a record in engagement with said turntable mounted upon one side of said frame; a pair of record discarding fingers pivotally mounted upon the opposite side of said frame; and cam means for controlling the oscillation of said frame to effect simultaneous movement of said clamping head and said record discarding fingers.

49. Record playing apparatus comprising: means for supporting and driving a record in a substantially vertical plane; a frame mounted below said record for oscillating movement relative to said record; and a clamping head carried by said frame arranged to hold a record against said turntable when said frame is at the end of its oscillating movement in one direction; a reciprocable member connected with the opposite side of said frame; guide means for said reciprocable member and means for actuating said member to thereby effect oscillation of said frame and release of said clamping head.

50. Record playing apparatus comprising: means for supporting and driving a record in a substantially vertical plane; a frame mounted below said record for oscillating movement relative to said record; a clamping head carried by said frame and arranged to hold a record against said turntable when said frame is at the end of its oscillating movement in one direction; a slide connected with the opposite side of said frame means for guiding said slide; and a cam for actuating said slide to reciprocate the same and thereby effect oscillation of said frame and release of said clamping head.

51. Record playing apparatus comprising: a support; a slide arranged for reciprocation relative to said support; a roller mounted upon said slide; a cam engaging said roller arranged to reciprocate said slide; a pair of legs connected to the lower end of said slide; a frame; means pivotally mounting said frame relative to said support; a pair of links, one end of said links being pivotally connected with one side of said frame and the opposite ends of said links being pivotally connected with said legs; a pair of spaced record discarding fingers; means pivotally supporting said fingers on said frame; a cam plate secured to said support; a cooperating curved cam element connected with said fingers and cooperable with said cam plate; and a torsion spring yieldably opposing movement of said fingers relative to said frame and cam element.

52. Record playing apparatus comprising: a support; a slide arranged for reciprocation relative to said support; a roller mounted upon said slide; a cam engaging said roller arranged to reciprocate said slide; a pair of legs connected to the lower end of said slide; a frame; means pivotally mounting said frame relative to said support; a pair of links, one end of said links being pivotally connected with one side of said frame and the opposite ends of said links being pivotally connected with said legs; a pair of spaced record discarding fingers; means pivotally supporting said arms on said frame; a cam plate secured to said support; a cooperating curved cam element connected with said arms and cooperable with said cam plate; a torsion spring yieldably opposing movement of said arms relative to said frame and cam element; a post carried by the opposite side of said frame; a center pin mounted in said post; a clamping element mounted upon said center pin; a spring surrounding said center pin and disposed between said post and said clamping element; a tone arm; and a turntable cooperable with said clamping element for rotating a record while supported upon said center pin.

53. In an automatic record playing and changing apparatus, the combination comprising: means for supporting and rotating a record in opposite directions about a fixed substantially horizontal axis; a plurality of tone arms, one for playing each side of said record, said tone arms normally being disposed radially beyond the edge of said record when in their inactive position; means supporting said tone arms for movement about separate axes and automatic means for successively and independently moving said tone arms from their normal inactive position into engagement with said record.

54. Record playing apparatus comprising: a pair of oppositely disposed tone arms, one for playing each side of a record; means pivotally mounting said tone arms for movement about different horizontal axes; means for positioning a record in a substantially vertical plane lying between said tone arms, said tone arms normally being disposed radially beyond the edge of said record when in their inactive position; and means for successively and independently moving each of said tone arms first radially and then laterally toward said record to effect the successive playing of the two sides of said record.

55. Record playing apparatus comprising: a substantially vertical turntable; means for driving said turntable; a pair of tone arms, one for playing each side of a record, said tone arms normally being disposed radially beyond the edge of said record when in an inactive position; angularly movable conveying and clamping means for positioning and retaining a record in engagement with said turntable; and automatic means for successively moving said tone arms radially and then laterally toward said record to effect the successive playing of the two sides thereof.

56. In sound reproducing apparatus, the combination comprising: a pair of tone arms, one for playing each side of a record, said tone arms normally being disposed radially beyond the edge of said record when in their inactive position; means supporting said tone arms for movement about seperate axes; a circular, driven turntable element rotatable in a substantially vertical plane; means for intermittently driving said turntable element; means including a clamping head carrying a freely rotatable turntable element having substantially the same diameter as said driven turntable element for holding a record in engagement with said driven turntable element; means for successively and independently moving said tone arms from their inactive position into engagement with said record; and means controlled by said tone arms for releasing said record holding means while said driven turntable element is rotating.

57. In sound reproducing apparatus, the combination comprising: a tone arm; a turntable rotatable in a substantially vertical plane; automatic means for intermittently driving said turntable; means for holding a record in engagement with said turntable; means for releasing said record holding means while said turntable is rotating to thereby allow said record to fall by gravity; pivotally mounted retractable means for intercepting said record and absorbing the shock of its fall; and means yieldably opposing pivotal movement of said retractable means by said falling record.

58. Record playing apparatus comprising: a tone arm; a turntable rotatable in a substantially vertical plane; a clamping head arranged to hold a record against said turntable in driven relation thereto; means for moving said clamping head away from said turntable to allow said record to fall by gravity; means in the path of fall of said record for intercepting the same and absorbing the shock of its fall, and means for moving said last-mentioned means out of said path.

59. Record playing apparatus comprising: a turntable rotatable in a substantially vertical plane; a clamping head arranged to hold a record against said turntable in driven relation thereto; means for moving said clamping head away from said turntable while said turntable is rotating to allow said record to fall by gravity; a pair of pivotally mounted arms having their free ends disposed in the path of fall of said record for intercepting the same; and spring means operatively associated with said arms yieldably opposing pivotal movement thereof by said falling record.

60. Record playing apparatus comprising: a turntable rotatable in a substantially vertical plane; a releasable clamping head for holding a record against said turntable in driven relation thereto; a pair of movable record discarding fingers positioned below said record, said record discarding fingers being arranged to intercept a falling record and support said record when said clamping head is released; and means for effecting the release of said clamping head and movement of said record discarding fingers to a position to discard said record.

61. Sound-reproducing apparatus comprising: a turntable adapted to be driven in opposite directions in a substantially vertical plane; means including a turntable disc for holding a record against said turntable, said turntable element and turntable disc being of substantially equal size such that both sides of the record are exposed for playing; a pair of independently operable tone arms, each adapted to play one side of said record; means supporting said tone arms for movement about separate axes; means for radially moving and engaging one of said tone arms with one side of said record; means for thereafter radially moving and engaging the other of said tone arms with the other side of said record; and means controlled by said other tone arm for releasing said holding means after both sides of said record have been played.

62. Record playing apparatus comprising: means for supporting and driving a record in a substantially vertical plane; a tone arm positioned above said record; means for actuating said tone arm to move the same relatively to said record including an element movable into engagement with the periphery of the record for automatically effecting a positioning of said tone arm opposite the starting groove in said record; and means for pivotally supporting said element for rotation about an axis radial to said record, whereby said element is movable in a direction tangentially away from the record by the rotation of said record.

63. Record playing apparatus comprising: a pair of tone arms arranged in spaced substantially parallel relation; means mounting said tone arms for movement independently of each other; means for rotatably supporting a record below said tone arms in a substantially vertical plane passing between said tone arms; and automatic means for radially lowering said tone arms at one time to a position opposite the starting groove in the record and allowing said tone arms to move laterally into engagement with said starting groove to successively effect the playing of the opposite sides of said record.

64. Record playing apparatus comprising: a main plate; means for supporting and driving a record in a substantially vertical plane relative to said main plate; a tone arm pivotally mounted on said main plate above said record and radially movable relative to said record; a positioning arm connected with said tone arm; a spring-pressed lever pivotally mounted on said main plate; a notched slot in said main plate; a finger pivotally connected with said lever and extending through said slot, said finger being arranged to engage with the periphery of said record when said lever is lowered and to be thrown by a rotating record into a notch of said slot; and a projection carried by said lever and cooperable with said positioning arm to limit the radial downward movement of said tone arm to a position substantially opposite the starting groove in said record.

65. Record playing apparatus comprising: a main plate; a hollow journal mounted upon said main plate; a hollow sleeve rotatably mounted in said support; a tone arm carried by one end of said hollow sleeve; a positioning arm having a cam surface mounted upon the opposite end of said sleeve; a lever pivotally mounted upon said main plate and carrying a projection cooperable with said cam surface; means continuously urging said projection into engagement with said cam surface; a counterweight plate fixed relative to said positioning arm; a second lever pivotally mounted at its upper end upon said main plate; a link pivotally connected at one end to the lower end of said second lever, the opposite end of said link being connected by a lost motion connection with said counterweight plate; a roller pivotally mounted upon said second lever intermediate its ends; and a cam arranged to engage said roller, whereby to raise said tone arm through said lever and linkage connection with said counterweight plate and to allow lowering of said tone arm by pressural engagement of said projection with said cam surface.

66. A tone arm control mechanism comprising: a main plate; a journal secured to said plate; a hollow sleeve rotatable mounted in said journal; a tone arm casing secured to one end of said hollow sleeve; a tone arm strip pivotally mounted in said casing; a sound reproducing unit carried by said tone arm strip; a spring connected to said tone arm strip and reacting against said casing tending to normally urge said needle toward a record; and a flexible cable operatively arranged to transmit force effective upon said tone arm strip to compress said spring and thereby move said sound reproducing unit away from said record.

67. A tone arm control mechanism comprising: a main plate; a journal secured to said plate; a hollow sleeve rotatably mounted in said journal; a tone arm casing secured to one end of said hollow sleeve; a tone arm strip pivotally mounted in said casing; a sound reproducing unit and needle carried by one end of said tone arm strip; a spring connected to said tone arm strip and reacting against said casing tending to normally urge said needle toward a record; a bar floatingly mounted in said hollow sleeve with one end thereof arranged to react upon said tone arm strip; and a flexible cable arranged to impart longitudinal movement to said floating bar to transmit thrust to said tone arm strip and thereby move said needle away from said record.

68. A tone arm control mechanism comprising: a main plate; a journal secured to said plate; a hollow sleeve rotatably mounted in said journal; a tone arm casing secured to one end of said hollow sleeve; a tone arm strip pivotally mounted in said casing; a sound reproducing unit and needle carried by one end of said tone arm strip; a spring connected to said tone arm strip and reacting against said casing tending to normally urge said needle toward a record; and a flexible cable connected to the opposite end of said tone arm strip adapted to transmit a pull to said tone arm strip to compress said spring and thereby move said needle away from said record.

69. Record playing apparatus comprising: means for supporting and driving a record in a substantially vertical plane; a pair of tone arms arranged to engage the opposite sides of said record; a sound reproducing unit arranged for pivotal movement upon each of said tone arms; flexible cables for controlling the pivotal movement of said reproducer units, one of said cables being arranged to effect movement of said reproducer unit toward one face of the record when the tension thereon is released and the other of said cables being arranged to effect a similar movement of the other reproducer unit when tension is applied thereto; and means for controlling the movement of both of said reproducer units arranged to successively release the tension on one of said cables and to produce a tension in the other of said cables.

70. Record playing apparatus comprising: a gear; a cam having a gap carried by said gear; a clutch actuable to effect a drive of said gear; a tone arm; means including a roller adapted to enter the gap in said cam for effecting deactuation of said clutch; a trip mechanism operable by said tone arm for conditioning said roller to be raised out of said gap and effect actuation of said clutch; and means for raising said roller out of said gap.

71. Record playing apparatus comprising: a gear; a clutch actuable to effect a drive of said gear; a main plate; a journal mounted upon said plate; a rotatable member mounted in said journal; a tone arm carried by one end of said member; a clutch trip arm pivotally mounted upon said member; means frictionally restraining relative rotation between said tone arm and member; a trip lever pivotally mounted upon said main plate; a trip link pivotally connected at one end to said clutch trip arm, the opposite end of said link being connected by a lost motion connection with said trip lever; pivotally supported means positioned in the path of movement of said lever; a roller carried by said last-mentioned member; a cam on said gear having a gap for the reception of said roller; a shaft; and a lug on said shaft, said lug being arranged to raise said roller out of said gap upon predetermined movement of said pivotal means by said trip lever.

72. Record playing apparatus comprising: a hollow tone arm, said tone arm being open at one end thereof; a flat strip having one end thereof extending into said open end of said tone arm; means pivotally mounting said strip medially of its length at said open end for lateral movement relative to said tone arm, a reproducing unit mounted upon the opposite end of said strip; a hollow post pivotally supporting the opposite end of said tone arm; spring means between the interior of said tone arm and said spring strip for urging said strip to turn about its pivot in a direction to move said reproducing unit toward a record; and means extending through said hollow post and operatively associated with said first-mentioned end of said strip for turning said strip about its pivot in opposition to the resistance offered by said spring.

73. Record playing apparatus comprising: means for supporting and driving a record in a substantially vertical plane; a tone arm, said tone arm including an end portion, a strip pivotally mounted medially of its length on said end portion, and a reproducing unit mounted upon said strip; means for pivotally supporting said end portion of said tone arm with said reproducing unit in normally radial and lateral spaced relation to said record; a counterweight connected with said pivotal supporting means for counterbalancing the weight of said tone arm; means for radially moving said tone arm toward said record; means for positioning said reproducing unit opposite the starting groove in said record; means for causing said strip to turn about its pivot to move said reproducing unit laterally into engagement with said starting groove to effect the playing of said record; and means for causing said reproducing unit to move laterally away from said record to free the needle from engagement with the record groove and to return said tone arm to its initial starting position.

74. Record playing apparatus comprising: a turntable; a main plate; a hollow journal mounted upon said main plate; a hollow sleeve rotatably mounted in said journal; a tone arm connected to one end of said sleeve; a counterweight connected with the opposite end of said sleeve; an arm rotatably mounted on said sleeve; and friction means between said arm and said counterweight for restraining relative rotational movement of said tone arm with respect to said arm.

75. In sound reproducing apparatus, a mechanism for automatically playing a series of records and discarding the same substantially horizontally after playing in pile formation; means for supporting the discarded records on a slight angle to the horizontal; and switch means at the lower end of said inclined pile of records, said switch means being positioned above said pile of records and including a fixed contact and a pivoted arm having a contact movable into engagement with said fixed contact, said pivoted arm being operable by the movement of a discarded record into position upon said pile when the pile of records has reached a predetermined vertical height to automatically stop said record playing and changing mechanism.

76. In sound reproducing apparatus, a mechanism for automatically playing a series of records and discarding the same after playing in pile formation; a slidable drawer below said mechanism having a bottom inclined downwardly toward the rear end of said drawer for receiving the discarded records in pile formation when the drawer is in closed position; and switch means at the lower end of said inclined pile of records positioned above said lower end of said pile of records and including a fixed contact and a pivoted arm having a contact movable into engagement with said fixed contact, said arm being mounted upon said drawer and being operable by the sliding movement of the discarded record into position upon said pile when the pile of records has reached a predetermined vertical height to automatically stop said record playing and changing mechanism.

77. Sound reproducing apparatus comprising: a cabinet; an automatic record playing and changing unit in said cabinet including means for discarding a played record; means for supporting a stack of unplayed records in operative relation to said unit; a drawer in said cabinet for discarded records; and means operated by said record playing and changing unit for locking said drawer to prevent opening of said drawer during the record discarding portion of the cycle of said unit.

78. Sound reproducing apparatus comprising: a cabinet; an automatic record playing and changing unit in said cabinet including means for discarding a played record; means for supporting a stack of unplayed records in operative relation to said unit; a drawer in said cabinet for discarded records; and means operatively associated with said drawer for rendering said record playing and changing unit inoperative to discard a record when said drawer is partly or wholly withdrawn from said cabinet.

79. Record playing apparatus comprising: a tone arm, a rotatable turntable; releasable clamping means for holding a record in engagement with said turntable; and means for actuating said clamping means including a pivotally mounted frame carrying said clamping means, a reciprocable slide, means for actuating said slide, link means pivotally connected with said slide and detachably connected with said pivotally mounted frame, and means for effecting release of said frame from said link means at will, whereby to avoid actuation of said clamping means to release and discard the record and thus provide for repeat playing of said record.

80. Record playing apparatus comprising: a tone arm; a rotatable turntable; a releasable clamping head for holding a record in engagement with said turntable; oscillatable means carrying said clamping head including a pivotally mounted frame; and means for effecting movement of said frame about its pivots including a pair of slotted links connected with a pin carried by said frame, said links having inverted L-shaped slots to receive said pin, means for reciprocating said links, the short leg of said slots being notched and said pin normally being received in said notches to transmit movement of said links to said frame, and means for shifting said links relative to said pin so that the long leg portion of said slots receive and cooperate with said pin to provide a lost-motion connection thereby avoid actuation of said frame to release said clamping head and discard the record and thus provide for repeat playing of said record.

81. Sound reproducing apparatus comprising: a cabinnet; an automatic record playing and changing unit in said cabinet having a cycle which includes successively playing both sides of a record and conveying an unplayed record to record-playing position and discarding said record after playing; a door adapted to serve as a magazine for a stack of unplayed records; a drawer below said unit for receiving discarded records; and means operated by said record playing and changing unit for locking said door and drawer to prevent the opening of said door and drawer, respectively, when said unit is passing through the record discarding portion of its cycle.

82. Record playing apparatus comprising: a cam having arcuate surfaces spaced from each other by a gap; means including a clutch for effecting a drive of said cam; a roller adapted to enter said gap; means operatively connecting said roller with said clutch arranged to effect deactuation of said clutch upon entry of said roller in said gap; and means for preventing the entry of said roller into said gap to thereby prevent deactuation of said clutch and thus continue the drive of said cam.

83. Sound reproducing apparatus comprising: a vertical turntable; means for driving said turntable; a clamping head for holding a record in engagement with said turntable; a center pin carried by said clamping head, said center pin having a cylindrical portion and a record-stripping groove in said cylindrical portion arranged at an angle relative to the axis of said center pin; and means for releasing said clamping head while said record is rotating.

84. Sound reproducing apparatus comprising: an automatic record playing and changing unit; an electric motor for driving said unit; a main switch and a discarded record switch connected in series with said motor and with one side of a power line; a double contact main slide switch having contacts arranged to complete a circuit to said motor through said main switch and said discarded record switch; a drawer having a drawer switch associated therewith and an auxiliary slide switch arranged in parallel with said main slide switch; a door adapted to serve as a supply magazine; a supply magazine switch associated with said door and a pawl solenoid in series with said supply magazine switch and operable by said supply magazine switch to effect a delayed actuation of said auxiliary slide switch when the supply of records is exhausted, said supply magazine switch having one side thereof connected in the circuit at a point between said drawer switch and said auxiliary slide switch, and said pawl solenoid being connected with the other side of a power line; and a locking solenoid for locking said door and drawer in closed position during the record loading and discarding portion of the cycle of said unit, said locking solenoid being connected between said motor and a second pair of contacts of said main slide switch.

85. Record playing and changing apparatus for successively playing both sides of a series of records without turning said records over comprising: means for supporting a series of records in stack formation; a turntable adapted to be driven in opposite directions; means for driving said turntable in opposite directions; automatic means for feeding records one at a time from said stack to said turntable; a pair of independently operable pick-ups, said pick-ups having a normal inactive position radially beyond the edge of a record; automatic means for radially lowering and then laterally engaging one of said pick-ups with one side of a record while said record is being rotated in one direction and for disengaging said pick-up after the first side of said record has been played; automatic means for effecting a reversal of the direction of rotation of said record after said one side of the record has been played; automatic means for radially lowering and then laterally engaging the other of said pick-ups with the opposite side of said record after the direction of rotation of the record has been reversed and for disengaging said pick-up after said opposite side of said record has been played; and automatic means for effecting discarding of said record after both sides of said record have been played.

86. A record playing and changing apparatus as defined in claim 85, including manually operable record rejecting means arranged and constructed so that the playing of either side of the record can be interrupted at will, and the playing of the first side of the record can be interrupted without interfering with the subsequent playing of the opposite side of said record.

87. Record playing apparatus comprising: a wall; supporting means for an inclined stack of records extending inwardly and downwardly away from said wall, the direction of inclination of said stack being such that the lower portion of said stack is further from said wall than the upper portion of said stack; upwardly extending abutment means at the lower end of said inclined supporting means; and means for raising said records one at a time above said abutment means to effect ejection thereof from said stack.

88. Record playing apparatus comprising: a wall; supporting means for an inclined stack of records extending inwardly and downwardly away from said wall, the direction of inclination of the records being such that the lower portion of said stack is further from said wall than the upper portion of said stack; upwardly extending abutment means at the lower end of said inclined supporting means; and an ejector bar mounted for reciprocable movement relative to said stack, said ejector bar being arranged to raise the edge of the record nearest said abutment means above said abutment means to effect ejection thereof from said stack.

89. Apparatus for playing records of different size intermixed, comprising: a turntable for driving a record; a tone arm; means pivotally supporting said tone arm relative to said record; and means for positioning said tone arm relative to said record prior to engagement of said tone arm with said record including a stop and an element engageable with the periphery of the record and adapted to be thrown outwardly as said record is rotating into engagement with said stop.

90. A tone arm comprising: a hollow casing; a supporting member, a hollow sleeve in said supporting member secured to one end of said hollow casing; a tone arm strip pivotally mounted in said casing; a sound pick-up carried by one end of said tone arm strip; means between said tone arm strip and casing arranged to normally urge said sound pick-up toward a record; and means in said hollow sleeve operatively associated with the opposite end of said tone arm strip for controlling the movement of said pick-up toward and away from said record.

91. A tone arm comprising: a hollow casing; a supporting member, said tone arm being secured to one end of said supporting member; a tone arm strip pivotally mounted in said casing; a sound pick-up carried by one end of said tone arm strip; spring means between said tone arm strip and casing arranged to react against said casing to normally urge said sound pick-up toward a record; and means associated with the opposite end of said tone arm strip for controlling the movement of said pick-up toward and away from said record.

92. Sound reproducing apparatus comprising: a cabinet; a door hingedly mounted upon said cabinet; means movable with said door for supporting a plurality of records in inclined relation to said door; means within said cabinet arranged to receive and support the weight of said records when said door is in its fully closed position; means within said cabinet for playing said records including a turntable; and means for removing records one at a time from said last mentioned supporting means and conveying the same into engagement with said turntable.

93. Record playing apparatus comprising: a cam having a gap; a clutch actuable to effect a drive of said cam; a control member for said clutch carrying a roller adapted to enter the gap in said cam and arranged to effect deactuation of said clutch when positioned in said gap; a detent pivotally carried by said control member and operatively associated with said roller through said control member to effect displacement of said roller from said gap; a tone arm; a pivotally mounted member non-rotatably secured to said tone arm; a trip mechanism operatively associated with said tone arm and said pivotally mounted member including a linkage having an element frictionally connected with said pivotally mounted member and being normally rotatable therewith and further including another element arranged to engage the detent on said control member to rotate said detent slightly as the tone arm progressively moves toward the center of a record; a rotating member carrying a lug, the detent pivotally carried by said control member having a projection which is moved slightly into the path of said lug through said linkage as said tone arm progresses toward the center of the record, said lug being arranged to engage said projection and to kick it back out of its path of rotation, said kick-back being permitted through the frictional connection of said linkage with the pivotally mounted member for said tone arm, said linkage being arranged to impart a relatively greater and sudden movement to said arm after playing of the record has been completed and said tone arm has reached the eccentric groove at the center of the record, said greater movement being sufficient to impart such movement to said projection as to prevent the same from being kicked back by said lug, whereby said detent is bodily raised displacing said roller from the gap of said cam and effecting actuation of said control member to permit the clutch to be engaged to drive the cam upon completion of the playing of the record.

94. Record playing apparatus comprising: a tone arm; a pivotally mounted tone arm supporting member non-rotatably secured to said tone arm; an intermittently driven cam arranged to control the movement of said tone arm relative to a record; and means for controlling the drive of said cam including a clutch, a control for said clutch, movable detent means so associated with said control that engagement of said clutch is effected upon predetermined movement of said detent, and means for effecting said movement of said detent comprising a member arranged to strike said detent, and linkage between said pivotally mounted member and said detent arranged to move said detent into the path of said striking member as said tone arm moves toward the center of the record, said linkage including an element frictionally connected at one end with said pivotally mounted tone arm supporting member and a plurality of pivotally interconnected floating links, one of which is pivotally connected at one end with the other end of said element and another of which is arranged to engage said detent and move it into the path of said striking member, said two mentioned links being operatively connected by a lost-motion connection.

95. Sound-reproducing apparatus comprising: a cabinet; an automatic record playing and changing unit in said cabinet including means for discarding a played record; a door hingedly mounted upon said cabinet at its lower edge; means carried by the inner face of said door for supporting a stack of records when said door is open, record supporting means within said cabinet positioned to receive the weight of said records and support said records when said door is in fully closed position; means for ejecting records one at a time from said stack and delivering the same to said automatic record playing and changing unit; and means operated by said automatic record playing and changing unit for locking said door to prevent opening of said door during the record feeding portion of the cycle of said unit.

96. Sound-reproducing apparatus comprising: a cabinet; an automatic record playing and changing unit in said cabinet including means for discarding played records; a movable receptacle in said cabinet positioned to receive discarded records from said unit; and means controlled by said unit for locking said receptacle in closed position during the record discarding portion of the cycle of said unit.

97. Record playing apparatus comprising: means for supporting and driving a record in a substantially vertical plane; a pair of tone arms positioned above said record, each of said tone arms being adapted to play a respective side of said record; means cooperable with each of said tone arms to limit the radial movement of said tone arms relative to said record, said means including a pair of pivoted elements, one for each tone arm movable into engagement with the periphery of a record for automatically effecting a positioning of said tone arms opposite to the starting groove in said record; and means for pivotally supporting said elements for rotation about an axis radial to said record, whereby said pivoted elements are movable in the direction tangentially away from the record by the rotation of the said record.

FREDERIC W. WAGNER.
RAY WILSON.

CERTIFICATE OF CORRECTION.

Patent No. 2,348,766.  FREDERIC W. WAGNER, ET AL.  May 16, 1944.

It is hereby certified that error appears in the printed specification of the above numbered patent requiring correction as follows: Page 9, second column, line 13, for "seat" read --set--; page 14, second column, line 37, for "poistion" read --position--; page 16, first column, line 68, for "stradding" read --straddling--; page 17, first column, line 73, for "and" read --are--; page 23, first column, line 63, for "oto" read --to--; and second column, line 50, for "wards" read --words--; page 30, first column, line 61, claim 50, after "frame" insert a semi-colon; and second column, line 44, claim 53, after "axes" insert a semi-colon; page 31, second column, line 30, claim 63, for "at one" read --one at a--; and that the said Letters Patent should be read with this correction therein that the same may conform to the record of the case in the Patent Office.

Signed and sealed this 12th day of September, A. D. 1944.

Leslie Frazer (Seal)   Acting Commissioner of Patents.